United States Patent
Sharp

(10) Patent No.: US 11,341,418 B2
(45) Date of Patent: May 24, 2022

(54) ASCRIPTIVE AND DESCRIPTIVE ENTITIES FOR PROCESS AND TRANSLATION: A LIMITED ITERATIVE ONTOLOGICAL NOTATION

(71) Applicant: Gregory Evan Sharp, Manitou Springs, CO (US)

(72) Inventor: Gregory Evan Sharp, Manitou Springs, CO (US)

(73) Assignee: Salveretec PRC, Manitou Springs, CO (US)

( * ) Notice: Subject to any disclaimer, the term of this patent is extended or adjusted under 35 U.S.C. 154(b) by 863 days.

(21) Appl. No.: 16/190,003

(22) Filed: Nov. 13, 2018

(65) Prior Publication Data
US 2020/0151582 A1    May 14, 2020

(51) Int. Cl.
*G06N 5/02*       (2006.01)
*G06F 16/36*      (2019.01)
*G06F 16/901*     (2019.01)
*G06F 16/31*      (2019.01)

(52) U.S. Cl.
CPC ............. *G06N 5/02* (2013.01); *G06F 16/313* (2019.01); *G06F 16/367* (2019.01); *G06F 16/9024* (2019.01)

(58) Field of Classification Search
CPC ....... G06N 5/02; G06F 16/367; G06F 16/313; G06F 16/9024
USPC .......................................................... 706/46
See application file for complete search history.

(56) References Cited

U.S. PATENT DOCUMENTS

| | | | | |
|---|---|---|---|---|
| 5,809,297 A * | 9/1998 | Kroenke | ............... | G06F 16/289 707/999.102 |
| 7,523,131 B2 * | 4/2009 | Warner | ................... | G06F 16/86 707/999.102 |
| 8,244,772 B2 * | 8/2012 | Aasman | ................... | G06F 16/28 707/798 |
| 2006/0026189 A1 * | 2/2006 | Djugash | ............... | G06F 16/258 707/999.102 |
| 2016/0196625 A1 * | 7/2016 | Adamson | ............... | G06Q 10/10 705/313 |

* cited by examiner

*Primary Examiner* — Andrew R Dyer
*Assistant Examiner* — Tionna M Burke

(57) ABSTRACT

The present disclosure describes computer-implemented methods and systems for providing and maintaining a limited iterative ontological notation (FIG. 1), built upon a three-value logic of existence or equivalence of patterns. Methods may be embodied as a self-referencing table with a finite collection of columns or as a property graph with a small count of fixed properties and a finite collection of edge types, each carrying a particular ontological interpretation and use. Isolation of information content from context and application of three value logic to pattern recognition produces a finite set of indexed notations which allow for leveraging of a fixed schema to enhance computing performance, reduce memory utilization and improve accessibility though enabling a user interface that does not require prior knowledge of graph database programming languages. Implementation embodiments include but are not limited to, formulaic, cyclical, graphical, tabular, Cartesian, hierarchical, object-oriented and transactional information sources.

18 Claims, 42 Drawing Sheets

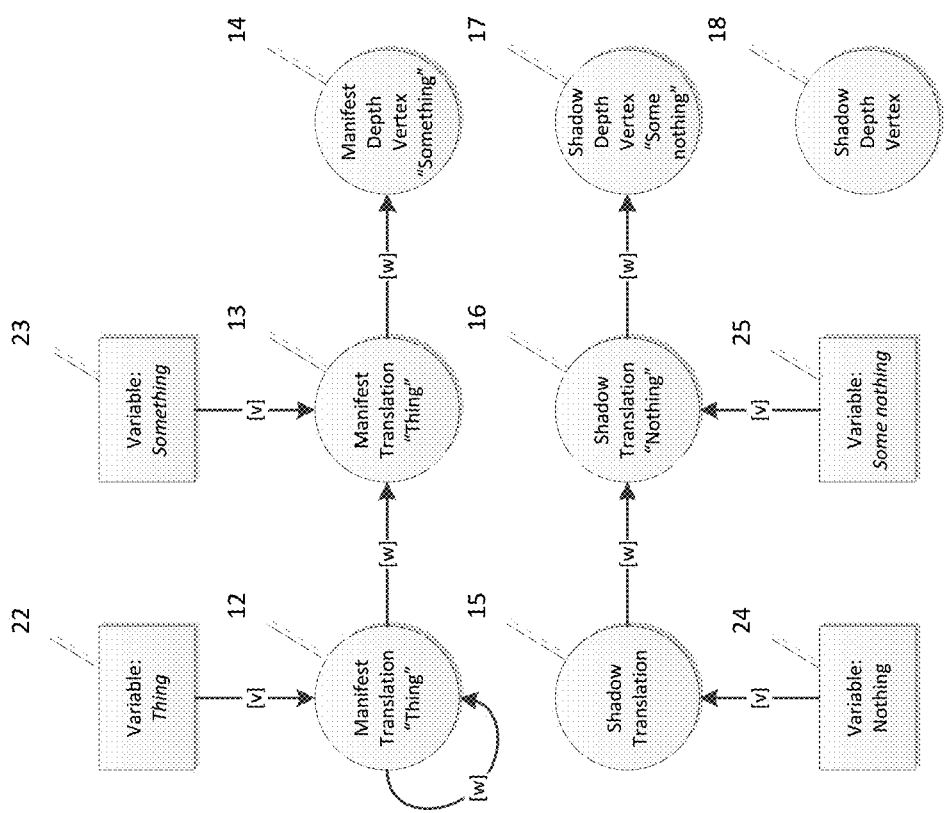

FIGURE 2b

| identifier | variable | word | thing | use | subject | object | source |
|---|---|---|---|---|---|---|---|
| 12 | | 22 | 12 | | | | |
| 13 | | 23 | 12 | | | | |
| 14 | | | 13 | | | | |
| 15 | | 24 | | | | | |
| 16 | | 25 | 15 | | | | |
| 17 | | | 16 | | | | |
| 18 | | | | | | | |
| 22 | Thing | | | | | | |
| 23 | Something | | | | | | |
| 24 | Nothing | | | | | | |
| 25 | Some nothing | | | | | | |

Figure 9
ADEPT Depth, Pool, Nature, Surface, and Rivulet: Algorithmic and Ontological Determinants

|  | Translation Nature T (2ⁿᵈ consid.) | | Aether Nature H (1ˢᵗ consid.) | | Light Nature L (3ʳᵈ consid.) | Ground Nature G (3ʳᵈ consid.) | | Being Nature B (3ʳᵈ consid.) | |
|---|---|---|---|---|---|---|---|---|---|
| Pool A Ascription | SAT 0432 Mark 0,1,(2),(3),(4) | MAT 0431 Index 0,1,(2),(3),4 | SAH 0472 Essence 1,(2),(3),(4) | MAH 0471 Identity 1,(2),(3),4 | SAL 0841 Projection (4),(5),6,(7),(8) | MAL 0822 Emanation 4,(5),6,(7),(8) | SAG 0932 Item (4),5,6,(7),(8),(9) | MAG 0972 Label 4,5,6,(7),(8),(9) | SAB 0931 Persona (4),5,6,(7),(8),9 | MAB 0971 Name 4,5,6,(7),(8),9 |
| Pool D Description | SDT 0412 Type 0,(1),(2),3,(4) | MDT 0411 Icon 0,(1),(2),3,4 | SDH 0452 Purpose (1),(2),3,(4) | MDH 0451 Kind (1),(2),3,4 | SDL 0831 Reflection (4),(5),(6),(7),8 | MDL 0811 Illumination 4,(5),(6),(7),8 | SDG 1012 Genre (4),5,(6),(7),8,(10) | MDG 1032 Form 4,5,(6),(7),8,(10) | SDB 1011 Character (4),5,(6),(7),8,10 | MDB 1031 Attribute 4,5,(6),(7),8,10 |
| Pool E Entity | SET 0422 Negation 0,2,(4) | MET 0421 Sign 0,2,4 | SEH 0462 Notion 2,(4) | MEH 0461 Theory 2,4 | SEL 0741/0832 Singularity (4),(5),7 | MEL 0721/0812 Vision 4,(5),7 | SEG 0922 Concept (4),5,7,(9),(10) | MEG 0962 Element 4,5,7,(9),(10) | SEB 0921 Condition (4),5,6,7,8,9,10 | MEB 0961 Language 4,5,6,7,8,9,10 |
| Pool P Process | SPT 0442 Token (1),(2),3,(4) | MPT 0441 Symbol 0,1,(2),3,4 | SPH 0482 Action 1,(2),3,(4) | MPH 0481 Cause 1,(2),3,4 | SPL 0842 Radiation (4),(5),(6),(7),8 | MPL 0821 Point 4,(5),(6),(7),8 | SPG 1022 Position (4),5,6,(7),8,(9),(10) | MPG 1042 Order 4,5,6,(7),8,(9),(10) | SPBx 0941 Interaction (4),5,6,(7),8,9,(10) SPBv 1021 Interaction (4),5,6,(7),8,(9),10 | MPBx 0981 Relation 4,5,6,(7),8,9,(10) MPBv 1041 Relation 4,5,6,(7),8,(9),10 |
|  | Shadow Depth S Cryptic Surface ST | Manifest Depth M Signify Surface MT | Shadow Depth S Initiate Surface SH | Manifest Depth M Assign Surface MH | Final Depth S/F Value Surface SL | Final Depth M/F Record Surface ML | Shadow Depth S Associate Surface SG | Manifest Depth M Implement Surf. MG | Shadow Depth S Integrate Surface SB | Manifest Depth M Establish Surface MB |

For the three letter ADEPT rivulet notation, the first letter represents a Depth, the second a Pool and the third a Nature. Each rivulet is also given a descriptive name (ie. Mark is the SAT rivulet, or "Shadow Ascription of Translation")

Depths:
Shadow S
Manifest M
Final F

Pools:
Ascription A
Description D
Entity E
Process P

Natures:
Translation T
Aether H
Light L
Ground G
Being B

Algorithmic Steps are indicated by numers 0-10 and parenthesis represent a negative or unequal result for the step while non-parenthetical numbers represent an affirmative or equal result for the step. Unlisted steps are non-determinative for the specified rivulet (because of channel considerations)

Algorithmic Steps of Existence

Algorithmic Steps of Equivalence

First Consideration

Second Consideration

Figure 11c
Third Consideration
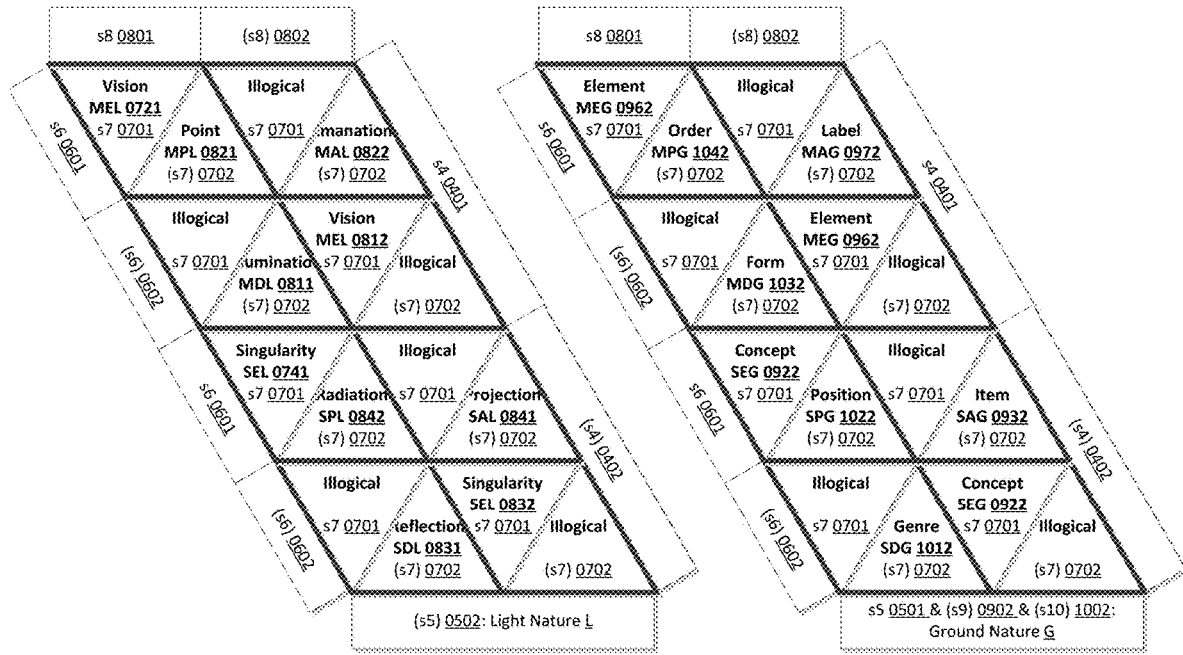
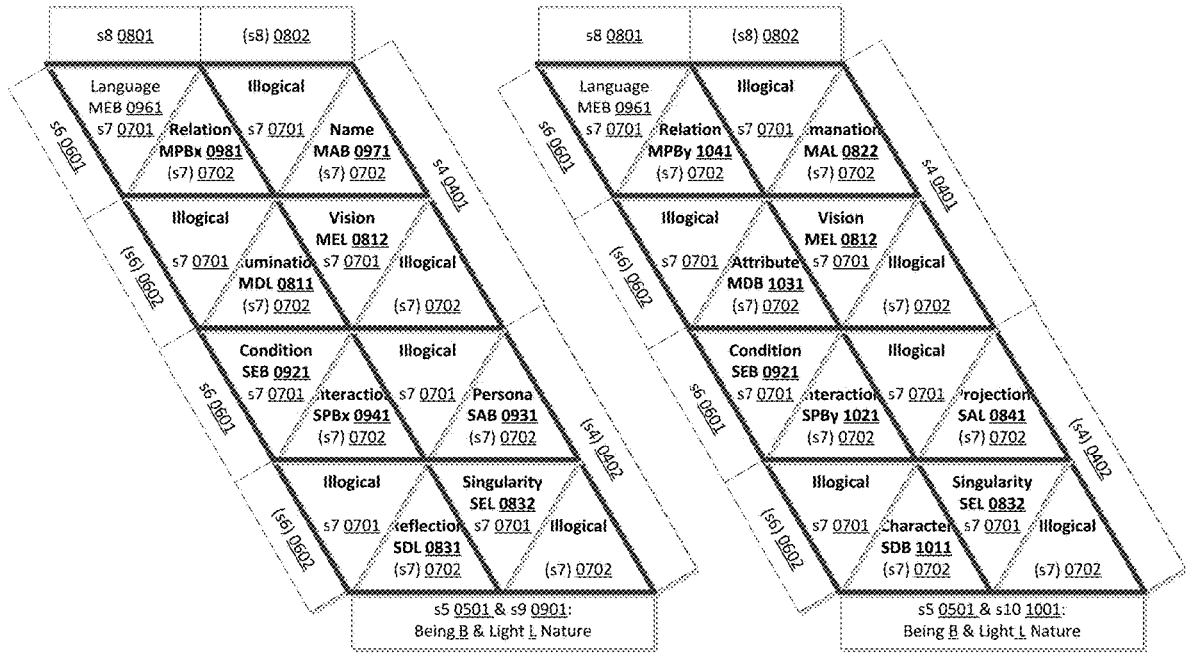

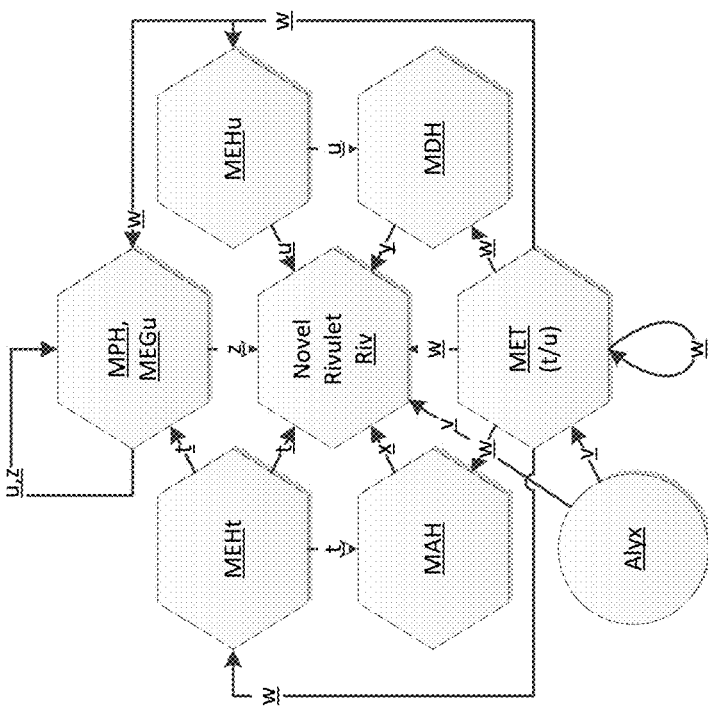

FIGURE 15
Novel Rivulet Creation

Novel Variety: MERGE (ALYX:ALYX {variable:"$string"})-[:v]->(Riv)

Novel Word: MERGE (ALYX:ALYX {variable:"$string"})-[:v]-
>(MET:ADEPT:S0:S2:S4:S7:M:E:T:ME:MT:ET:MET:MH:EH:MEH:ML:EL:MEL)-[:w]->(Riv)

Novel Thing: MERGE (ALYX:ALYX {variable:"$string"})-[:v]-
>(MET:ADEPT:S0:S2:S4:S7:M:E:T:ME:MT:ET:MET:MH:EH:MEH:ML:EL:MEL)-[:w]-
>(MEHt:ADEPT:S2:S4:S7:M:E:H:ME:MH:EH:MEH:ML:EL:MEL)-[:t]->(Riv)

Novel Use: MERGE (ALYX:ALYX {variable:"$string"})-[:v]-
>(MET:ADEPT:S0:S2:S4:S7:M:E:T:ME:MT:ET:MET:MH:EH:MEH:ML:EL:MEL)-[:w]-
>(MEHu:ADEPT:S2:S4:S7:M:E:H:ME:MH:EH:MEH:ML:EL:MEL)-[:u]->(Riv)

Novel Subject: MERGE (ALYX:ALYX {variable:"$string"})-[:v]-
>(MET:ADEPT:S0:S2:S4:S7:M:E:T:ME:MT:ET:MET:MH:EH:MEH:ML:EL:MEL)-[:w]-
>(MEHt:ADEPT:S2:S4:S7:M:E:H:ME:MH:EH:MEH:ML:EL:MEL)-[:t]-
>(MAH:ADEPT:S1:S4:S7:M:A:H:MA:AH:MAH:ML:AL:MAL)-[:x]->(Riv);(MAH)<-[:w]-(MET)<-[:v]-(ALYX)

Novel Object: MERGE (ALYX:ALYX {variable:"$string"})-[:v]-
>(MET:ADEPT:S0:S2:S4:S7:M:E:T:ME:MT:ET:MET:MH:EH:MEH:ML:EL:MEL)-[:w]-
>(MEHu:ADEPT:S2:S4:S7:M:E:H:ME:MH:EH:MEH:ML:EL:MEL)-[:u]-
>(MDH:ADEPT:S3:S4:S7:M:D:H:MD:DH:MDH:ML:DL:MDL)-[:y]->(Riv);(MDH)<-[:w]-(MET)<-[:v]-(ALYX)

Novel Source: MERGE (ALYXt:ALYX {variable:"$string"})-[:v]-
>(METt:ADEPT:S0:S2:S4:S7:M:E:T:ME:MT:ET:MET:MH:EH:MEH:ML:EL:MEL)-[:w]-
>(MEHt:ADEPT:S2:S4:S7:M:E:H:ME:MH:EH:MEH:ML:EL:MEL)-[:t]-
>(MPH:ADEPT:S1:S3:S4:S5:S7:M:P:H:MP:PH:MPH:ML:PL:MPL:E:G:ME:MG:EG:MEG)-[:z]*0..1->(MPH);
(MPH)<-[:w]-(METu:ADEPT:S0:S2:S4:S7:M:E:T:ME:MT:ET:MET:MH:EH:MEH:ML:EL:MEL)<-[:v]-
(ALYXu:ALYX{variable:"ADEPT"}) ; (MPH)-[:z]->(Riv)

Formulaic Embodiment as Arithmetic

Implementation of a Cyclical Embodiment

Graphical Embodiment Example Property Graph

Graphical Embodiment as a Property Graph

Graphical Embodiment Example Property Graph as ADEPT Graph

FIGURE 18d
Example of Tabular Mode of Property Graph Implementation

| rivulet id | variable | variety | thing | use | word | subject | object | source |
|---|---|---|---|---|---|---|---|---|
| 88 | Person | 88 | | | | | | |
| 89 | Dr. Fudd | 89 | | | | | | |
| 90 | Mr. Bunny | 90 | | | | | | |
| 91 | Babs | 91 | | | | | | |
| 92 | Fudd | 92 | | | | | | |
| 93 | Bunny | 93 | | | | | | |
| 94 | LastName | 94 | | | | | | |
| 95 | FirstName | 95 | | | | | | |
| 96 | Sex | 96 | | | | | | |
| 97 | Profession | 97 | | | | | | |
| 98 | Male | 98 | | | | | | |
| 99 | Female | 99 | | | | | | |
| 100 | Doctor | 100 | | | | | | |
| 101 | Doctor_of | 101 | | | | | | |
| 102 | Spouse_of | 102 | | | | | | |
| 103 | | | | 106 | 89 | | | |
| 104 | | | | 106 | 90 | | | |
| 105 | | | | 106 | 91 | | | |
| 106 | | | | | 88 | | | |
| 107 | | | 103 | 103 | 96 | | | |
| 108 | | | 107 | | 98 | | | |
| 109 | | | 104 | 104 | 96 | | | |
| 110 | | | 109 | | 98 | | | |
| 111 | | | 105 | 105 | 96 | | | |
| 112 | | | 111 | | 99 | | | |
| 113 | | | 103 | 103 | 94 | | | |
| 114 | | | 113 | | 92 | | | |
| 115 | | | 104 | 104 | 94 | | | |
| 116 | | | 115 | | 93 | | | |
| 117 | | | 105 | 105 | 95 | | | |
| 118 | | | 117 | | 91 | | | |
| 119 | | | 103 | 103 | 97 | | | |
| 120 | | | 119 | | 100 | | | |
| 121 | | | 103 | 104 | 101 | | | |
| 122 | | | 103 | 105 | 101 | | | |
| 123 | | | 104 | 105 | 102 | | | |
| 124 | | | 105 | 104 | 102 | | | |

Tabular Embodiment as Comma Separated Value File (CSV) Format

Cartesian Embodiment as a Relational Database Management System

Hierarchical Embodiment as a Extensible Markup Language (XML) File

Object-Oriented Embodiment as a Javascript Object Notation (JSON) File

Transactional Embodiment of Resource Event Agent (REA) Accounting Theory

ASCRIPTIVE AND DESCRIPTIVE ENTITIES FOR PROCESS AND TRANSLATION: A LIMITED ITERATIVE ONTOLOGICAL NOTATION

CROSS-REFERENCE

This application claims the benefit of U.S. Provisional Application No. 62/585,951, filed on Nov. 14, 2017, which applications are incorporated herein by reference in their entirety.

TECHNICAL FIELD

The present disclosure concerns the field of information and knowledge management, and more particularly systems and methods for enhancing a user's ability to represent meaning in an automatically indexing schema to achieve greater performance and analytical insights from a knowledge management system.

BACKGROUND OF THE INVENTION

Over twenty years ago there emerged a novel database concept of a self-referencing table that was designed to address the shortcomings of its predecessor, namely the relational database. In the ensuing years, to address needs for flexible storage of large amounts of data generated by the expansion of the internet, database technology moved in the direction of schema-less databases such as NOSQL, document stores, key-value pairs and graph databases. As big sets of data moved between these more flexible databases and the applications that they both fed, and which in turn fed them, it was often packaged into file formats like comma-separated value (CSV), eXtensible Markup Language (XML) and JavaScript Object Notation (JSON). Schematically flexible databases addressed the challenge of capturing this proliferation of data and supported the whims of application and website designers without giving much thought to data architecture, but the analysis and utilization of this information presented new challenges to which the lack of schema has in part been responsible.

Thus there is a need for flexible storage and accessible analytical insight in order to realize the value hidden in large data sets. In order to achieve these aims, ontologies and knowledge graphs are created to provide these insights but they face several challenges. First, that domain knowledge of the user is a prerequisite of any ontological design or use, reducing scope of application. Second, that graph visualization involves complexity that can quickly overwhelm the user, reducing utility. Third, that graph technology as it currently exists requires the user to have proficiency in graph traversal languages in order to interact with the data, reducing accessibility and utility of the knowledge store. Fourth, that computational cost of traversals on the graph are high without proper indexing but such indexing strategies require a user with domain specific knowledge to create and maintain the system in order for it to remain adequately performant. Fifth, that in rapidly evolving big data environments, it is difficult to maintain an evolving schema that returns useful analytical insights because of the user-dependent work of updating the ontology alongside the schema which may exist in any number of separate files or information system formats.

SUMMARY OF THE INVENTION

In one aspect this invention improves upon prior art information search and retrieval systems that utilize a flexible self-referential table for data storage. The tabular embodiment of this invention, like prior art may store any type of data, both structured and unstructured, and provides an interface to other applications or data file formats that allows for integration of all the data for such applications, programs or external information source formats into a single database.

Unlike prior art however, the self-referencing table embodiment of this invention is limited from a plurality of columns to a set number of standardized columns while retaining a plurality of rows. The self-referencing of the table of this embodiment does not therefore represent any of the columns as rows as prior art does, but instead references a unique row identifier found in the first column and an associated optional keyword index of symbolic strings in the second column to the cells in the remaining seven standardized columns. The invention then utilizes a particular three value logic of true/false/indeterminate and a set of imposed ontological constraints upon the remaining referencing columns to the identifier in the first column.

An alternative embodiment to the limited iterative ontological notation as a table is as a network graph made up of vertices and edges between them. In this graph embodiment, the unique row identifier found in the first column of the table becomes a unique identifier of each vertex in the graph. The second column of the table, which contains the optional keyword index of symbolic strings becomes the only possible property of any indexed vertex. In the preferred embodiment the vertices with a property on it form an indexed set of vertices that then convey this property value to any other vertex in the graph through an explicit edge type. The remaining columns of the table referencing the unique identifier found in the first indexed column are thus represented in the graph embodiment as edges between vertices of the remaining explicit edge types. In the preferred embodiment these additional edge types are referred to as the "thing", "use", "word", "subject", "object" and "source" channels. These channels are correspondingly abbreviated as "t", "u", "w", "x", "y", and "z." The edge that conveys a symbolic string is called the "variety" channel and is abbreviated as "v" in the preferred embodiment.

Through either this limited schema of explicit columns in the table embodiment or the uniquely identifiable vertices with standardized types of edge in the graph embodiment, this invention includes an additional limitation of a particular three value logic. In contrast to the two-values of Boolean logic and binary computing systems, the three value logic of this invention adds to "true" and "false" a third value of "indeterminate". This third indeterminate value conveys non-deterministic information within the logic of the system. This means that while it conveys information, this information is treated as a "null" or "false" result. The addition of this third value allows the invention to account for inconsistent, incomplete or even erroneous values without triggering logical errors. There are two particular uses of the three value logic in the invention. The first has to do with the logic of existence and can be stated as "yes", "no", or "indeterminate" as to whether a particular pattern exists in the referencing between columns in the tabular embodiment or vertices in the graph embodiment. The second has to do with the logic of equivalence and can be stated as "equal", "unequal", or "indeterminate equivalence" as to whether two particular meanings that are each one iterative step away from a shared considered meaning along two different paths of iteration share a common semantic meaning.

Within the preferred embodiment, a three value logic of secondary iterations and a particular set of ontological limitations, the self-referencing table or graph results in a finite set of iterative patterns which are given a specific notation and meaning.

These notated and meaningful distinct iterative patterns are computable through an algorithm which examines particular states of existence and equality of secondary iterative references corresponding to the relationships in the graph or table. It is the restricted logical computation of this algorithm, the isolation of content from context through a searchable keyword index, the synthesis of schema and ontology, and the uniform indexing strategy of the notations of relational patterns that results in the improved system performance over existing technology, be it tabular or graphical in its embodiment.

In one aspect this invention provides a method for expressing mathematical concepts and operators within an alternative automatically indexed schema imbued with the ontological meaning and analytical capacities of relational patterns. This aspect represents a novel approach to mathematical computation, modeling and analysis.

In another aspect this invention provides a method for absorbing and implementing semantic data, such as narratives or documents, within an alternative automatically indexed schema imbued with the ontological meaning and analytical capacities of the relational patterns.

In another embodiment this invention provides a method for absorbing and implementing Cartesian data frameworks such as found in relational database tables or spreadsheets within an alternative automatically indexed schema imbued with the ontological meaning and analytical capacities of the relational patterns.

In another embodiment this invention provides a standardized method for absorbing and implementing data storage and transmission formats such as CSV, XML or JSON, within an alternative automatically indexed schema imbued with the ontological meaning and analytical capacities of the relational patterns.

In another embodiment this invention provides a standardized method for absorbing and implementing graphical data frameworks such as found in network graphs, property graphs, knowledge graphs or resource description framework (RDF) within an alternative automatically indexed schema imbued with the ontological meaning and analytical capacities of the relational patterns.

In another embodiment this invention provides a standardized method for absorbing and implementing economic data frameworks, such as the Resource, Event Agent (REA) accounting model, within an alternative automatically indexed schema imbued with the ontological meaning and analytical capacities of the relational patterns.

In another embodiment this invention provides a standardized method for absorbing and implementing naturally encoded scientific data, such as gene sequences, protein sequences, or biological processes, within an alternative automatically indexed schema imbued with the ontological meaning and analytical capacities of the relational patterns.

In another embodiment this invention provides integrated storage, indexing, meaning, and analysis in one immutable architecture which exists in an information model that can support artificially intelligent computing systems that integrate existing knowledge content and context with sensor-derived data input in a consistent and coherent manner such that the very structuring of its storage results in readily available, and actionable cognitive output.

BRIEF DESCRIPTION OF THE DRAWINGS

The following detailed description that sets forth illustrative embodiments, in which various principles in accordance with aspects of the invention are utilized, and includes the accompanying drawings of which:

FIG. 2a exemplifies a preferred graphical mode of the invention and teaches the link between graph schema patterns and the three states of its three-value logic.

FIG. 2b exemplifies a tabular mode of the invention and the constraint of nine columns in which the first column contains a unique identifier, the second column may contain content as a string of unformatted text and the remaining columns may contain contextual references to the first column. The sample content is the same as for the graphical mode in FIG. 2a.

FIG. 9 provides a tabular summary of the algorithmic and ontological determinants: considerations, depths, pools, natures, surfaces and rivulets with their corresponding logical requirements as expressed through the algorithmic steps. An algorithmic step with a negative logical result of "non-existent" or "unequal" is signified by parenthesis around the step abbreviation. The affirmative logical result is signified by a step abbreviation without parenthesis. Indeterminate steps may be omitted in the notation.

FIG. 11c illustrates the third consideration of the algorithmic steps to logically derive the light, ground and being natures and their twenty-four rivulets. An algorithmic step with a negative logical result of "non-existent", "unequal" or "indeterminate" is signified by parenthesis around the step abbreviation. The affirmative logical result is signified by a step abbreviation without parenthesis. Illogical outcomes are indicated as "Illogical."

FIG. 15 illustrates the pattern for novel vertex creation and the corresponding commands in a graph programming language such as Cypher shown in the example, for creation of new content and context within a graph along with the assignment of schema and ontological notation. ALYX refers to the collection of all distinct strings of content used in the ADEPT instance.

FIG. 18c is the result when applying the implementation model of FIG. 18b to the example of FIG. 18a.

FIG. 18d is the result of FIG. 18c displayed in the tabular mode of embodiment.

DETAILED DESCRIPTION OF THE INVENTION

The aim of ascriptive and descriptive entities for process and translation, or ADEPT, is to represent meaning through computable patterns. ADEPT is a severely limited and logically constrained usage of what has been termed a "network graph" or "property graph."

Although the terminology may vary, the basic representation of a graph in this usage is that there are first "things" and second, that there are the "things that connect" these things. The "things" themselves have been commonly referred to as "nodes" or "vertices" and the "things that connect" have been commonly referred to as "relationships" or "edges."

ADEPT seeks to blur the distinction between the concepts of graph schema and ontology, making data structure and data meaning one and the same. It is therefore important to define the terminology used in this description so as to distinguish schema and ontology, from the blurring of the two, as found in the present invention.

The vertex/edge terminology will be used to emphasize the schema of a graph, however, when emphasizing the additional ontological aspect found in an ADEPT instance, "representation" will be the term applied to a vertex that is associated with context-free-content and "meaning" will be the term applied to a vertex that is associated with content-free-context. The term "iteration" is used to describe the graph concept of an edge which has been given a distinct ontological role. The term "limitation" will be interpreted as synonymous with the graph concepts of labeled vertices or typed edges. These vertex labels or edge types should be assumed to be part of the standard indexing strategy in graph database implementations and therefore quickly accessible to the computing machine.

Because ADEPT is an entirely constrained usage of the graph concept, it is natural to speak of the rules of how these logical limitations work in the language of axioms and corollaries. The axioms form the inviolate truths of the logical system and the corollaries are derivative truths from the axioms. The "notation" that is laid out in ADEPT is in some sense arbitrary because other words could have easily been chosen to label what are actually logical premises and outcomes. Although this may be an initial point of some confusion, the important point to remember is that the terminology refers to logically computable patterns with a semantic overlay of terms that point to, but imperfectly represent the ontological truths which they represent. The terms are arbitrary in the sense that there exists valid alternative wording, but that what they are representing is not arbitrary at all, but in fact, entirely logical. The chosen notation, filled with natural metaphors, and word-association groupings is meant to point to the meaning that is set upon the defined logical patterns of connection.

Figure 1:
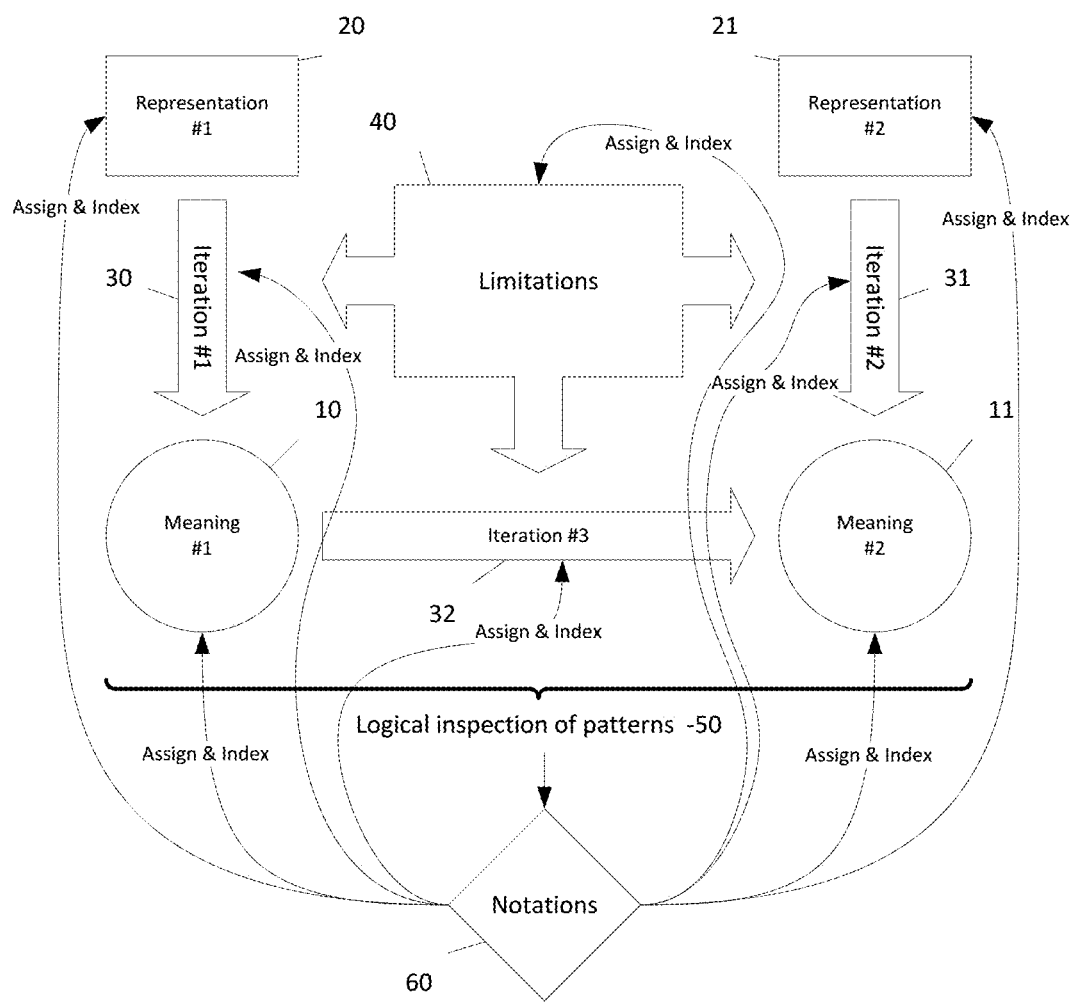
FIG. 1 illustrates a block diagram of the method of this invention for the modeling of a limited, iterative, ontological notation.

FIG. 1 is a block diagram that teaches the essential representation of the invention as the merger of graph schema and ontology. Vertex 20 is a representation of content given a unique identifier that conveys its content to the contextualized meaning given a unique identifier found in vertex 10 through the iterative connection of edge 30. Edge 30 is limited in its conveyance of representation to meaning by label 40. Additional limitations shown as vertex type 40 are applied to other iterations found at edge 31 and edge 32. Edge 32 teaches the conveyance of context from the meaning of vertex 10 to the meaning of vertex 11. The patterns of iteration between representations and meanings within this graph is logically inspected by the bracket 50 to produce the notations of diamond 60. These notations are then assigned and indexed to all of the representations of content, meanings of context and iterations of connection, be they as edge or vertex types.

FIG. 2a shows an instance of ADEPT conceived as a graph composed of vertices and edges. The string of characters "Thing" is represented as the value of the vertex property called "Variable" in vertex 22. Similarly the string "Something" is the representation of content as vertex property found in vertex 23 and so on in vertices 24 and 25. Context is found in the meaning of vertices 12 through 18. In vertex 12, the content of vertex 22 is conveyed through a limited edge of type v (which stands for a variety channel). The meaning or vertex 12 is associated with the word "Thing" through the self-referencing iteration demonstrated by the curved edge w (which stands for a word channel). This word "Thing" is labeled as a "Manifest Translation" which permits it to covey itself through a w edge to not only itself, but also to vertex 13 which subsequently also takes on the Manifest Translation notation because it also has an incoming v edge from vertex 23, representing "Something." It is the word "Something" which is now conveyed through the semantic edge w to vertex 14. Because vertex 14 does not itself have an incoming v edge it is does not receive the notation of "Translation", but remains a "Manifest Depth" vertex (which will be explained later).

A similar but logically distinct pattern is seen with the representations of vertices 24 and 25 and their related meaning in vertices 15, 16 and 17. In this case, there is no self-referencing word channel so the context remains non-deterministically "shadow" as opposed to the logically-deterministic "manifest" pattern of vertices 12, 13 and 14. Nonetheless, the symbolic variables are conveyed from representation to meaning as shown. Vertex 18 demonstrates the default "shadow depth" of a vertex that has no content-representative v edge or semantic-context w edge incoming.

FIG. 2b shows an instance of ADEPT alternatively conceived as a self-referential table of 9 columns corresponding to a unique identifier in the first column a second "variable" column containing textual content, and the 7 "channels" introduced below as the remaining columns. The example content and context is the same as for FIG. 2a. In such a conception, the "variable" column would be of datatype string and the remaining columns would have the same datatype as the unique identifier in the first column and would contain references to other rows as represented by the unique identifier values in the first column. The v and w edges from the graph are now portrayed as columns called variety and word, containing references to the row identifier from which the edge would originate and the row's own identifier is the edge's terminus. The self-referencing word concept can be seen in row 12 which contains its own identifier in the word column.

FIG. 2b teaches a distinctive feature of ADEPT, which is that regardless of the complexity of the informational concepts it contains, it can always be represented, for purposes of storage or transmission as a simple table or delimiter separated text file of these nine particular columns.

With this introductory example of the convergence of content and context, schema and ontology, we can now proceed to teach more of the particular logical axioms and corollaries of ADEPT.

Axiomatic Constructs

Figure 3:
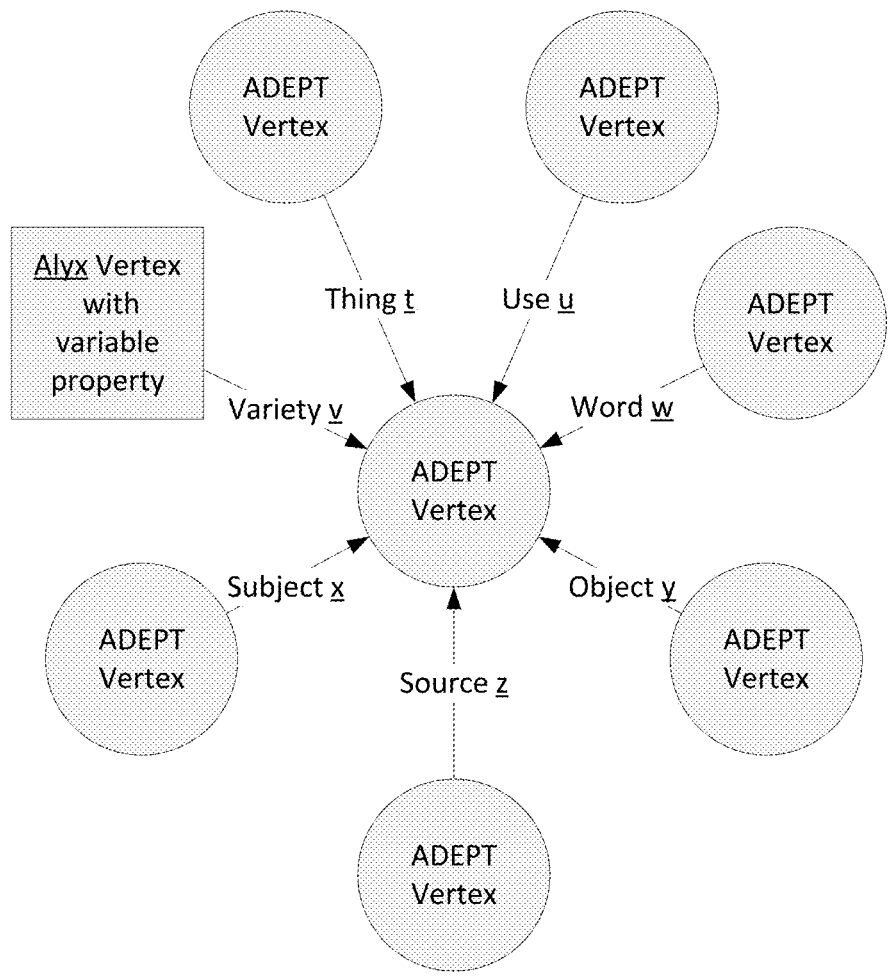
FIG. 3 is a schematic diagram of a graphical embodiment of the invention demonstrating the constraint of seven edges called channels, each corresponding to a different ontological purpose through iterative associations between vertices in a graph.

FIG. 3 teaches the content axioms:

An ADEPT vertex may have one or less property, named "variable", which is assigned a value representing some informational content.

All ADEPT vertices with a variable property make up an indexed library of content called "Alyx"

An ADEPT vertex may have edges which represent the conveyance of informational context.

FIG. 3. Further teaches the channel axioms as follows:

A vertex can have seven or less distinct input edges called "channels."

A vertex can have any number of output edges called "channels."

The seven distinct types of channels are mapped to the following aspects of meaning:

The "thing channel" t, is an edge pertaining to an immutable individual aspect,

The "use channel" u, is an edge pertaining to an immutable grouping aspect,

The "variety channel" v, is an edge pertaining to a symbolic aspect,

The "word channel" w, is an edge pertaining to a semantic aspect,

The "subject channel" x, is an edge pertaining to an intrinsic aspect,

The "object channel" y, is an edge pertaining to an extrinsic aspect,

The "source channel" z, is an edge pertaining to a mutable aspect.

Consideration

Figure 4:
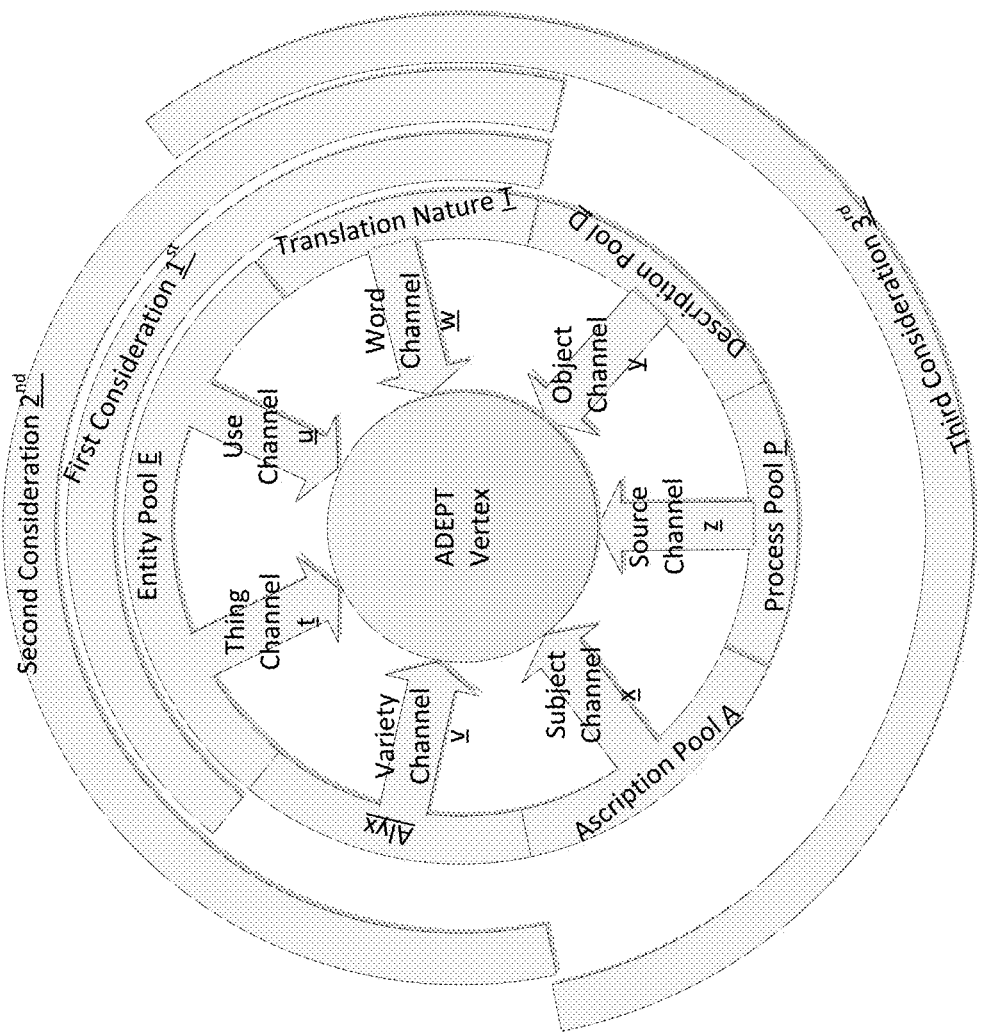
FIG. 4 is a schematic diagram of the three considerations of the seven iterative channels and the limited pools and transcendent semantic nature that supply them in a graphical mode of embodiment.

FIG. 4 teaches the consideration axioms as follows:

A "consideration" is a notation applicable to every vertex through two or more of three labels.

The "first consideration" $1^{st}$, includes the channels of thing, use, and word.

The "second consideration" $2^{nd}$, includes the channels of variety, thing, use, and word.

The "third consideration" $3^{rd}$, includes the channels of word, subject, object, and source.

The considerations of a vertex determine the number of distinct output edge types (channels) it may utilize.

Depth

FIG. 2a teaches the depth axioms as follows:

A "depth" is a notation applicable to every vertex through one of three labels.

A vertex is labeled a member of the "manifest depth" M, if it has a logically-determinate semantic edge w (word channel).

A logically-determinate semantic edge w (manifest word channel) has one ancestral vertex, through any length chain of iterative semantic edges w, with a self-iterating semantic edge w (a vertex that is both the origin and destination of a single word channel).

A manifest vertex M is determinate in its output channels.

A vertex is labeled a member of the "shadow depth" S, if it lacks, or has a logically-indeterminate semantic edge w.

A logically-indeterminate semantic edge w lacks an ancestral vertex, through any length chain of iterative semantic edges w, with a self-iterating semantic edge w.

A shadow vertex S is indeterminate in its output channels.

A vertex is labeled a member of the "final depth" F, if it lacks a source channel edge z, or iterates from a vertex of shadow depth S in its source channel edge z.

Final depth vertices are non-iterative in the third consideration.

Final depth vertices F are synonymous with the light nature and are therefore also represented by the nature L.

Figure 6:
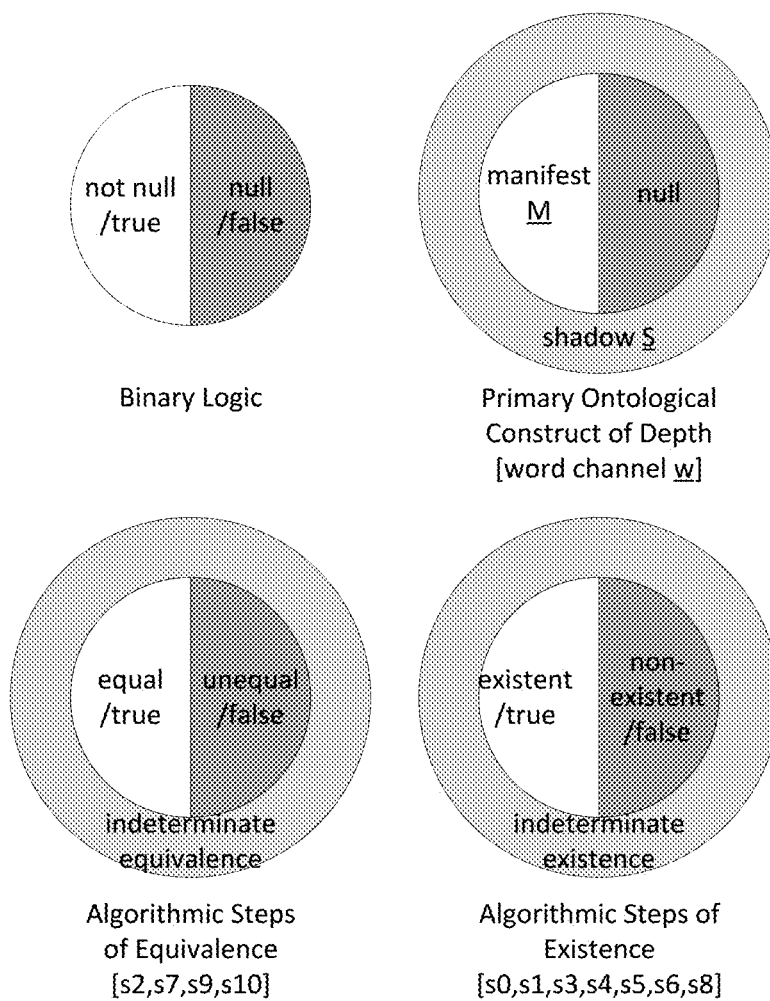
FIG. 6 illustrates the three-value logic of the invention in contrast to two-value logic. The application of this logic to existence and equivalence states as used in the algorithmic steps is taught.

FIG. 6 teaches the contrast between a two-value, or binary logic, and the three-value, or trinary, logic of ADEPT. While there is conceptual continuity found throughout the use of the three values, they may be expressed differently. In the expression of depth we find three values of expression of the deterministic effects that are attributable to an edge based on the depth of its originating vertex.

A logically-determinate edge iterates from a vertex of manifest depth M.

A logically-non-determinate edge lacks any iteration from another vertex.

A logically-indeterminate edge iterates from a vertex of shadow depth S.

When the expression of the three values concerns existence of a logically-determinate iteration the states are existent/non-existent/indeterminate existence.

When the expression of three values concerns equivalence of a logically determinate iteration the states are equal/unequal/indeterminate equivalence.

Logically-non-determinate and logically-indeterminate edges have the same effect in trinary logic as a Null.

The depth corollaries are as follows:

Because they both concern logical determination, the manifest depth M and shadow depth S are mutually exclusive of each other.

Because it does not concern logical determination, but instead iteration, the final depth F is not mutually exclusive of the manifest depth M or the shadow depth S.

Regardless of logical determination, a final depth F vertex is not permitted to iterate through output edges based upon its third consideration, but this does not prevent it from iterating based upon its first or second consideration (should it exist).

Pool

FIGS. 5v, 5a, 5d, 5e, 5p, and 5t teach the pool axioms as follows.

Figure 5A:
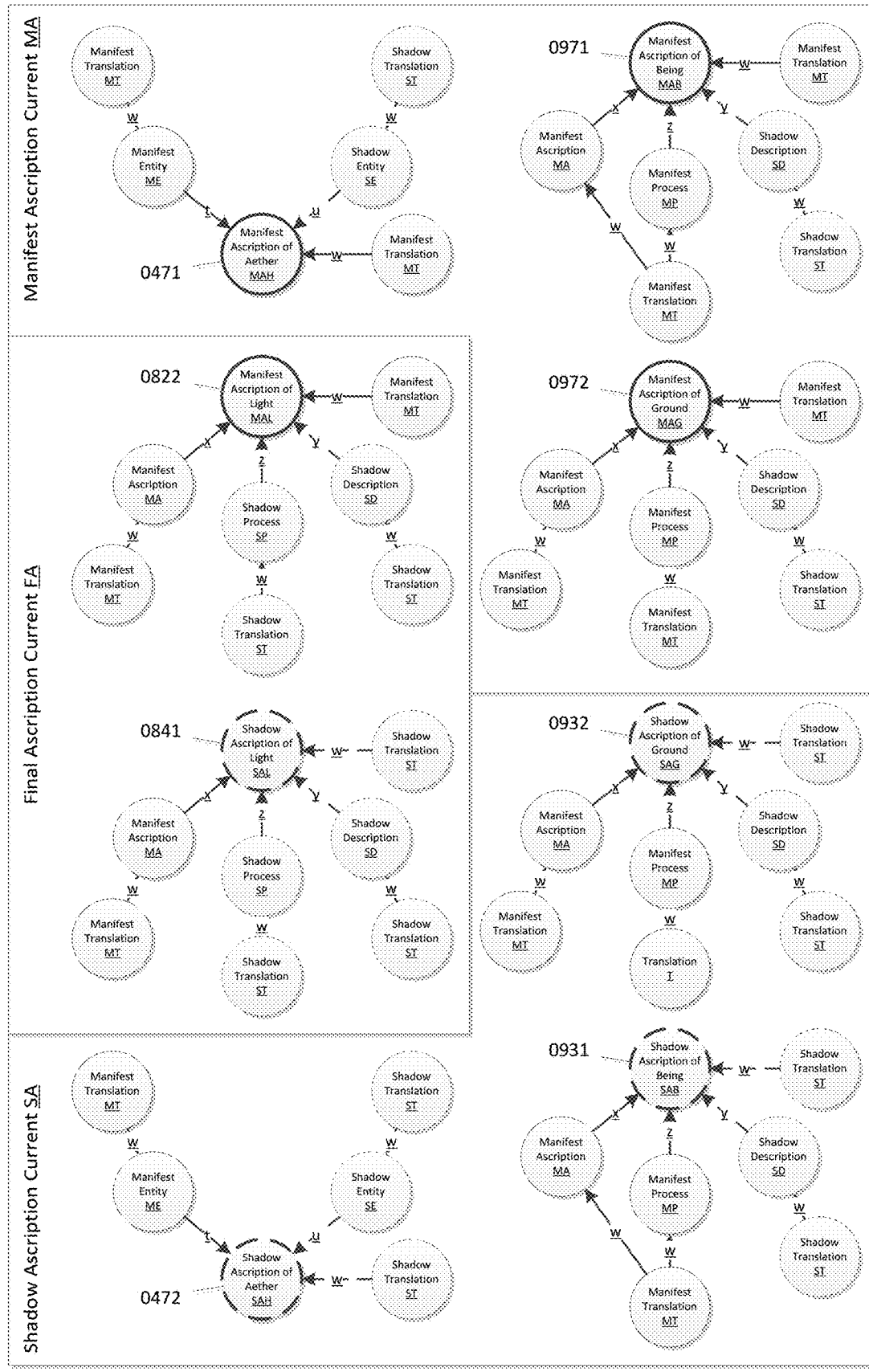
FIG. 5a is a schematic diagram of the graphical embodiment which teaches the scope of possible inputs to FIG. 5v at the Ascription Vertex A. The subdivision by depth into the shadow ascription current SA, the manifest ascription current MA, and the final ascription current FA is indicated by rectangular frames. Within each frame, the heavy-lined circles represent the possible logical outcomes—shadow depth in broken lines and manifest depth in solid lines. Note that by axiomatic definition, Final depth currents do not iterate.
Figure 5D:
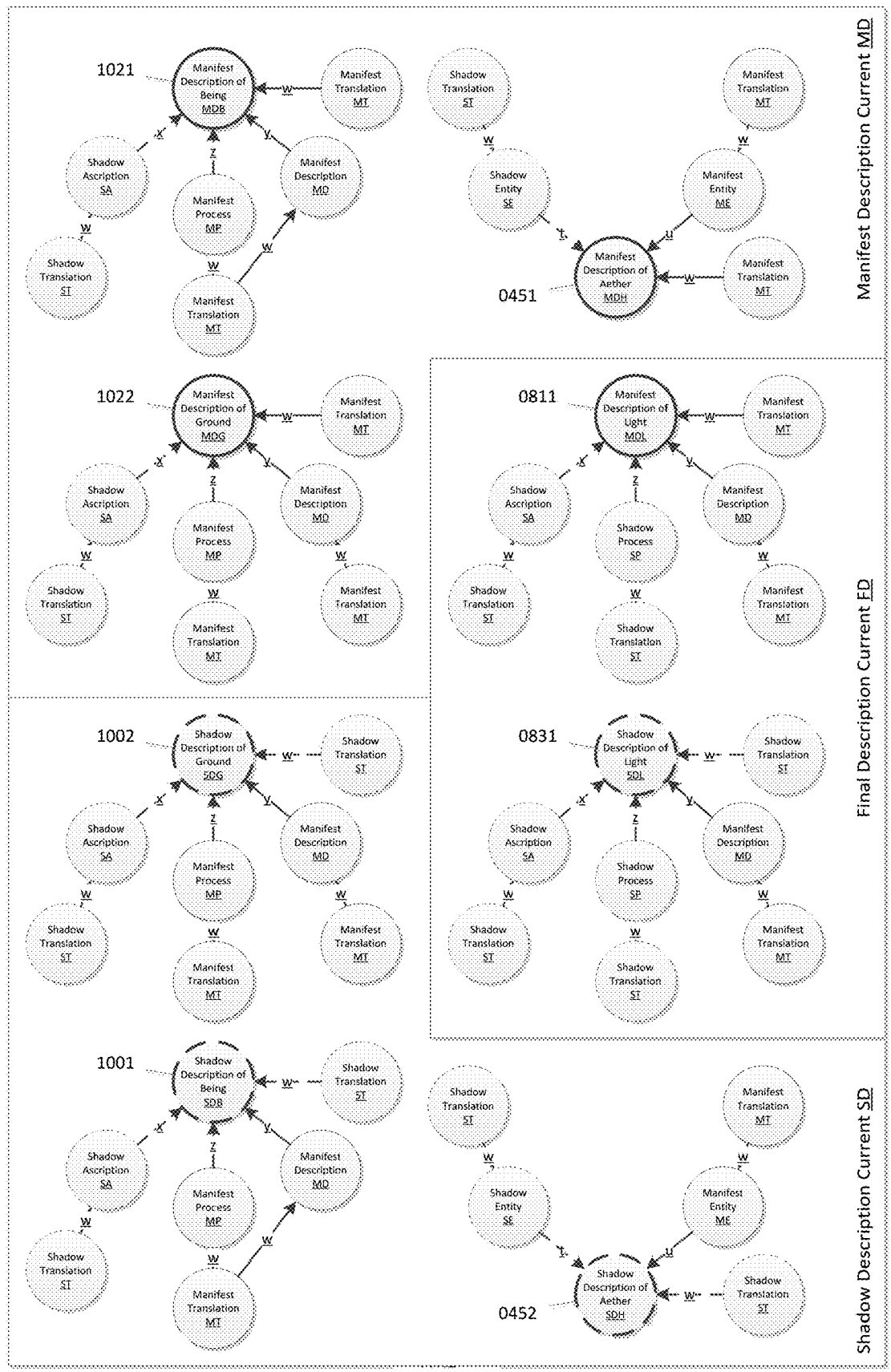
FIG. 5d is a schematic diagram of the graphical embodiment which teaches the scope of possible inputs to FIG. 5v at the Description Vertex D. The subdivision by depth into the shadow description current SD, the manifest description current MD, and the final description current FD is indicated by rectangular frames. Within each frame, the heavy-lined circles represent the possible logical outcomes—shadow depth in broken lines and manifest depth in solid lines. Note that by axiomatic definition, Final depth currents do not iterate.
Figure 5E:
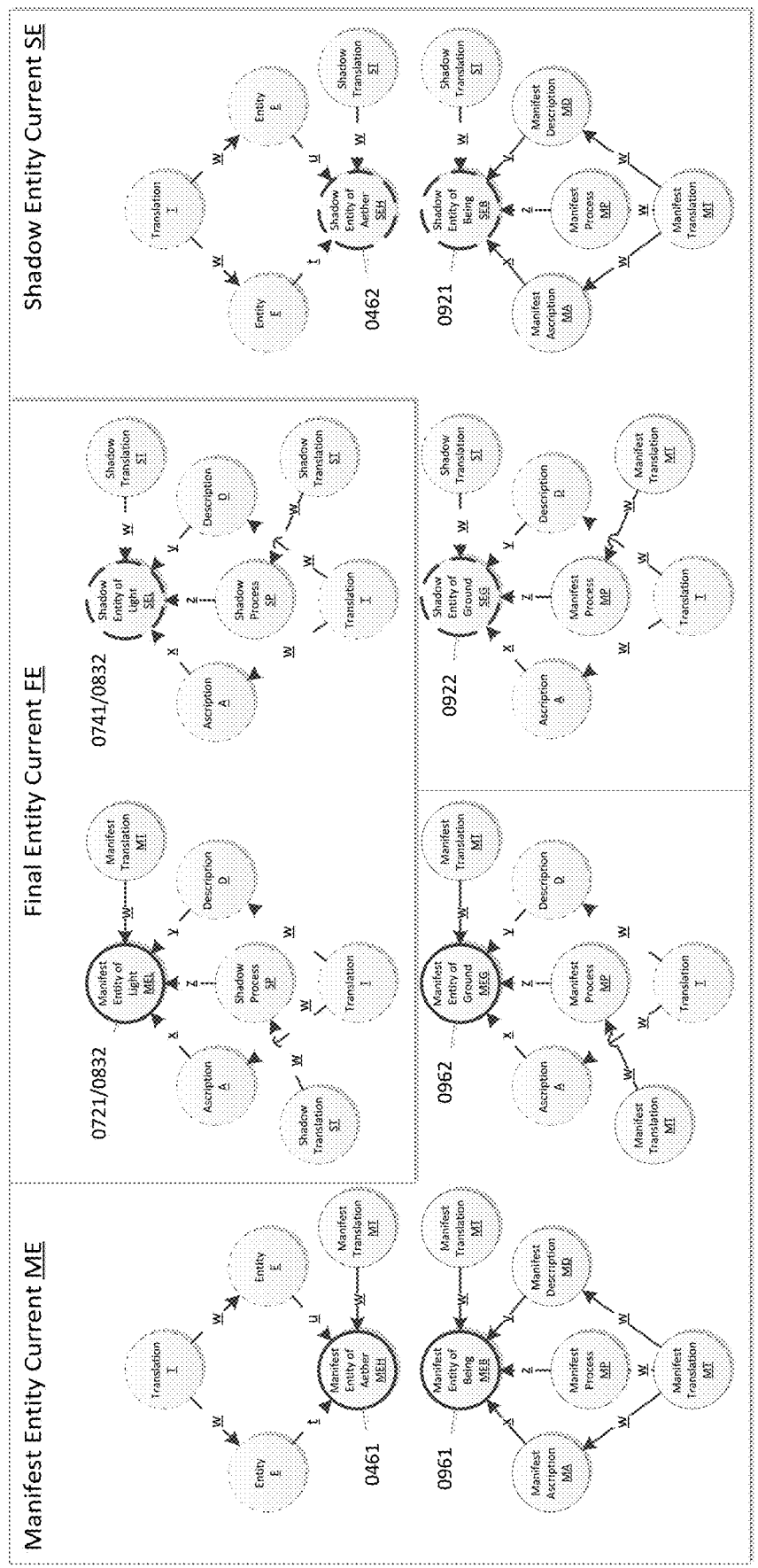
FIG. 5e is a schematic diagram of the graphical embodiment which teaches the scope of possible inputs to FIG. 5v at the Entity Vertex E. The subdivision by depth into the shadow entity current SE, the manifest entity current ME, and the final entity current FE is indicated by rectangular frames. Within each frame, the heavy-lined circles represent the possible logical outcomes—shadow depth in broken lines and manifest depth in solid lines. Note that by axiomatic definition, Final depth currents do not iterate.
Figure 5P:
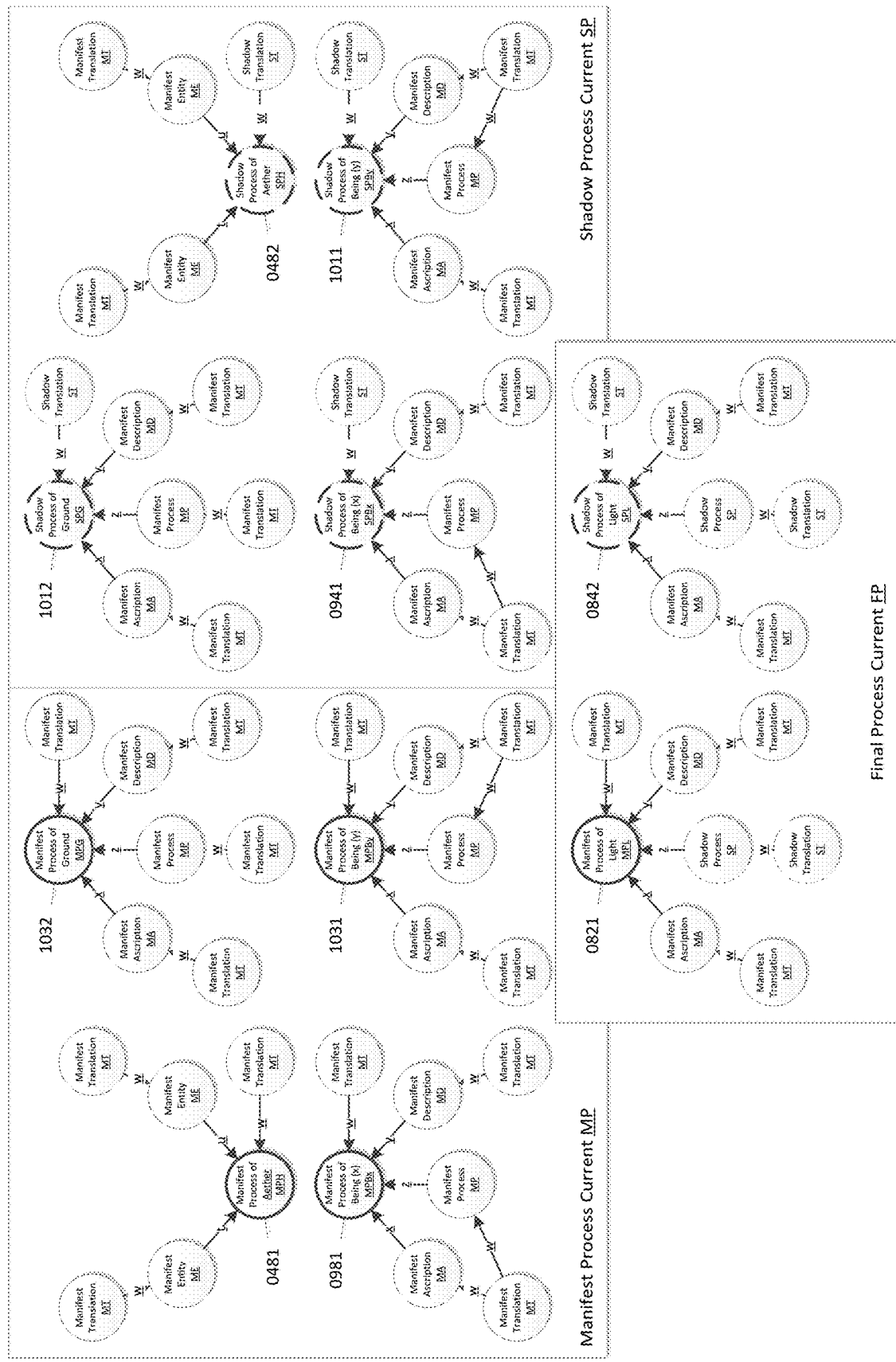
FIG. 5p is a schematic diagram of the graphical embodiment which teaches the scope of possible inputs to FIG. 5v at the Process Vertex P. The subdivision by depth into the shadow process current SP, the manifest process current MP, and the final process current FP is indicated by rectangular frames. Within each frame, the heavy-lined circles represent the possible logical outcomes—shadow depth in broken lines and manifest depth in solid lines. Note that by axiomatic definition, Final depth currents do not iterate.
Figure 5T:
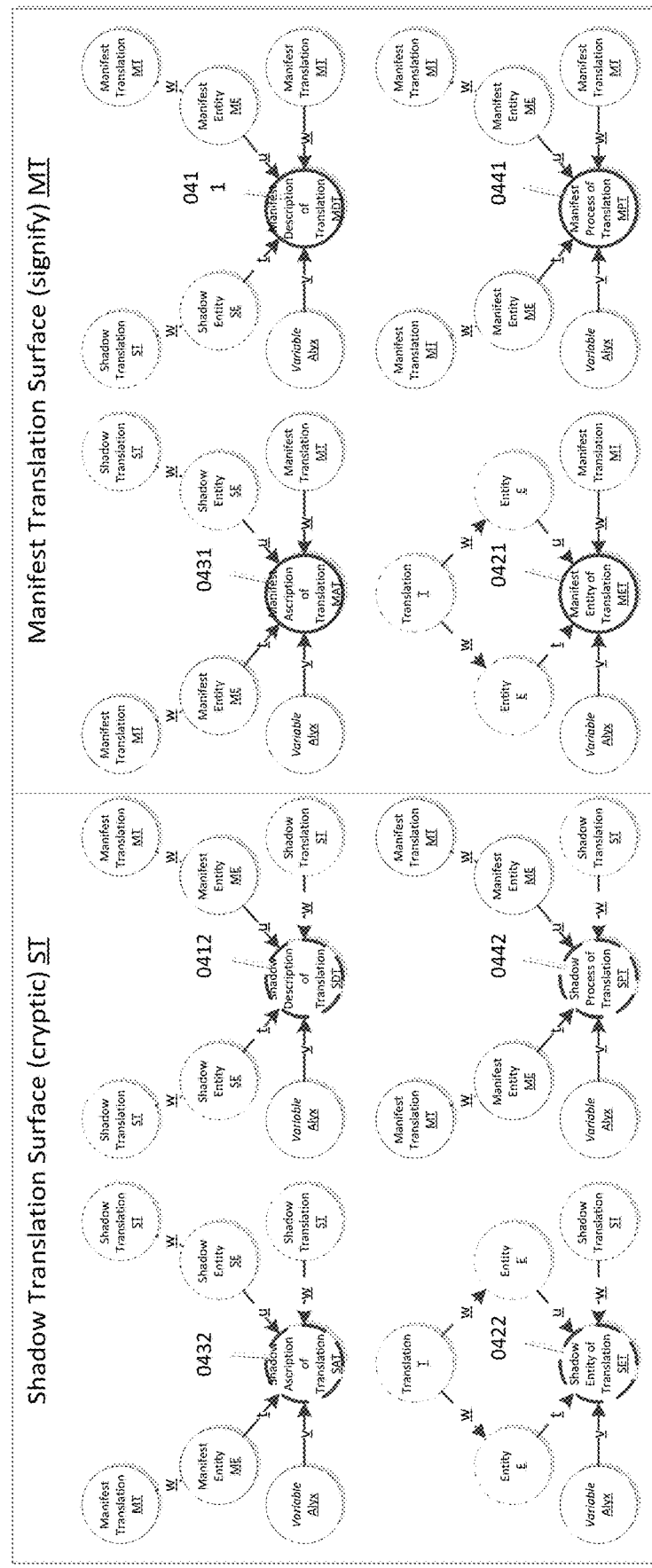
FIG. 5t is a schematic diagram of the graphical embodiment which teaches the scope of possible inputs to FIG. 5v at the Translation Vertex T. The subdivision by depth into the shadow translation/cryptic surface ST, and the manifest translation/signify surface MT is indicated by rectangular frames. Within each frame, the heavy-lined circles represent the possible logical outcomes—shadow depth in broken lines and manifest depth in solid lines.
Figure 5V:
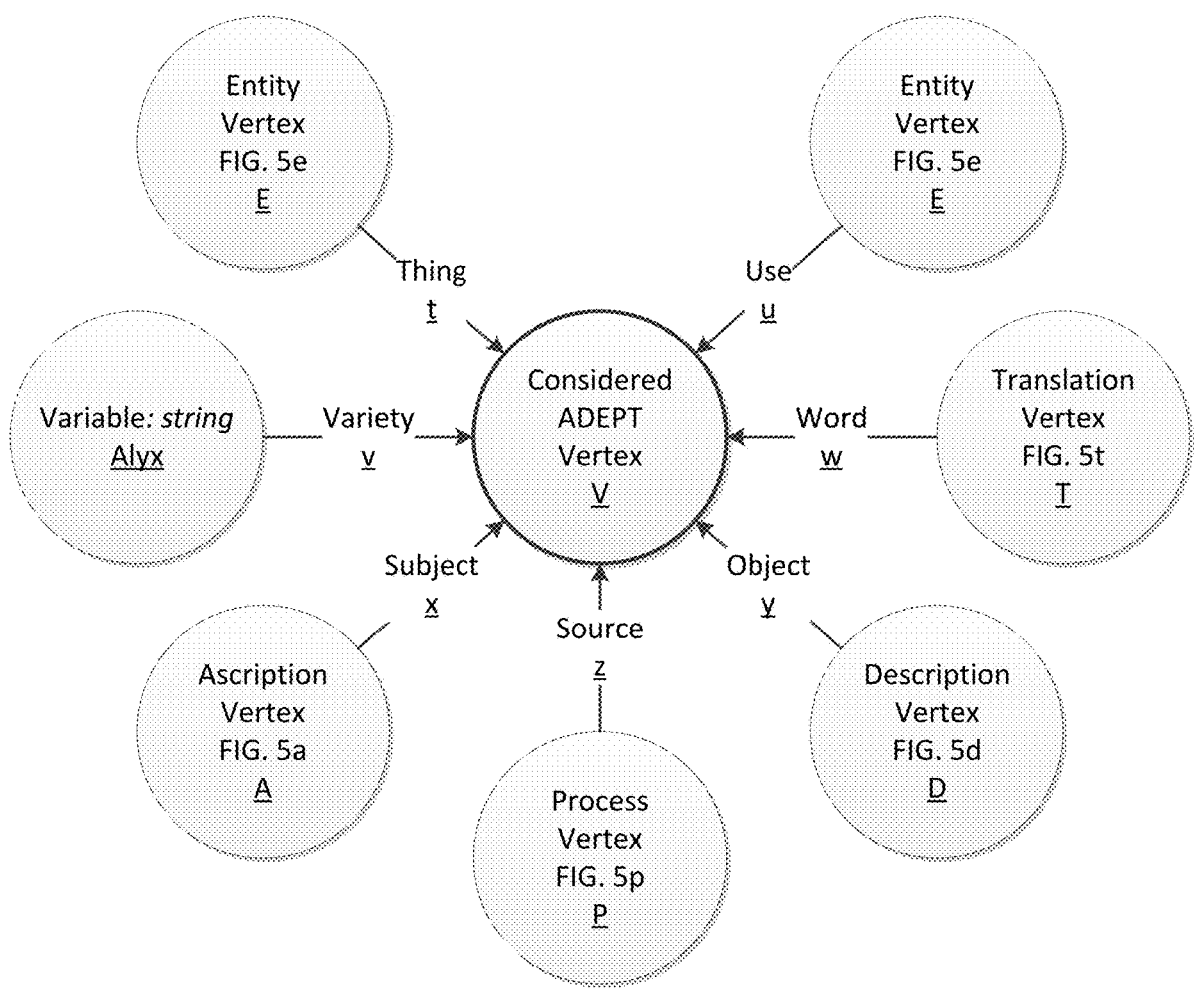
FIG. 5v is a schematic diagram of the graphical embodiment which identifies the ADEPT vertex at the center of the logical considerations. Each peripheral vertex references the position of the input as determined by the subsequent FIG. 5 diagrams.

FIG. 5v teaches that a "pool" is a notation applicable to every consideration of a vertex through one of four labels of A, D, E, and P.

FIG. 5v further teaches that a vertex is restricted in its iteration through channels of output edges according to its pool as follows.

A vertex of the ascription pool A, if iterative in a given consideration, may only iterate through a subject channel x.

A vertex of the description pool D, if iterative in a given consideration, may only iterate through an object channel y.

A vertex of the entity pool E, if iterative in a given consideration, may only iterate through a thing channel t or a use channel u.

A vertex of the process pool P, if iterative in a given consideration, may only iterate through a source channel z.

FIG. 5a teaches that a vertex is labeled a member of the "ascription pool" A, and conveys an intrinsic or inside-out sense, if it iterates from:

a manifest entity ME in its thing channel t but not a manifest entity ME in its use channel u in the first or second considerations, or a manifest ascription MA in its subject channel x but not a manifest description MD in its object channel y in the third consideration.

FIG. 5d teaches that a vertex is labeled a member of the "description pool" D, and conveys an extrinsic sense or outside-in perspective, if it iterates from:

a manifest entity ME in its use channel u but not a manifest entity ME in its thing channel t in the first or second considerations, or a manifest description MD in its object channel y but not a manifest ascription MA in its subject channel x in the third consideration.

FIG. 5e teaches that a vertex is labeled a member of the "entity pool" E, and conveys a congruent intrinsic and extrinsic sense—an immutable aspect—if it iterates from:

a shadow entity or non-existent entity E in both its thing channel t and its use channel u in the first or second considerations, or manifest entities ME in its thing channel t and use channel u that share a manifest translation MT in their word channels w in the first or second considerations, or a shadow or non-existent ascription A in its subject channel x and a shadow or non-existent description D in its object channel y in the third consideration, or a manifest ascription MA in its subject channel x and a manifest description MD in its object channel y that share a manifest translation MT in their word channels w in the third consideration.

FIG. 5p teaches that a vertex is labeled a member of the "process pool" P, and conveys an incongruent intrinsic and extrinsic sense—a mutable aspect—if it iterates from:

manifest entities ME in both its thing channel t and its use channel u that do not share a manifest translation MT in their word channels w in the first or second considerations, or a manifest ascription MA in its subject channel x and a manifest description MD in its object channel y that do not share a manifest translation MT in their word channels w in the third consideration.

Nature

A "nature" is a notation applicable to every vertex through one of five labels.

FIG. 5t teaches that a vertex is labeled a member of the "translation nature" T in the second consideration, having a sense of transcendence, if it has an input edge of a variety channel v.

Because the variety channel v is only part of the second consideration, any vertex of the translation nature T—having a variety channel v by definition—is also a member of the second consideration. Thus, "translation nature" T and "second consideration" are synonymous concepts for a particular set of vertices.

A vertex of the translation nature T and the second consideration, may only iterate through the output edges of a word channel w.

FIG. 5a, FIG. 5d, FIG. 5e, and FIG. 5p each teach that every vertex is labeled a member of the "aether nature", H, having a sense of originality in the first consideration.

FIG. 5a, FIG. 5d, FIG. 5e, and FIG. 5p each teach that a vertex in the third consideration is labeled a member of the "light nature", L, having a sense of passivity, if it lacks a manifest process MP as an input edge of its source channel z. Because the source channel z is only part of the third consideration, the light nature L is only possible in the third consideration. As has been stated in the depth axioms, the light nature L is synonymous with the final depth F.

FIG. 5a, FIG. 5d, FIG. 5e, and FIG. 5p each teach that a vertex in the third consideration is labeled as a member of the "ground nature", G, having a sense of productivity, if it has:

a manifest process MP as its input edge in the source channel z, but lacks either a manifest ascription MA as its input edge in the subject channel x or a manifest description MD as its input edge in the object channel y, either of which sharing a manifest translation MT in their word channels w with the manifest process MP.

FIG. 5a, FIG. 5d, FIG. 5e, and FIG. 5p each teach that a vertex in the third consideration is labeled as a member of the "being nature", B, having a sense of willfulness, if it has:

a manifest process MP as its input edge in the source channel z, and has either a manifest ascription MA as its input edge in the subject channel x or a manifest description MD as its input edge in the object channel y, one or both of which share a manifest translation MT in their word channels w with the manifest process MP.

Figure 7:
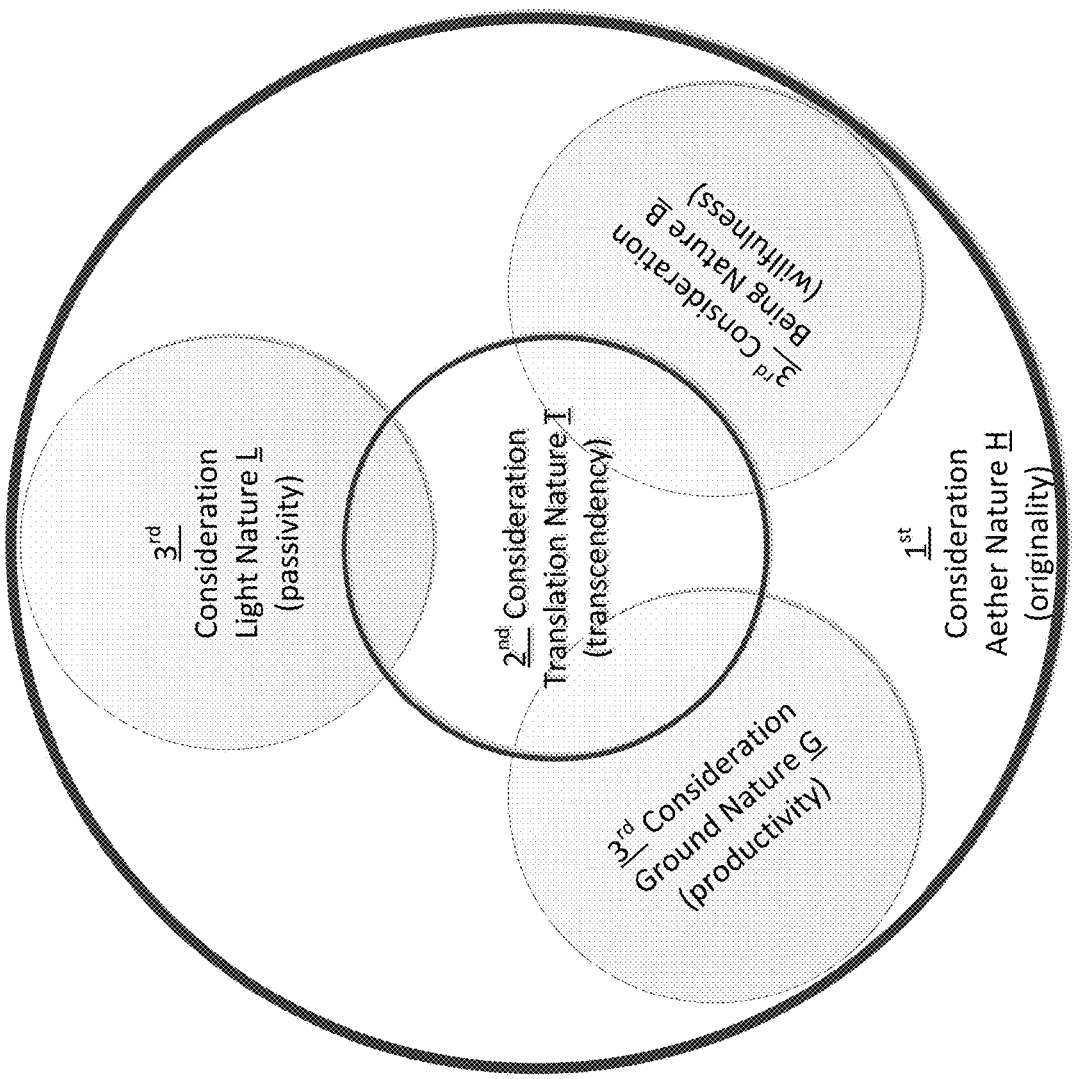
FIG. 7 is a Venn diagram of considerations and natures.

FIG. 7 is a Venn diagram showing the relationships between the considerations and natures of ADEPT. The thickest line representing the all-encompassing $1^{st}$ consideration and the aether nature H; the middle thickness line representing the potential co-existence of the $2^{nd}$ consideration/translation nature T, with the four other natures of aether H, light L, ground G and being B; and the thinnest-lined circles representing that all three of the $3^{rd}$ consideration natures, while mutually exclusive, are co-existent with the aether nature H/$1^{st}$ consideration as represented by the thinly lined circles encompassed by the thickest-lined circle.

Derivative Ontological Constructs

Given the axiomatic constructs of ADEPT, one can derive through corollaries, additional structures called derivative constructs that have ontological purpose set within the schema of ADEPT.

Figure 8:
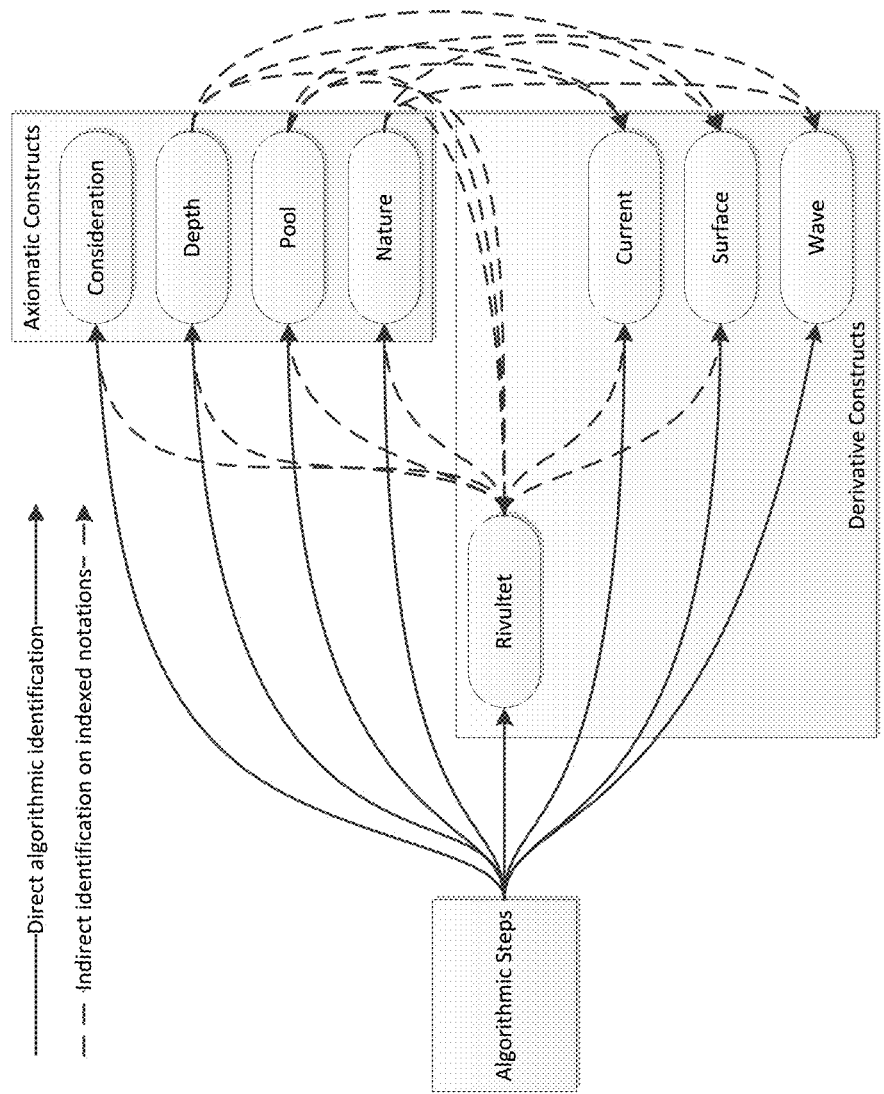
FIG. 8 is a flow chart illustrating the derivation of the four axiomatic and four derivative ontological constructs either directly through the algorithmic steps or indirectly through filtering on the indexed ontological notations.

FIG. 8 is a flowchart describing the direct and indirect methods of identifying the derivative constructs within an instance of ADEPT. The direct method involves identification of particular iterative patterns which will be discussed below under the discussion of the algorithmic steps. The indirect method involves searching for particular intersections of the indexed axiomatic notations of depth, pool, and nature. These particular intersections are as follows:

An intersection of depth and pool called "current", of which there are twelve types.

An intersection of depth and nature called "surface", of which there are ten types.

An intersection of pool and nature called "wave", of which there are twenty types.

An intersection of depth, pool, and nature called "rivulet", of which there are forty types.

Currents

Being an intersection of depth and pool, currents are abbreviated by concatenating their respective one letter abbreviations for depth and pool in that order. The functional purpose of the currents being indexed groupings of vertices by their trinary logical impact though input edges, which concerns only iterative relationships, the final depth F and light nature L vertices are excluded from the sets of vertices which make up the iterative currents.

The twelve currents and their constituent patterns of iteration are:

As FIG. 5a teaches, a manifest ascription current, MA, conveying through iteration, a logically-determinate intrinsic sense through a subject channel.

As FIG. 5a teaches, a shadow ascription current, SA, conveying through iteration, a logically-indeterminate intrinsic sense through a subject channel.

As FIG. 5a teaches, a final ascription current, FA, not conveying through iteration, an intrinsic sense.

As FIG. 5d teaches, a manifest description current, MD, conveying through iteration, a logically-determinate extrinsic sense through an object channel.

As FIG. 5d teaches, a shadow description current, SD, conveying through iteration, a logically-indeterminate extrinsic sense through an object channel.

As FIG. 5d teaches, a final description current, FD, not conveying through iteration, an extrinsic sense.

As FIG. 5e teaches, a manifest entity current, ME, conveying through iteration, a logically-determinate immutable sense through a thing or use channel.

As FIG. 5e teaches, a shadow entity current, SE, conveying through iteration, a logically-indeterminate immutable sense through a thing or use channel.

As FIG. 5e teaches, a final entity current, FE, not conveying through iteration, an immutable sense.

As FIG. 5p teaches, a manifest process current, MP, conveying through iteration, a logically-determinate mutable sense through a source channel.

As FIG. 5p teaches, a shadow process current, SP, conveying through iteration, a logically-indeterminate mutable sense through a source channel.

As FIG. 5p teaches, a final process current, FP, not conveying through iteration, a mutable sense.

Surfaces

Being an intersection of depth and nature, surfaces are abbreviated by concatenating their respective one letter abbreviations for depth and nature in that order. Surfaces have been given distinguishing names which allude to their roles within an information system. The functional purpose of the surfaces being indexed groupings of vertices by their role within an information system, the surfaces encompass all vertices of an ADEPT instance.

FIG. 9 is a matrix of ADEPT concepts which among other things, teaches the ten surfaces, identified by the labels below the columns as follows.

As FIG. 9 and FIG. 5t teach, a cryptic surface, ST, conveys through iteration, a logically-indeterminate transcendent semantic meaning through the edge of a word channel w. In an information system, the cryptic surface encompasses cryptography and information obfuscation;

As FIG. 9 and FIG. 5t teach, a signify surface, MT, conveying through iteration, a logically-determinate transcendent semantic through the edge of a word channel. In an information system, the signify surface encompasses content definitions and information encoding;

As FIG. 9 teaches, the Initiate surface, SH, functions as a collection of logically-indeterminate original components. In an information system the initiate surface encompasses indirect contextual search;

As FIG. 9 teaches, the assign surface MH, functions as a collection of logically-determinate original components. In an information system the assign surface encompasses direct contextual search;

As FIG. 9 teaches, the value surface SL, functions as a collection of logically-indeterminate passive components. In an information system the value surface encompasses the generation of metadata;

As FIG. 9 teaches, the record surface ML, functions as a collection of logically-determinate passive components. In an information system the record surface encompasses the generation of data;

As FIG. 9 teaches, the associate surface SG, functions as a collection of logically-indeterminate productive components. In an information system the associate surface encompasses interoperability of platforms or applications;

As FIG. 9 teaches, the implement surface MG, functions as a collection of logically-determinate productive components. In an information system the implement surface encompasses architecture for particular platforms or applications;

As FIG. 9 teaches, the integrate surface SB, functions as a collection of logically-indeterminate willful components. In an information system the integrate surface encompasses user management across domains; and As FIG. 9 teaches, the establish surface MB, functions as a collection of logically-determinate willful components. In an information system the establish surface encompasses user management for an individual domain.

Waves

FIG. 8 further teaches the derivative construct of wave. Being an intersection of pool and nature, the waves are abbreviated by concatenating their respective one letter abbreviations for pool and nature in that order. The purpose of a wave is to group ADEPT vertices that share permitted iteration paths and functional groupings regardless of their logical determinism. This distinction becomes important in the design and function of user interfaces utilizing an ADEPT instance. The twenty waves are as follows:

An ascription of translation, AT, a member of the collection of intrinsic transcendent semantics;

A description of translation, DT, a member of the collection of extrinsic transcendent semantics;

An entity of translation, ET, a member of the collection of immutable transcendent semantics;

A process of translation, PT, a member of the collection of mutable transcendent semantics;

An ascription of aether, AH, a member of the collection of intrinsic original aspects;

A description of aether, DH, a member of the collection of extrinsic original aspects;

An entity of aether, EH, a member of the collection of immutable original aspects;

A process of aether, PH, a member of the collection of mutable original aspects;

An ascription of ground, AG, a member of the collection of intrinsic productive aspects;

A description of ground, DG, a member of the collection of extrinsic productive aspects;

An entity of ground, EG, a member of the collection of immutable productive aspects;

A process of ground, PG, a member of the collection of mutable productive aspects;

An ascription of being, AB, a member of the collection of intrinsic willful aspects;

A description of being, DB, a member of the collection of extrinsic willful aspects;

An entity of being, EB, a member of the collection of immutable willful aspects;

A process of being, PB, a member of the collection of mutable willful aspects;

An ascription or light, AL, a member of the collection of intrinsic passive aspects;

A description of light, DL, a member of the collection of extrinsic passive aspects;

An entity of light, EL, a member of the collection of immutable passive aspects;

A process of light, PL, a member of the collection of mutable passive aspects;

Rivulets

Being an intersection of depth, pool and nature, rivulets are abbreviated by concatenating their respective one letter abbreviations for depth, pool and nature in that order. We will consider the indirect method of derivation from FIG. 8 here and the direct method later with the introduction of the algorithmic steps.

FIGS. 5v, 5a, 5d, 5e, 5p, and 5t represent the patterns of iteration necessary for derivation of the forty rivulets. Note that although there are 42 distinct patterns, there are only 40 rivulets because of the logical presence of two isomeric, or mirror-image, patterns in the processes of being which although distinguishable, have identical utility and are therefore each considered subtypes of one rivulet MPB(x/y) in the manifest depth M and one rivulet SPB(x/y) in the shadow depth S. One application of these isomeric rivulets is to express initiation and directionality when describing a transaction between two parties.

FIG. 5t diagrams the distinct iterative patterns of the following rivulets:

Vertex 0432, a mark rivulet SAT, is a vertex with the combination of a shadow depth S and an ascription pool A and a translation nature T.

Vertex 0412, a type rivulet SDT, is a vertex with the combination of a shadow depth S and a description pool D and a translation nature T.

Vertex 0422, a negation rivulet SET, is a vertex with the combination of a shadow depth S and an entity pool E and a translation nature T.

Vertex 0442, a token rivulet SPT, is a vertex with the combination of a shadow depth S and a process pool P and a translation nature T.

Vertex 0431, an index rivulet MAT, is a vertex with the combination of a manifest depth M and an ascription pool A and a translation nature T.

Vertex 0411, an icon rivulet MDT, is a vertex with the combination of a manifest depth M and a description pool D and a translation nature T.

Vertex 0421, a sign rivulet MET, is a vertex with the combination of a manifest depth M and an entity pool E and a translation nature T.

Vertex 0441, a symbol rivulet MPT, is a vertex with the combination of a manifest depth M and a process pool P and a translation nature T.

FIG. 5a diagrams the distinct iterative patterns of the following rivulets:

Vertex 0472, a essence rivulet SAH, is a vertex with the combination of a shadow depth S, an ascription pool A and an aether nature H.

Vertex 0471, an identity rivulet MAH, is a vertex with the combination of a manifest depth M, an ascription pool A and an aether nature H.

Vertex 0841, a projection rivulet SAL, is a vertex with the combination of a shadow depth S, an ascription pool A and a light nature L.

Vertex 0822, an emanation rivulet MAL, is a vertex with the combination of a manifest depth M, an ascription pool A and a light nature L.

Vertex 0932, an item rivulet SAG, is a vertex with the combination of a shadow depth S, an ascription pool A and a ground nature G.

Vertex 0972, a label rivulet MAG, is a vertex with the combination of a manifest depth M, an ascription pool A and a ground nature G.

Vertex 0931, a persona rivulet SAB, is a vertex with the combination of a shadow depth S, an ascription pool A and a being nature B.

Vertex 0971, a name rivulet MAB, is a vertex with the combination of a manifest depth M, an ascription pool A and a being nature B.

FIG. 5d diagrams the distinct iterative patterns of the following rivulets:

Vertex 0452, a purpose rivulet SDH, is a vertex with the combination of a shadow depth S, a description pool D and an aether nature H.

Vertex 0451, a kind rivulet MDH, is a vertex with the combination of a manifest depth M, a description pool D and an aether nature H.

Vertex 0831, a reflection rivulet SDL, is a vertex with the combination of a shadow depth S, a description pool D and a light nature L.

Vertex 0811, an illumination rivulet MDL, is a vertex with the combination of a manifest depth M, a description pool D and a light nature L.

Vertex 1012, a genre rivulet SDG, is a vertex with the combination of a shadow depth S, a description pool D and a ground nature G.

Vertex 1032, a form rivulet MDG, is a vertex with the combination of a manifest depth M, a description pool D and a ground nature G.

Vertex 1011, a character rivulet SDB, is a vertex with the combination of a shadow depth S, a description pool D and a being nature B.

Vertex 1031, an attribute rivulet MDB, is a vertex with the combination of a manifest depth M, a description pool D and a being nature B.

FIG. 5e diagrams the distinct iterative patterns of the following rivulets:

Vertex 0462, a notion rivulet SEH, is a vertex with the combination of a shadow depth S, an entity pool E and an aether nature H.

Vertex 0461, a theory rivulet MEH, is a vertex with the combination of a manifest depth M, an entity pool E and an aether nature H.

Vertex 0741/0832 (logically equivalent but distinct patterns), a singularity rivulet SEL, is a vertex with the combination of a shadow depth S, an entity pool E and a light nature L.

Vertex 0721/0812 (logically equivalent but distinct patterns), a vision rivulet MEL, is a vertex with the combination of a manifest depth M, an entity pool E and a light nature L.

Vertex 0922, a concept rivulet SEG, is a vertex with the combination of a shadow depth S, an entity pool E and a ground nature G.

Vertex 0962, an element rivulet MEG, is a vertex with the combination of a manifest depth M, an entity pool E and a ground nature G.

Vertex 0921, a condition rivulet SEB, is a vertex with the combination of a shadow depth S, an entity pool E and a being nature B.

Vertex 0961, a language rivulet MEB, is a vertex with the combination of a manifest depth M, an entity pool E and a being nature B.

FIG. 5p diagrams the distinct iterative patterns of the following rivulets:

Vertex 0482, an action rivulet SPH, is a vertex with the combination of a shadow depth S, a process pool P and an aether nature H.

Vertex 0481, a cause rivulet MPH, is a vertex with the combination of a manifest depth M, a process pool P and an aether nature H.

Vertex 0842, a radiation rivulet SPL, is a vertex with the combination of a shadow depth S, a process pool P and a light nature L.

Vertex 0821, a point rivulet MPL, is a vertex with the combination of a manifest depth M, a process pool P and a light nature L.

Vertex 1022, a position rivulet SPG, is a vertex with the combination of a shadow depth S, a process pool P and a ground nature G.

Vertex 1042, an order rivulet MPG, is a vertex with the combination of a manifest depth M, a process pool P and a ground nature G.

Vertex 0941, a subjective interaction rivulet SPBx, is a vertex with the combination of a shadow depth S, a process pool P and a subjective being nature B in which the ascription of the subject channel and process of the source channel share the same manifest translation in their word channels.

Vertex 1021, an objective interaction rivulet MPBy, is a vertex with the combination of a shadow depth S, a process pool P and an objective being nature B in which the description of the object channel and process of the source channel share the same manifest translation in their word channels.

Vertex 0981, a subjective relation rivulet MPBx, is a vertex with the combination of a manifest depth M, a process pool P and a subjective being nature B in which the ascription of the subject channel and process of the source channel share the same manifest translation in their word channels.

Vertex 1041, an objective relation rivulet MPBy, is a vertex with the combination of a manifest depth M, a process pool P and an objective being nature B in which the description of the object channel and process of the source channel share the same manifest translation in their word channels.

Operation

Algorithmic Steps

Figure 10A:
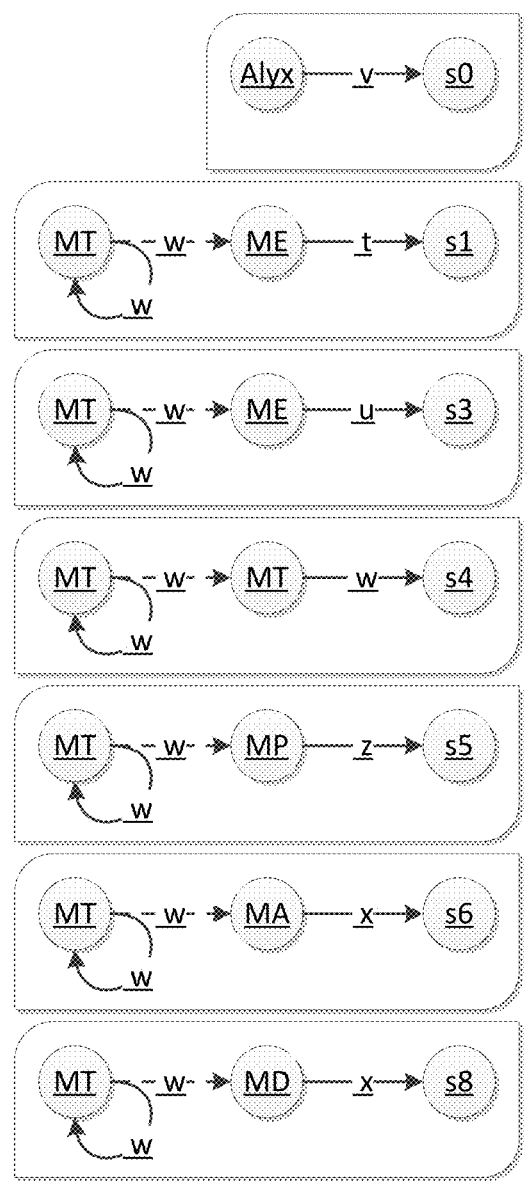
FIG. 10a illustrates the seven algorithmic steps of existence found in the invention and identified by the numbers zero through ten and an "s" prefix.
Figure 10B:
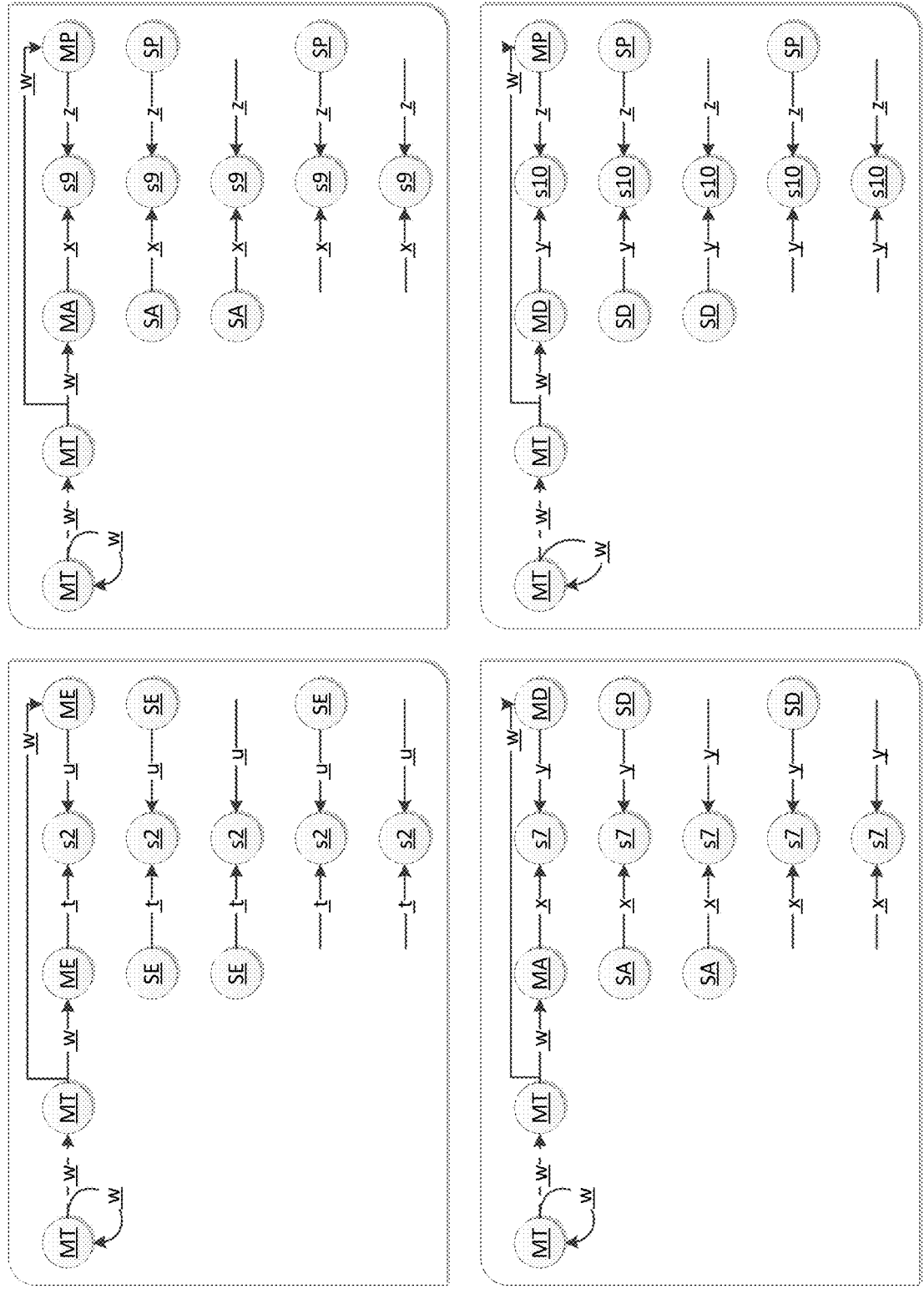
FIG. 10b illustrates the four algorithmic steps of equivalence found in the invention and identified by the numbers zero through ten and an "s" prefix.

FIG. 10 diagrams the schema of an ADEPT graph as it pertains to the patterns from which are derived the eleven algorithmic steps identified by the abbreviations s0-s10. In order to concisely sequence the application of three-value logic to an ADEPT instance and in order to programmatically derive and apply the indexed notations found within the ADEPT axiomatic, corollary and derivative constructs, one can utilize the eleven algorithmic steps. Each step represents a particular question made of the finite patterns formed by the ADEPT vertices and edges. The steps provide a predictable bridge between the meaningful patterns and the operation of an ADEPT instance by an interfacing user as demonstrated in FIG. 14.

FIG. 6 illustrates that the algorithmic steps have one of two focuses: existence or equivalence. If a step has a focus of existence it can be evaluated as having three possible results of true/false/indeterminate standing for "existent"/"non-existent"/"indeterminate existence." The "indeterminate" result indicates the presence of a shadow vertex somewhere in the evaluated pattern. If a step has a focus of equivalence it can be evaluated as having three possible results of true/false/indeterminate standing for "equal"/"unequal"/"indeterminate equality." The "indeterminate" result again indicates the presence of a shadow vertex somewhere in the evaluated pattern. In either case of equivalence or equality, the latter two of the three possible results are treated as logically equivalent.

The eleven algorithmic steps consist of the following eleven questions. The questions and their logical responses as stated here will also apply where the step abbreviation is used in FIGS. 12a-h.

Step s0 asks whether there exists an Alyx vertex—by definition having a variable property—that iterates through a variety channel v to the considered vertex. If so, the s0 step is existent/true. If there is no input edge of a variety channel v, then the s0 step is non-existent/false. There is no indeterminate state for step s0.

Step s1 asks whether there exists a manifest entity vertex ME, by definition having an ancestral self-iterating manifest translation MT along its semantic edge of the word channel w, which iterates through its input edge of the thing channel t. If so, the s1 step is existent/true. If not, the s1 step is non-existent/false. If there is a thing channel t, but it iterates from a shadow entity SE, then the s1 step is indeterminate.

Step s2 asks whether there is logical equivalence between the input edges of the thing channel t and the use channel u. There are 5 patterns which evaluate to equivalent/true. The first pattern is that there exists one or two manifest entities ME iterating through the input edges of the thing channel t and use channel u which share the same manifest translation MT iterating through their input edge(s) of the word channel w. The second pattern is that there exists one or two shadow entities SE iterating through the input edges of the thing channel t and use channel u. The third pattern is that there exists only one shadow entity SE iterating through the input edge of the thing channel t and there is no input edge of the use channel u. The fourth pattern is that there exists only one shadow entity SE iterating through the input edge of the use channel u and there is no input edge of the thing channel t. The fifth pattern is that there is no input edge of the thing channel t or use channel u.

Step s3 asks whether there exists a manifest entity vertex ME, by definition having an ancestral self-iterating manifest translation MT along its semantic edge of the word channel w, which iterates through its input edge of the use channel u. If so, the s3 step is existent/true. If not, the s3 step is non-existent/false. If there is a use channel u, but it iterates from a shadow entity SE, then the s3 step is indeterminate.

Step s4 asks whether there exists a manifest translation vertex MT, by definition having an ancestral self-iterating manifest translation MT along its semantic edge of the word channel w, which iterates through its input edge of the word channel w. If so, the s4 step is existent/true. If not, the s4 step is non-existent/false. If there is a word channel w, but it iterates from a shadow translation ST, then the s4 step is indeterminate.

Step s5 asks whether there exists a manifest process vertex MP, by definition having an ancestral self-iterating manifest translation MT along its semantic edge of the word channel w, which iterates through its input edge of the source channel z. If so, the s5 step is existent/true. If not, the s5 step is non-existent/false. If there is a source channel z, but it iterates from a shadow process SP, then the s5 step is indeterminate.

Step s6 asks whether there exists a manifest ascription vertex MA, by definition having an ancestral self-iterating manifest translation MT along its semantic edge of the word channel w, which iterates through its input edge of the subject channel x. If so, the s6 step is existent/true. If not, the s6 step is non-existent/false. If there is a subject channel x, but it iterates from a shadow ascription SA, then the s6 step is indeterminate.

Step s7 asks whether there is logical equivalence between the input edges of the subject channel x and the object channel y. There are five patterns which evaluates to equivalent/true. The first pattern is that there exists a manifest ascription MA iterating through the input edge of the subject channel x and a manifest description MD iterating through the input edge of the object channel y which share the same manifest translation MT iterating through their input edges of the word channel w. The second pattern is that there exists a shadow ascription SA iterating through the input edge of the subject channel y and a shadow description SD iterating through the input edge of the object channel y. The third pattern is that there exists only one shadow ascription SA iterating through the input edge of the subject channel x and there is no input edge of the object channel y. The fourth pattern is that there exists only one shadow description SD iterating through the input edge of the object channel y and there is no input edge of the subject channel x. The fifth is that there is no input edge of the subject channel x or object channel y.

Step s8 asks whether there exists a manifest description vertex MD, by definition having an ancestral self-iterating manifest translation MT along its semantic edge of the word channel w, which iterates through its input edge of the object channel y. If so, the s8 step is existent/true. If not, the s8 step is non-existent/false. If there is an object channel y, but it iterates from a shadow description SD, then the s8 step is indeterminate.

Step s9 asks whether there is logical equivalence between the input edges of the subject channel x and the source channel z. There are five patterns which evaluates to equivalent/true. The first pattern is that there exists a manifest ascription MA iterating through the input edge of the subject channel x and a manifest process MP iterating through the input edge of the source channel z which share the same manifest translation MT iterating through their input edges of the word channel w. The second pattern is that there exists a shadow ascription SA iterating through the input edge of the subject channel y and a shadow process SP iterating through the input edge of the source channel z. The third pattern is that there exists only one shadow ascription SA iterating through the input edge of the subject channel x and there is no input edge of the source channel z. The fourth pattern is that there exists only one shadow process SP iterating through the input edge of the source channel z and there is no input edge of the subject channel x. The fifth is that there is no input edge of the subject channel x or source channel z.

Step s10 asks whether there is logical equivalence between the input edges of the object channel y and the source channel z. There are five patterns which evaluates to equivalent/true. The first pattern is that there exists a manifest description MD iterating through the input edge of the object channel y and a manifest process MP iterating through the input edge of the source channel z which share the same manifest translation MT iterating through their input edges of the word channel w. The second pattern is that there exists a shadow description SD iterating through the input edge of the object channel y and a shadow process SP iterating through the input edge of the source channel z. The third pattern is that there exists only one shadow description SD iterating through the input edge of the object channel y and there is no input edge of the source channel z. The fourth pattern is that there exists only one shadow process SP iterating through the input edge of the source channel z and there is no input edge of the object channel y. The fifth is that there is no input edge of the object channel y or source channel z.

Figure 11A:
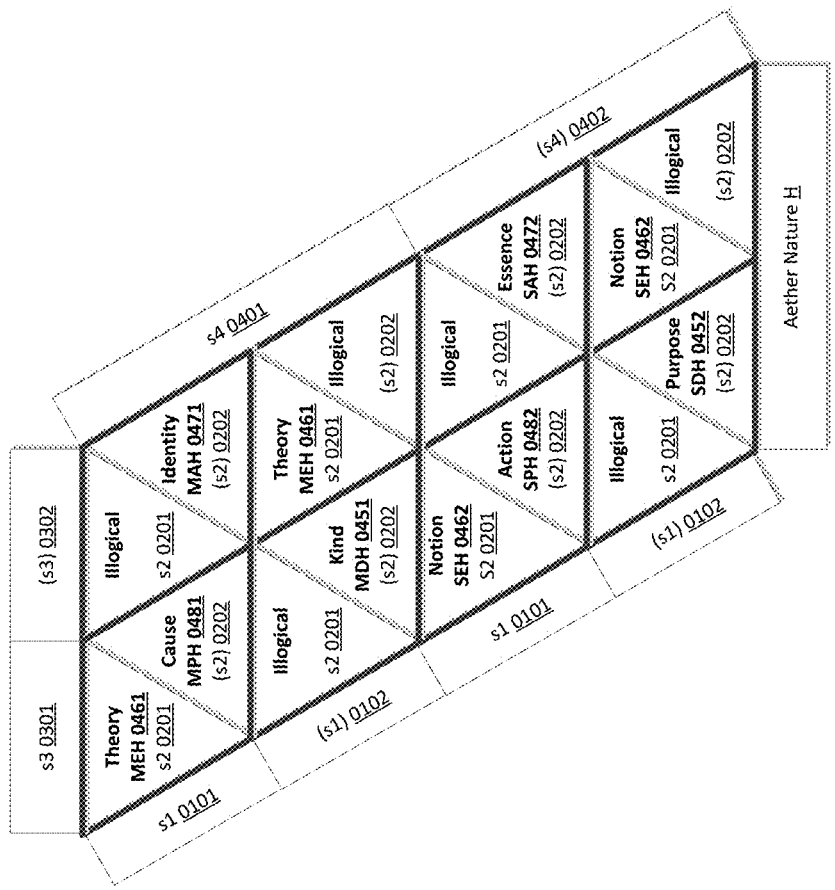
FIG. 11a illustrates the first consideration of the algorithmic steps to logically derive the aether nature and its eight rivulets. An algorithmic step with a negative logical result of "non-existent", "unequal" or "indeterminate" is signified by parenthesis around the step abbreviation. The affirmative logical result is signified by a step abbreviation without parenthesis. Illogical outcomes are indicated as "Illogical."
Figure 11B:
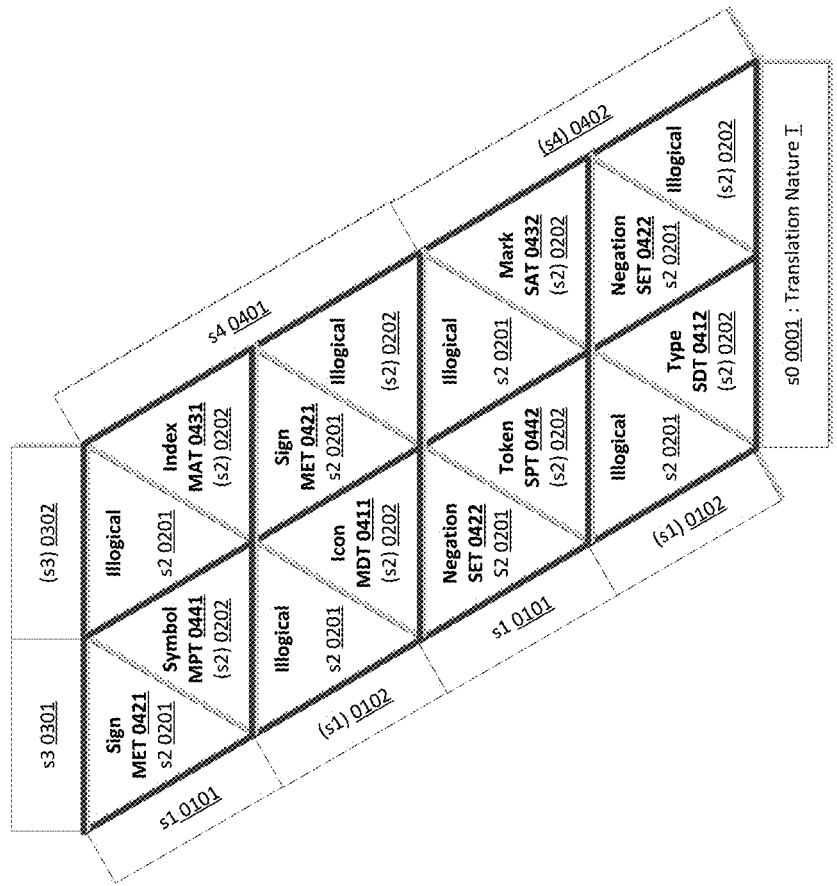
FIG. 11b illustrates the second consideration of the algorithmic steps to logically derive the translation nature its eight rivulets. An algorithmic step with a negative logical result of "non-existent", "unequal" or "indeterminate" is signified by parenthesis around the step abbreviation. The affirmative logical result is signified by a step abbreviation without parenthesis. Illogical outcomes are indicated as "Illogical."
Figure 12A:
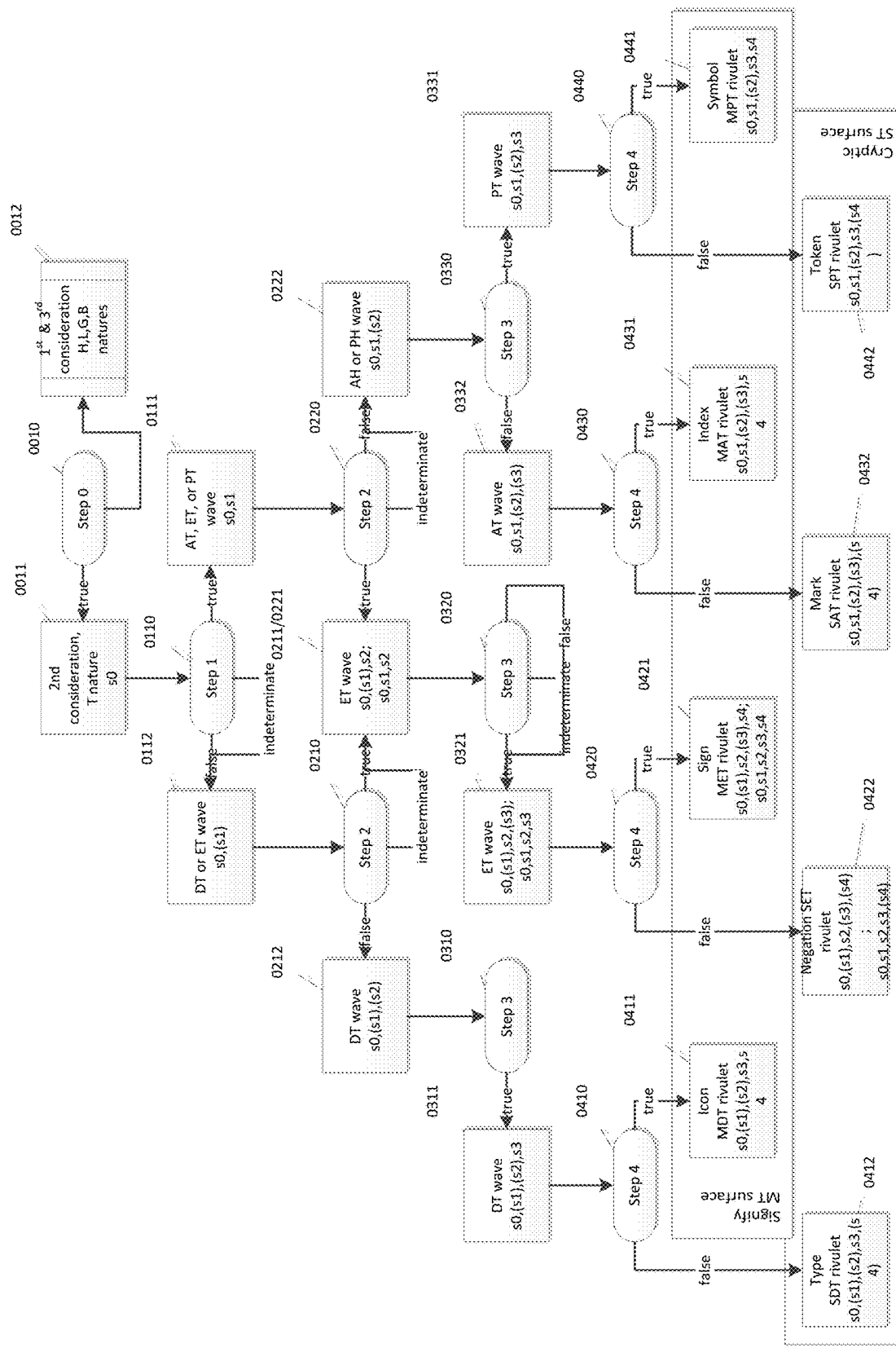
FIGS. 12a, 12b, 12c, 12d, 12e, 12f, 12g and 12h form a single flowchart illustrating the direct method of algorithmic derivation of the forty ontological vertex types called rivulets. Rectangles represent logical outcomes and rounded rectangles represent the algorithmic steps in the form of a true/false/indeterminate query statement of three-value logic concerning either existence or equivalence. Rectangles with additional vertical bars represent off-figure references. Along with the rivulet abbreviations, the cumulative step results are indicated in each logical outcome such that false evaluations are shown with ellipses around the step abbreviation and true evaluations do not have ellipses around the step abbreviation. Indeterminate results are either shown with ellipses when pertinent to the logical consideration of the step or may be omitted if they do not pertain or are logically redundant.
Figure 12B:
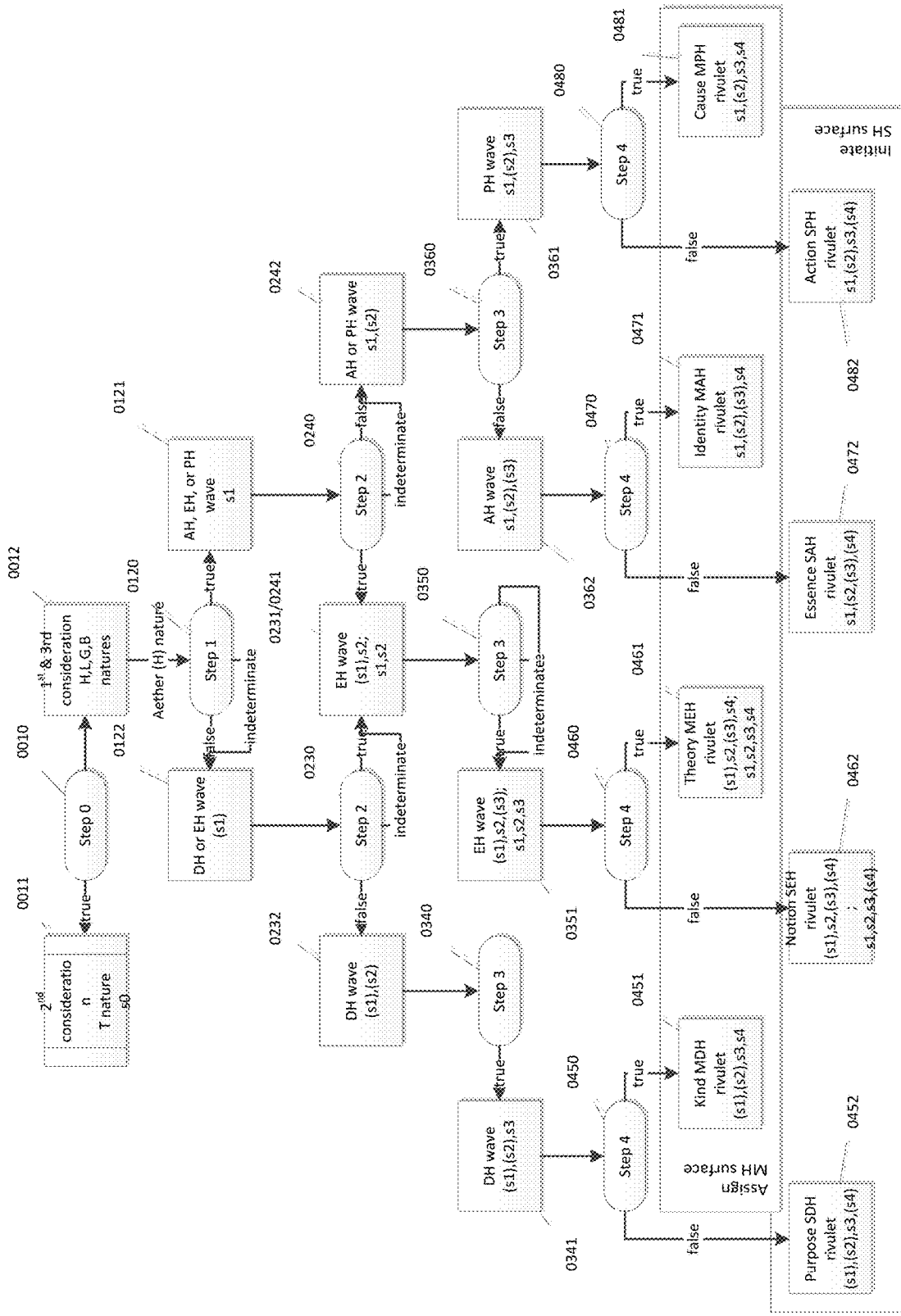
Figure 12C:
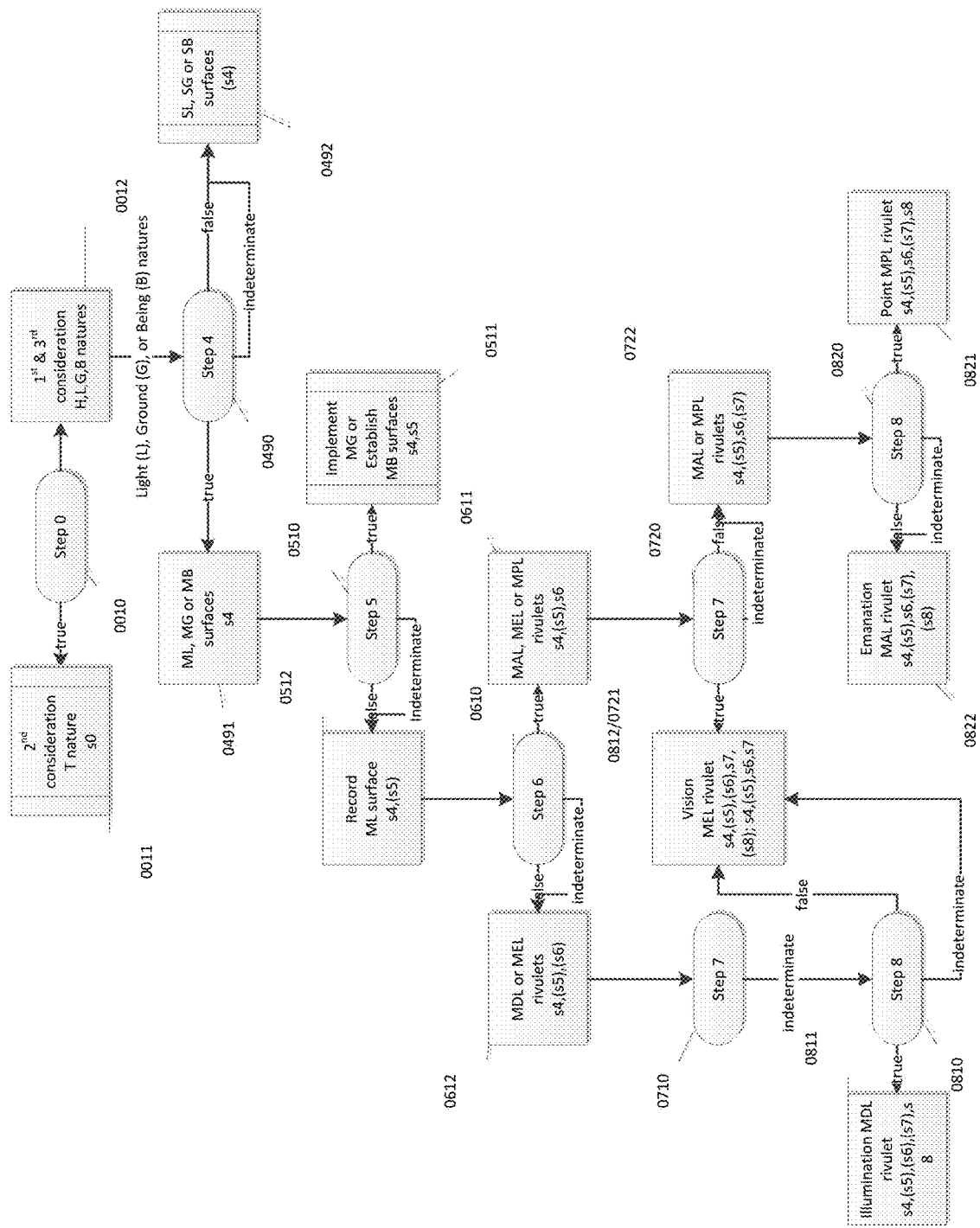
Figure 12D:
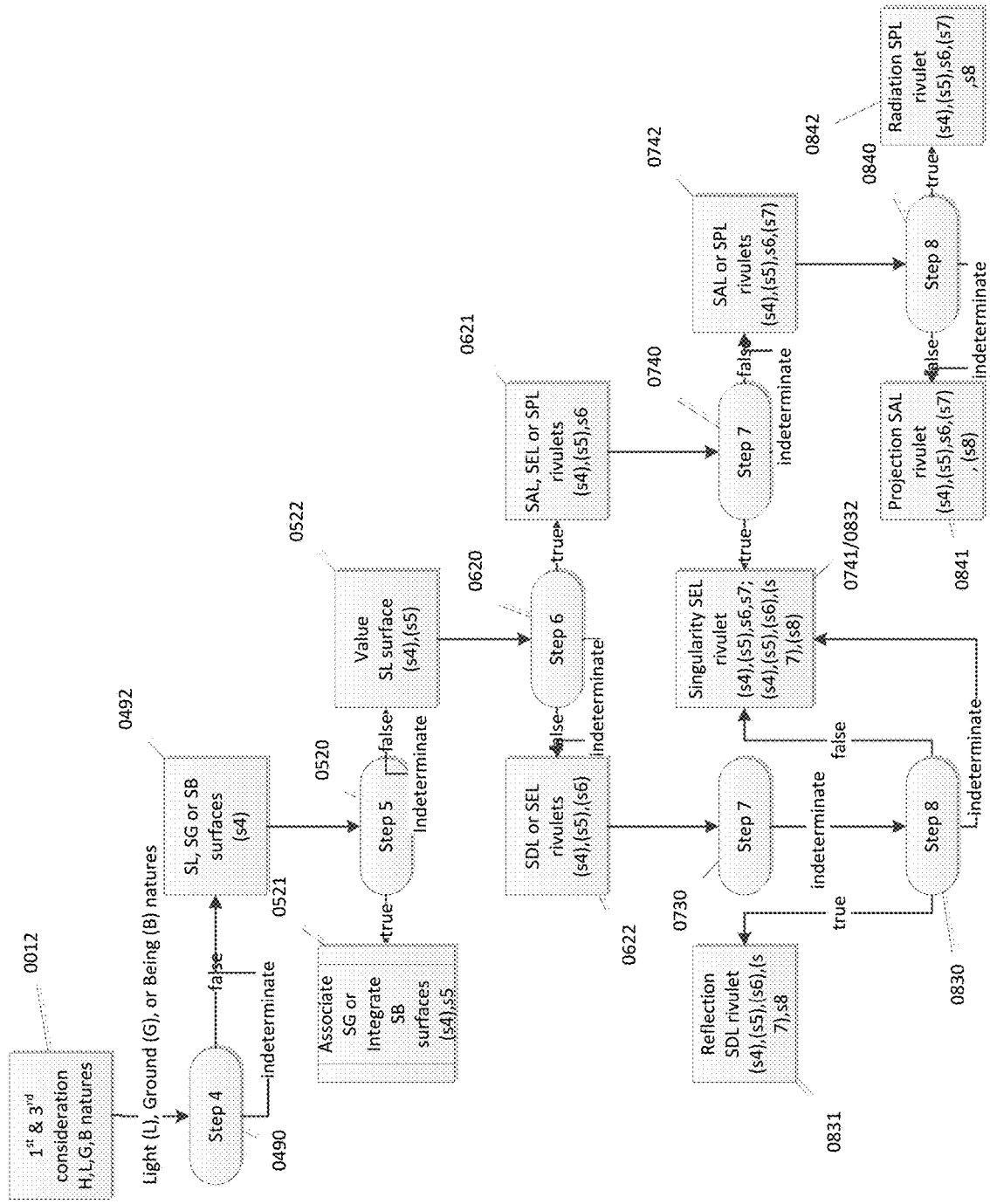
Figure 12E:
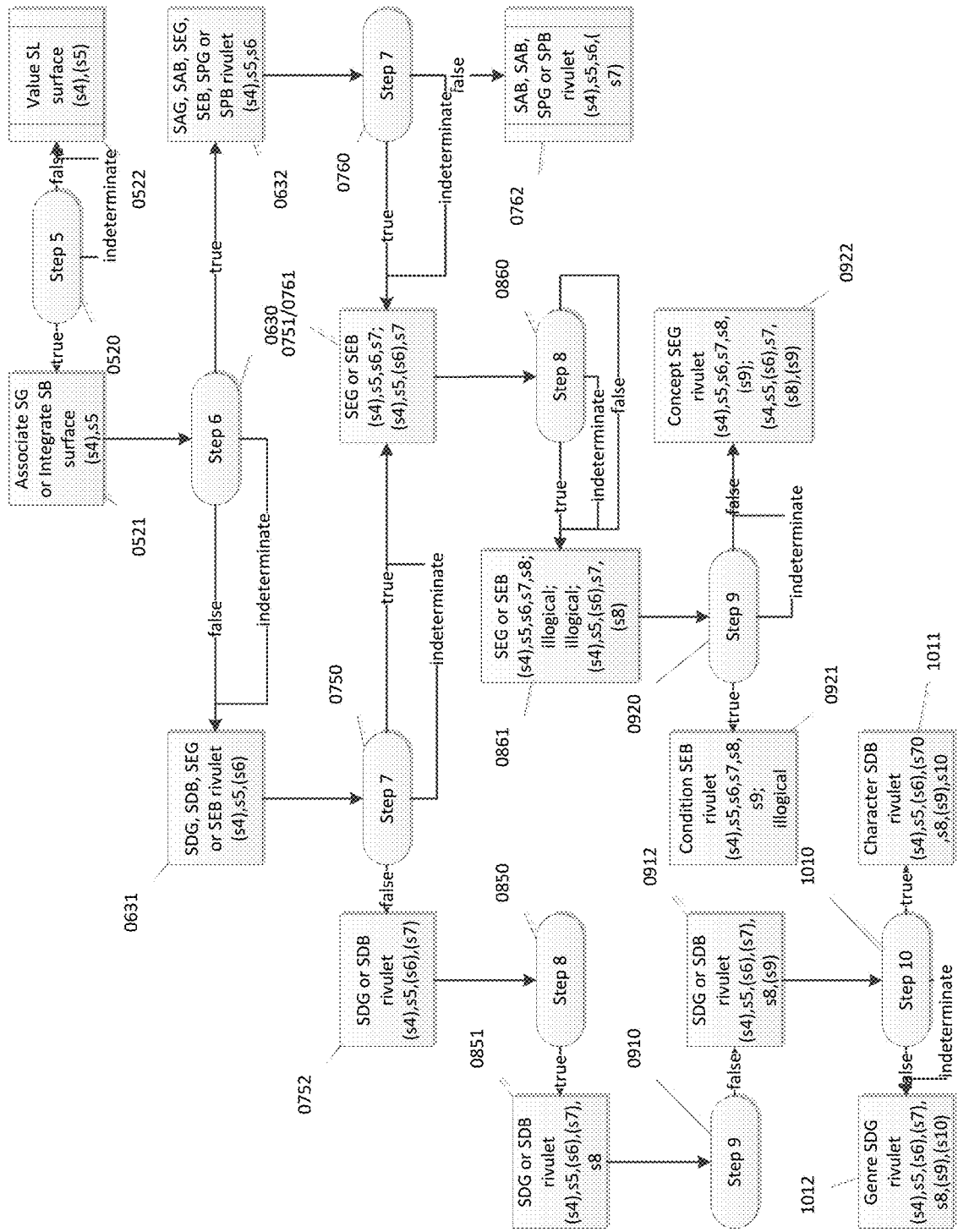
Figure 12F:
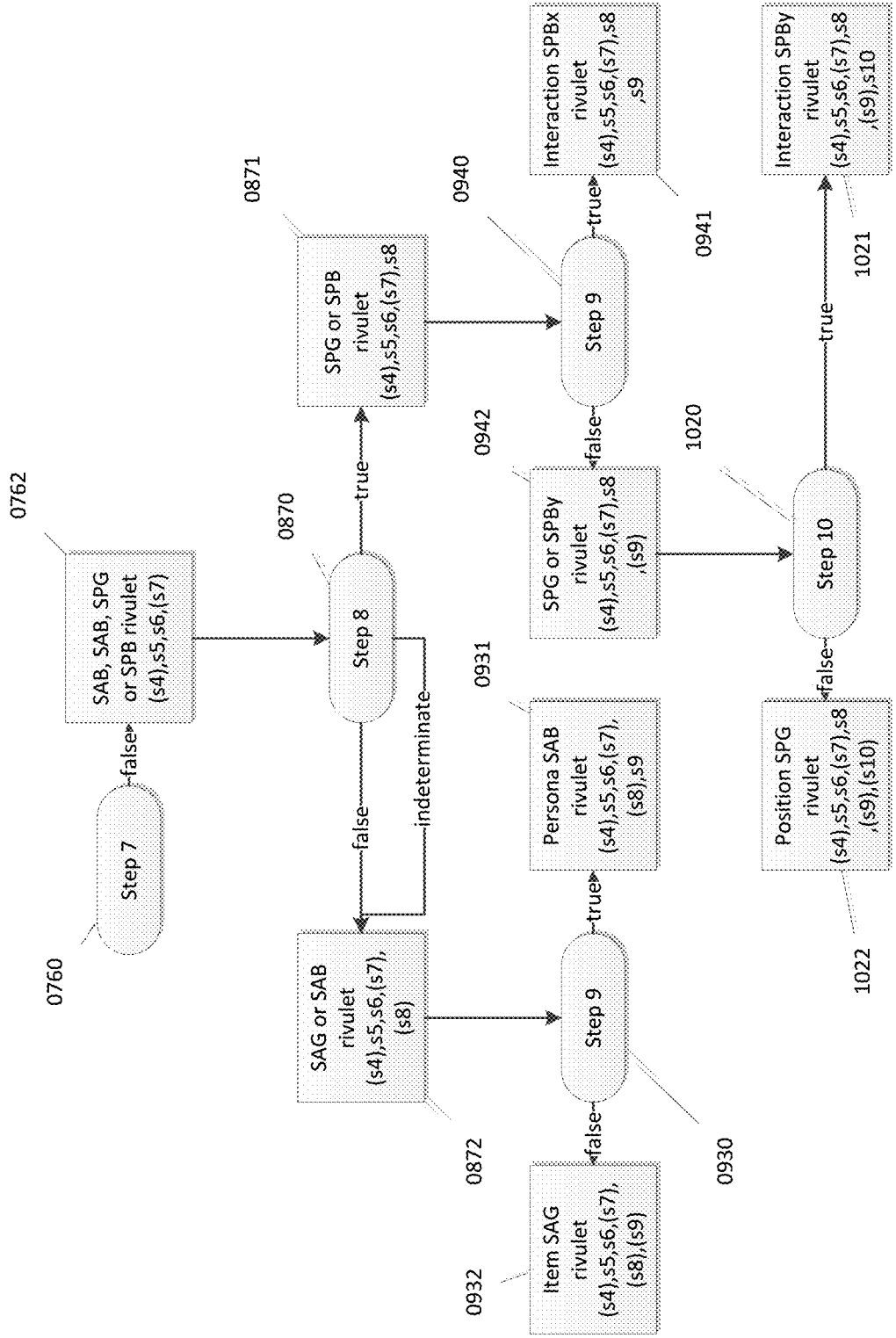
Figure 12G:
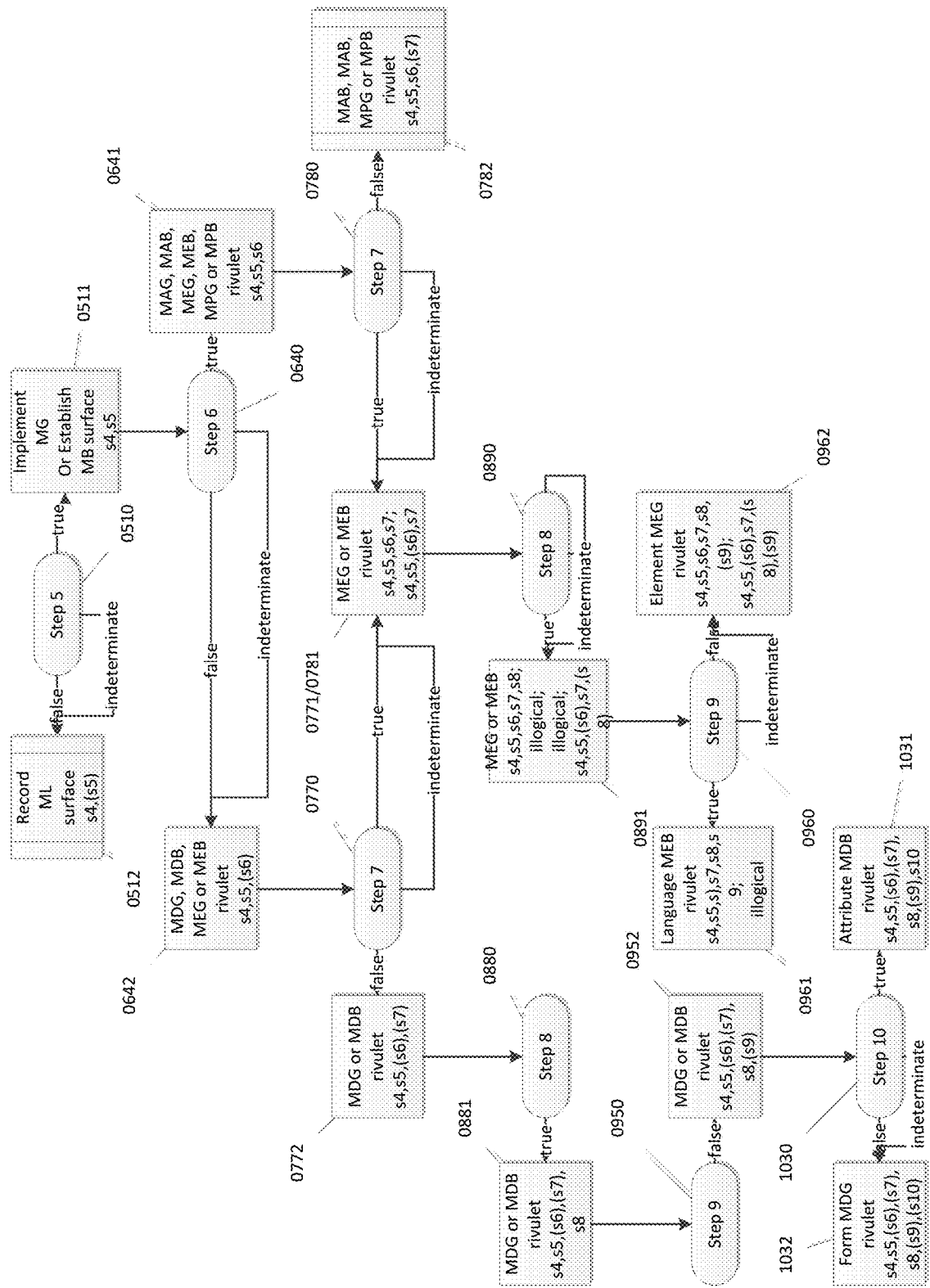
Figure 12H:
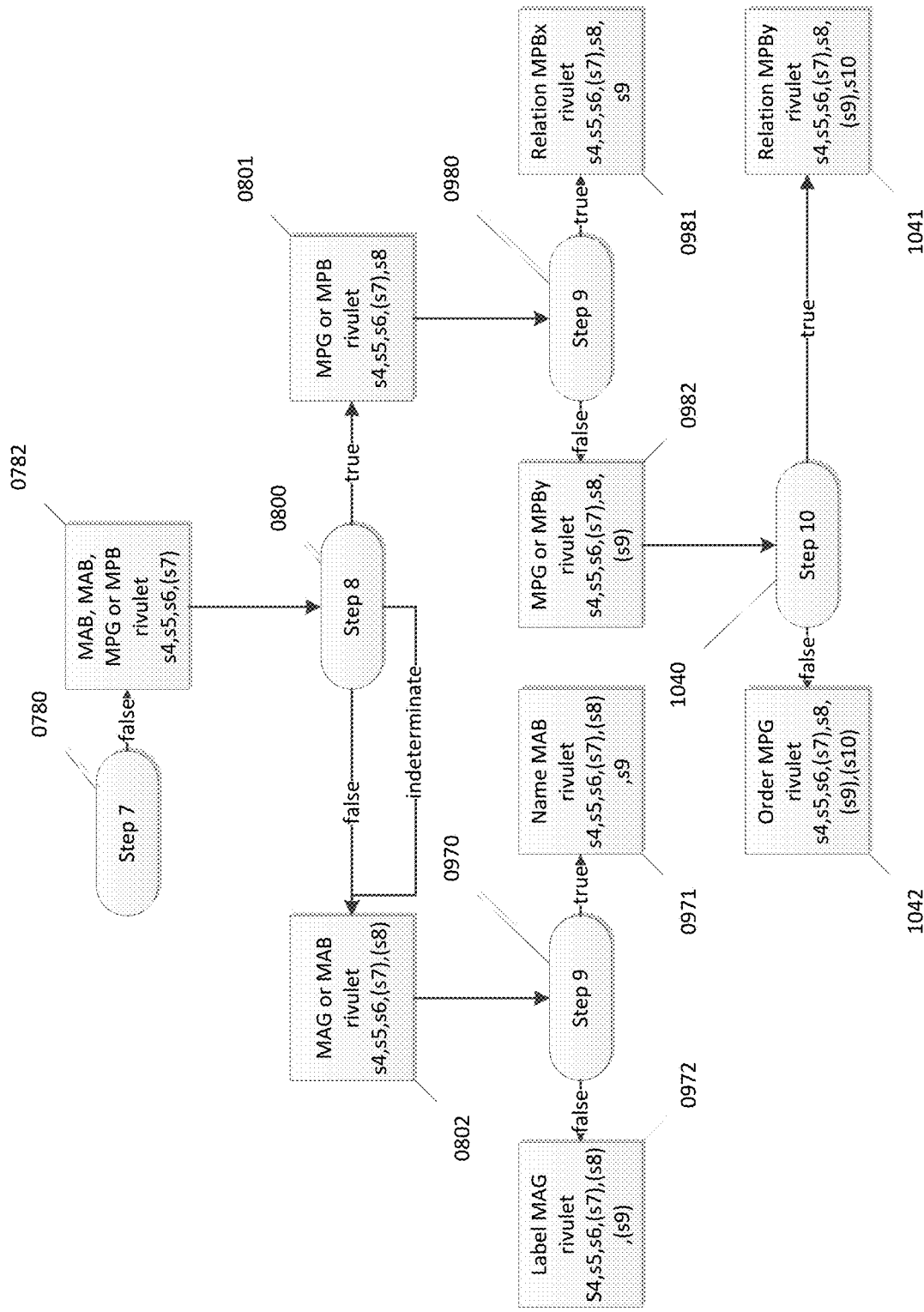

FIGS. 11a, 11b, and 11c display the logical intersection of the algorithmic steps, by the three considerations, to directly derive the rivulets. A true result for a step is indicated without ellipses while a false result for a step is indicated by placing ellipses around the step abbreviation. An indeterminate result for a step may be omitted from notation or indicated in ellipses just as a false result. The considerations of the algorithmic steps are as follows:

The first consideration evaluates steps s1 through s4.
The second consideration evaluates steps s0 through s4.
The third consideration evaluates steps s4 through s10.

The logical endpoints of 40 distinct rivulets (2 consisting of isomeric equivalents) are unchanged by a resequencing of the eleven steps but a natural sequencing provides a functional arrangement that isolates the derivative constructs nicely as shown in the flowchart of FIGS. 12a-h. If the sequence is changed, the occurrences of each algorithmic step will vary. In the preferred mode displayed in FIGS. 12a-h, step s0 occurs once at 0010; step s1 occurs twice at 0110, and 0120; step s2 occurs four times at 0210, 0220, 0230, and 0240; step s3 occurs six times at 0310, 0320, 0330, 0340, 0350, and 0360; step s4 occurs nine times at 0410, 0420, 0430, 0440, 0450, 0460, 0470, 0480, and 0490; step s5 occurs twice at 0510, and 0520; step s6 occurs four times at 0610, 0620, 0630, and 0640; step s7 occurs eight times at 0710, 0720, 0730, 0740, 0750, 0760, 0770, and 0780; step s8 occurs ten times at 0810, 0820, 0830, 0840, 0850, 0860, 0870, 0880, 0890, and 0800; step s9 occurs eight times at 0910, 0920, 0930, 0940, 0950, 0960, 0970, and 0980; and step s10 occurs four times at 1010, 1020, 1030, and 1040.

For the step occurrences identified in the previous paragraph, a terminal digit 1 in place of the 0 for its determinative step represents an outcome of that step that is either true, or the only logical outcome of the step; and a terminal digit of 2 in place of the 0 for its determinative step represents an outcome that is false or indeterminate. The reference characters generated by this methodology—when it results in the terminal outcome of a rivulet—are used to identify the rivulets in other figures as well.

In FIGS. 12a-h an algorithmic step with a logical result of "negative", "unequal" or "indeterminate" is signified by parenthesis around the step abbreviation. The affirmative logical result of "existent" or "equal" is signified by a step abbreviation without parenthesis. Illogical outcomes are indicated as "Illogical." Steps that are not part of the consideration may be omitted.

Computing System

All the features disclosed in this specification (including any accompanying claims, abstract, and drawings) may be replaced by alternative features serving the same, equivalent of similar purpose, unless expressly stated otherwise. Thus, unless expressly stated otherwise, each feature disclosed is one example of a series of equivalent or similar features.

Figure 13:
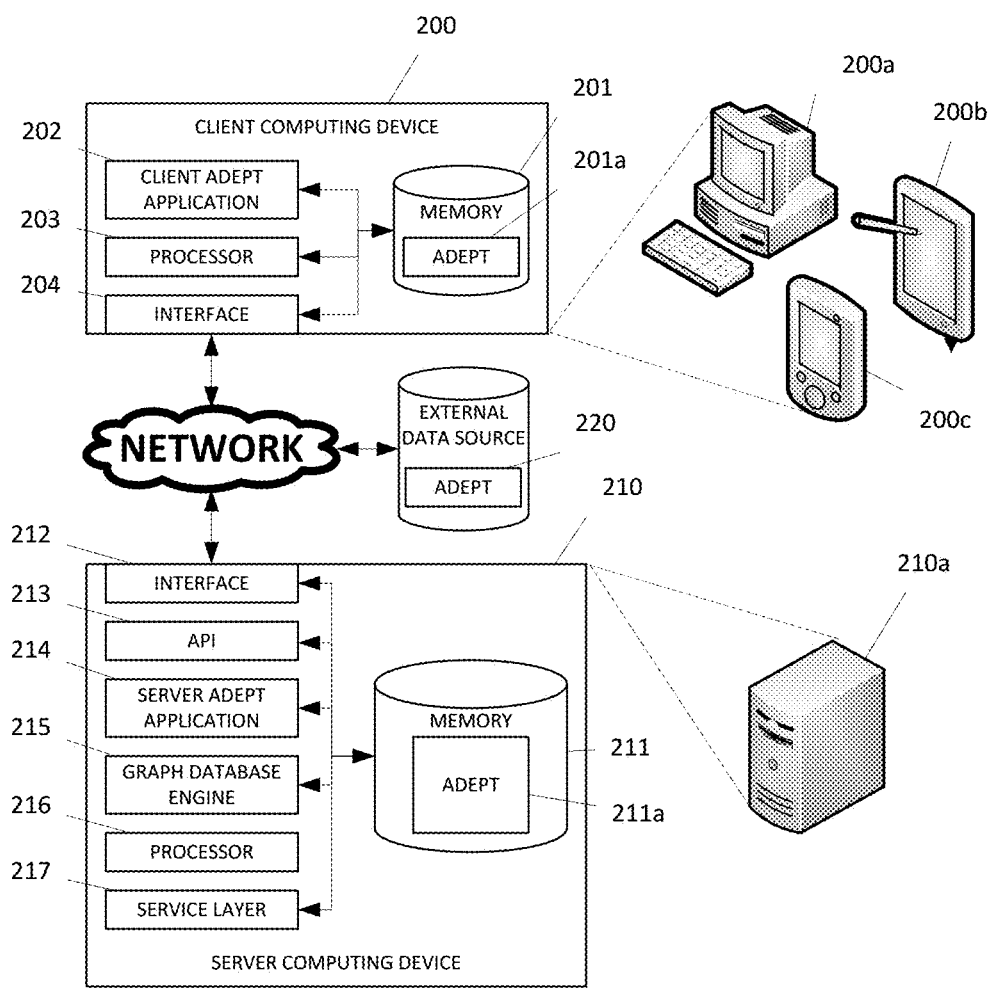
FIG. 13 is a block diagram illustrating an example distributed computing system for implementation of the invention.

The methods in accordance with the disclosed embodiments may be implemented using a general purpose computer system as found in the block diagram of FIG. 13. The methods may be implemented as software, such as one or more application programs executable within the computer system. In particular, the steps of the method are affected by instructions in the software that are carried out within the computer system. The instructions may be formed as one or more code modules, each for performing one or more particular tasks. The software may also be divided into two separate parts, in which a first part and the corresponding code modules performs the method and a second part and the corresponding code modules manage a user interface between the first part and the user. The software may be stored in a computer readable medium, including the storage devices described herein. The software is loaded into the computer system from the computer readable medium, and then executed by the computer system. A computer readable medium having such software or computer program recorded on the computer readable medium is a computer program product. The use of the computer program product in the computer system preferably affects an advantageous apparatus.

The Computer system comprises a computer module, input devices such as, but not limited to, a keyboard, touch screen, a mouse pointer device, and output devices including a display device. An external Modulator-Demodulator (Modem) transceiver device may be used by the computer module for communication to and from a communications network. The network may be a wide-area network (WAN), such as the Internet or a private WAN. The computer may be connected to the network using a high capacity (e.g., cable) connection, and the modem may be a broadband modem. A wireless modem may also be used for a wireless connection to the network.

The computer module typically includes at least one processor unit, and a memory unit for example formed from semiconductor random access memory (RAM) and read only memory (ROM). The computer module may also include, but is not limited to, a number of input/output (I/O) interfaces including an audio-video interface that couples to the video display and loudspeakers, an I/O interface for the keyboard and mouse and an interface for the external modem. The computer module also has a local network interface that permits coupling of the computer system to a local computer network, known as a Local Area Network (LAN). The local network may also couple to the wide-area network via a connection.

Storage devices are provided and typically include, but are not limited to, a secondary storage device such as local hard disk drive (HDD) or remote network attached storage device (NAS).

Typically the application programs are resident on the secondary storage device and read and controlled in execution by the processor. Intermediate storage of such programs and any data fetched from the networks may be accomplished using the semiconductor memory, possibly in concert with the hard disk drive. In some instances, the application programs may be supplied to the user encoded on one or more CD-ROM and read via the corresponding drive, or alternatively may be read by the user from the networks. Still further, the software can also be loaded into the computer system from other tangible computer readable media. Computer readable media refers to any storage medium that participates in providing instructions and/or data to the computer system for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module.

The methods to be described may also be implemented, at least in part, in dedicated hardware such as one or more integrated circuits performing the functions of sub functions to be described. Such dedicated hardware may include dedicated processors, digital signal processors, or one or more microprocessors and associated memories.

A number of methods, servers, systems, and computer program products have been disclosed with reference to certain embodiments. The embodiments disclosed are applicable to the computer and data processing industries, amongst others.

The foregoing describes only some embodiments, and modifications and/or changes can be made thereto without departing from the scope and spirit of the disclosed embodiments, the embodiments being illustrative and not restrictive.

Furthermore, the inventions have described in connection with certain embodiments, it is to be understood that the inventions are not to be limited to the disclosed embodiments, but on the contrary, is intended to cover various modifications and equivalent arrangements included within the spirit and scope of the inventions. Also, the various embodiments described herein may be implemented in conjunction with other embodiments, e.g., aspects of one embodiment may be combined with aspects of another embodiment to realize yet other embodiments. Further, each independent feature of component of any given assembly may constitute and additional embodiment.

Alternate Embodiments

In operation, the method of ADEPT as a limited iterative ontological notation may be applied across a broad range of informational content and context. One benefit of this feature is that it remains an immutable schema across all of these various implementations or embodiments which allows for the existence of a single methodology for design of a user interface to navigate through previously inoperable data sets. This expands the informational scope and improves user access through a consistent user interface that does not require knowledge of a graph traversal language, which also improves utility and accessibility.

Figure 14:
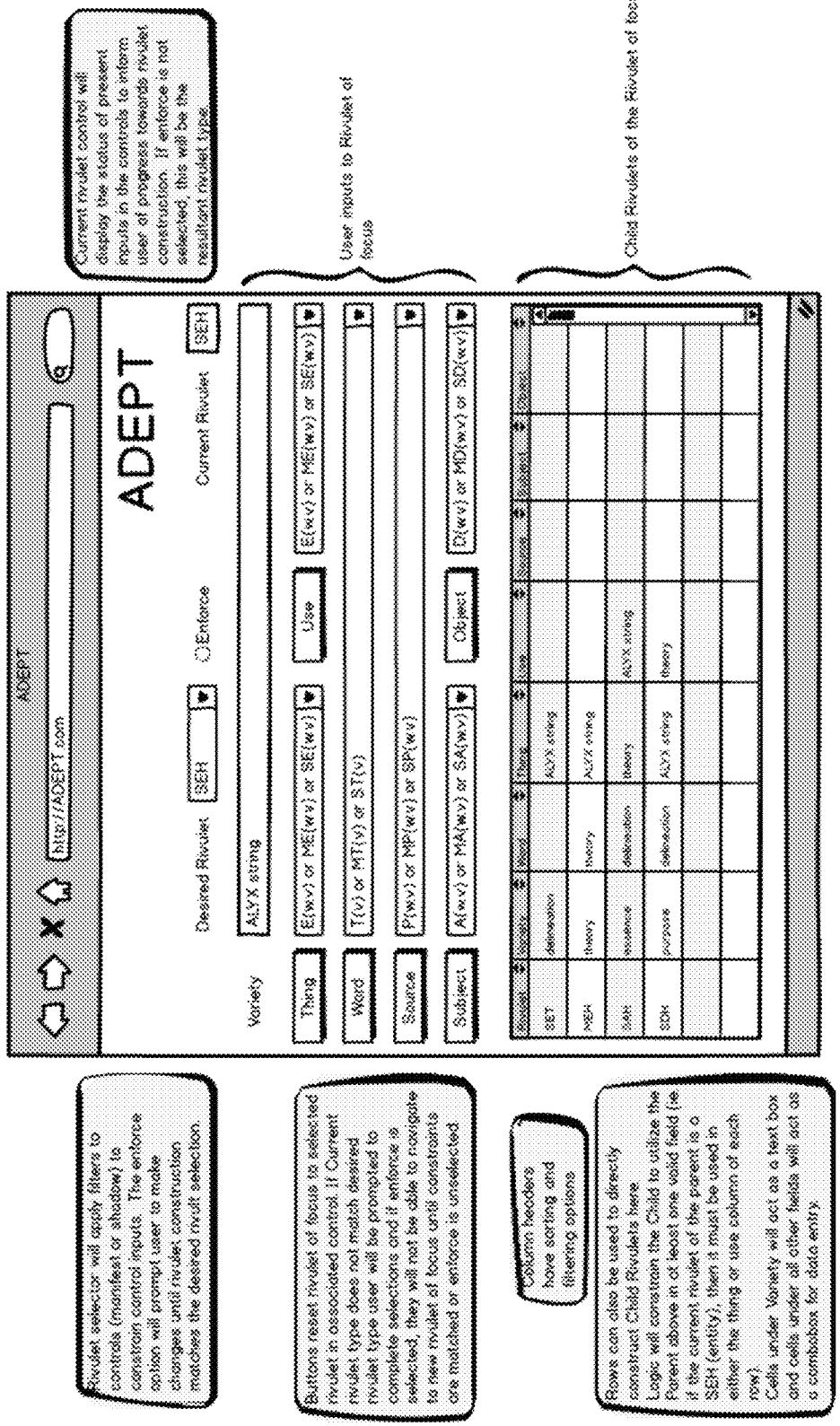
FIG. 14 exemplifies a user interface in wireframe format for traversal of an instance of the invention consisting of textual user inputs in place of graph traversal language for data exploration and entry.

FIG. 14 is a wireframe diagram demonstrating one possible embodiment of the invention as an application with a singular user interface built upon the preferred graphical mode as a back-end database. The controls on the user interface access the pools, natures or currents of the schema to present the user with pre-defined and indexed selection opportunities as combo-boxes to construct a desired rivulet. The fields at the upper half of the UI provide for create, read, update and delete functionality through an application programming interface (API) that has access to a graph database implementing ADEPT. The table at the lower half of the UI displays "child" vertices of the vertex represented above. Navigation of the ADEPT graphical schema in this embodiment could be achieved by navigating to a "parent" vertex by selecting the buttons of the channel labels above or by refocusing the fields above by making a selection in the table of "children" vertices below.

The use of content isolation and iteration to derive context reduces the need for duplication of unique strings of content representation. This acts as an imbedded feature of data compression and also reduces the presence of "White space", both of which reduce computer memory utilization and thereby improve processing.

While this flexible method offers latitude in expressing these various structural representations of information, users of the method will gain greater interoperability through consistent application of the axiomatic meaning when deciding best practices for leveraging the standardized schema of this invention. The embodiments described herein serve as examples of potential best practices.

Instances of the applied methodology can be reconciled to each other in the following ways:
  Merge vertices of content such that only one identifier is required for each unique representation of a variable.
  Merge vertices of context such that only one identifier is required for each unique meaning as determined by its pattern or related meanings.

Context can be truncated by simplifying vertices at the horizon of a sub-graph to their iterative equivalent within the $1^{st}$ consideration, prior to export/import operations for purposes of backup, transport or reconciliation between instances.

There is a corollary of the last reconciliation method above and that has to do with the novel creation of information within an ADEPT instance.

FIG. 15 is a schematic representation of the graphical embodiment that demonstrates a methodology for novel creation of any rivulet with a minimal "horizon" of contextual edges and neighboring vertices. On the left is displayed an example of programmatic commands in the Open Cypher query language that would accomplish the creation of any of the desired seven input channels and the necessary pattern of $1^{st}$ consideration vertices for a novel rivulet shown as the hexagon Riv at the center of the illustration on the right. These commands also include the creation of the requisite edge and vertex labels that would allow for immediate indexing functionality based upon the ADEPT schema.

The following embodiments will demonstrate the use of the invention across several informational domains but are not meant to cover all possible embodiments or in as full a measure as is possible for the notation. The important consideration is that regardless of the information framework, format, system, language or application, ADEPT as a limited iterative ontological notation is immutable as an information schema and ontological model and the resultant utility of that feature when implemented in a computing system is what the invention will claim.

Formulaic Embodiment

Figure 16:
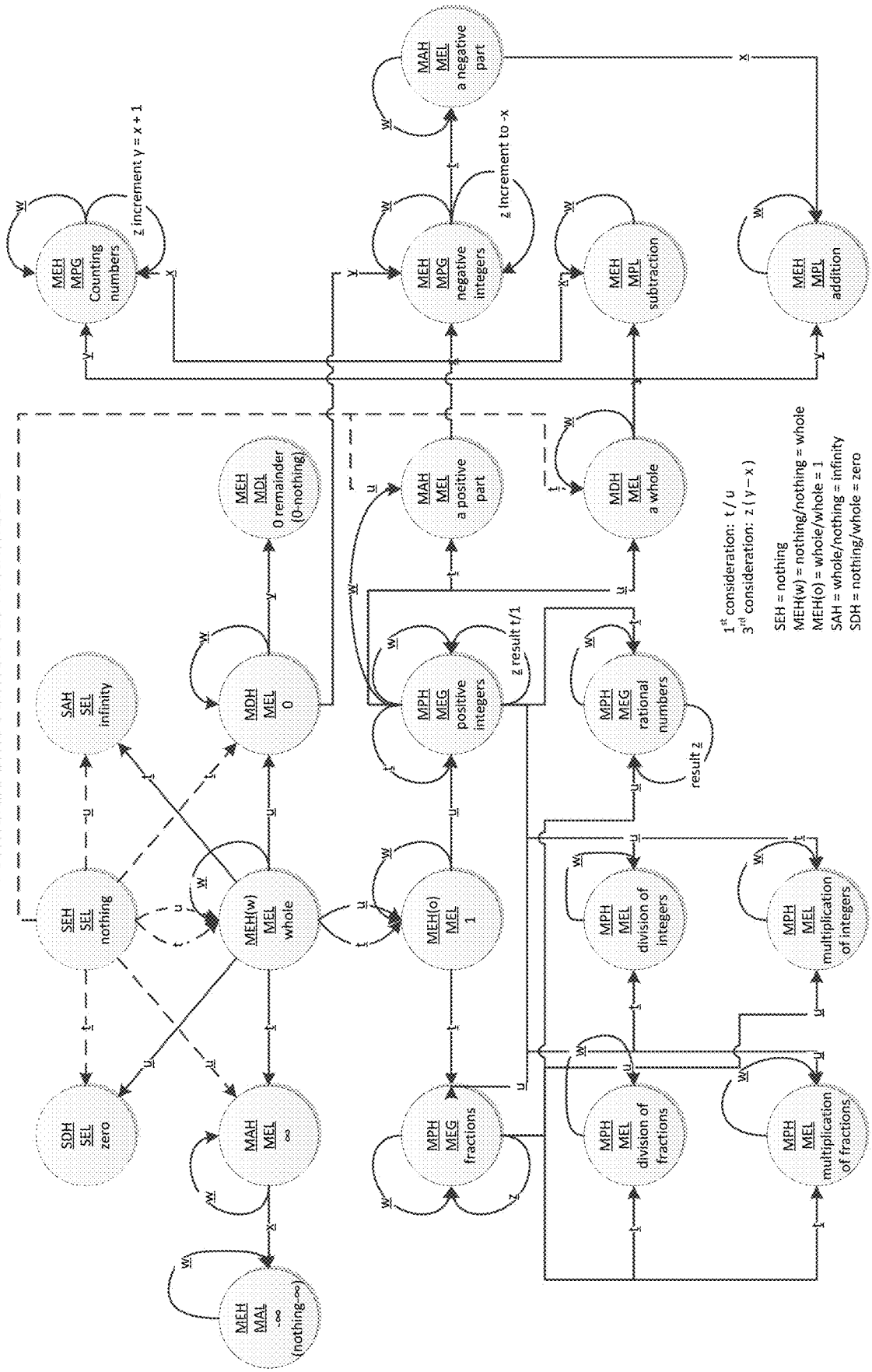
FIG. 16 exemplifies a method for implementation of arithmetic as a formulaic embodiment of the invention.

FIG. 16 is an implementation plan for a formulaic embodiment of the invention to represent mathematical concepts and arithmetic operators. This embodiment leverages implicit aspects of meaning found within the channel and pool axioms. Namely, the ontological distinction between an entity that iterates through a thing channel and an entity that iterates through a use channel. The thing channel represents an "individual" aspect while the use channel represents a "grouping" aspect of the "immutable" entity being conveyed. What is "immutable" about entities is that they have semantic equivalence between their incoming thing and use channels, or what can be termed concordance. This concept of concordance also applies to a pair of shadow or null inputs in these two channels of thing and use. In a mathematical sense, the thing channel is analogous to the numerator and the use channel is analogous to the denominator in a ratio. Thus a rivulet in the first consideration, in a mathematical sense, is expressing a ratio of some individual thing as a part of some grouping use, or $1^{st}$ consideration=t/u. Examples of a rivulet can be expressed like this:

MEH=t/u=1 [where t and u are both manifest and share the same vertex coming through their word channels, or alternatively, both t and u are shadow or null inputs.]

MPH=t/u [where t and u do are both manifest and do not share the same vertex input in their word channels.]

SEH is the representation of nothing in ADEPT and appropriately, it has no manifest inputs in any of its channels. When it serves as the entity of both thing and use we can interpret the ratio of "no individual part" of "no group" which is to say, "the whole of nothing." When this "whole", which has now been semantically manifest as a MEH rivulet, iterates as thing and use we now have the "whole individual part" of "the whole group", which is to say, the concept of identity or the manifestation of the number one. If we take our whole as a denominator use and our original concept of nothing as the numerator thing, we have a pattern that expresses the concept of zero as a MDH rivulet. Conversely, if we take our whole MEH as a numerator thing and nothing SEH as the denominator use we have expressed the concept of the infinite as an MAH rivulet.

If the first consideration axiom can be expressed as a simple ratio between the individual entity of thing and the grouping entity of use, the third consideration axiom can be expressed mathematically as a magnitude of difference. The concept of difference is found in the intrinsic ascription representing a subjective part of some extrinsic description representing the objective whole. Stated mathematically, this difference is =(y-x). This difference is multiplied by a factor of the mutable process coming through the source channel so the mathematical expression of the $3^{rd}$ consideration is =z(y-x). When a channel is null or shadowed, it means that the corresponding variable in the equation can be zeroed out. The resultant pattern as we have already seen above with MAH and MDH will also change and take on the implications of the formulaic modification. We see this plays out in the process of incrementing the counting numbers of positive integers which happens when a MPG rivulet has a self-referencing source channel. The equations would be as follows:

MPG=z(y-x) where a self-referencing z=MPG we get z=z(y-x). By dividing both sides of the equation by the value of z we get z/z=z/z(y-x), which is 1=1(y-x), which is y=x+1. This means that the self-referencing MPG rivulet, when fed incremental pairs of x and y values, it serves to mark the process of counting, or incrementing by 1 within a graphical pattern of connections. The implementation model in FIG. 24 goes on to build upon these concepts of mathematics represented as patterns of logically constrained iteration based upon the axioms of ADEPT to derive the positive and negative integers, the rational numbers, multiplication and division operators on integers and fractions as well as the operators of addition and subtraction as shown.

Cyclical Embodiment

Figure 17:
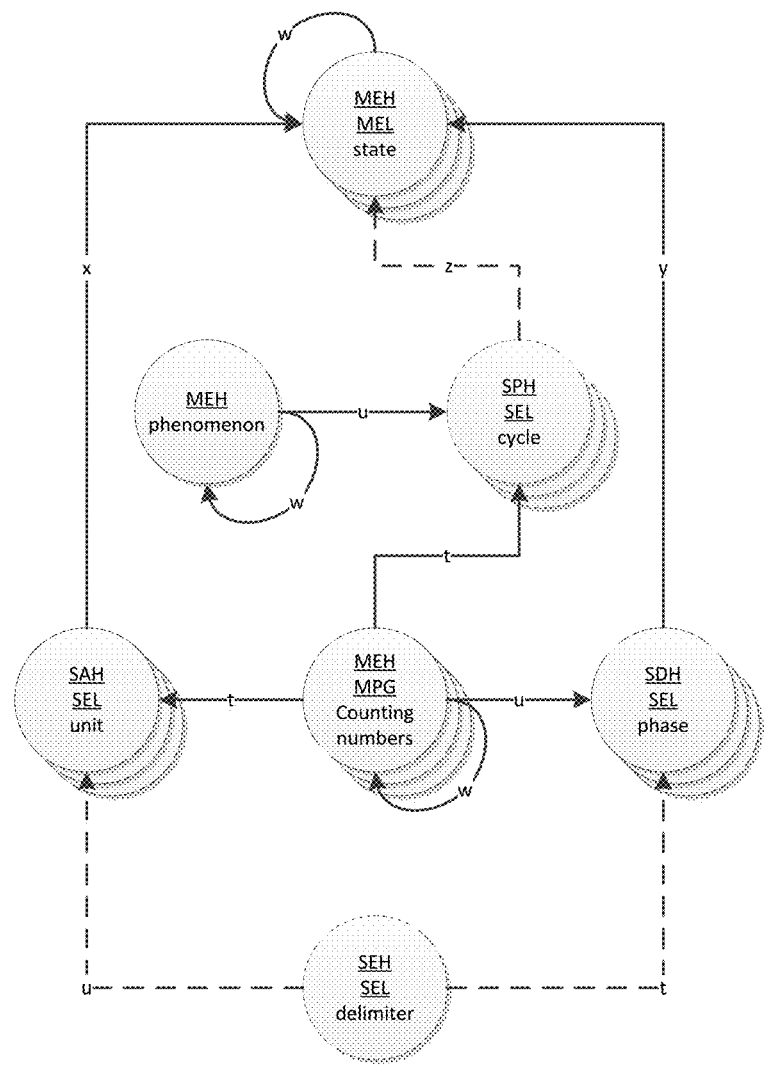
FIG. 17 is a schema diagram that exemplifies a method for implementation of a cyclical embodiment of the invention.

FIG. 17 is a diagram of an ADEPT implementation that builds upon the concept of the counting numbers as developed in the implementation of a formulaic embodiment of arithmetic above and teaches the development of cyclical information structures upon it. The three aspects of a cyclical structure of some phenomena are the unit, phase and cycle counts which converge upon each state of the cycle. The unit is represented as rivulet SAH/SEL. The phase is represented as rivulet SDH/SEL. The cycle is represented as rivulet SPH/SEL. The phenomenon is represented here as rivulet MEH but could also be any manifest entity such as MEG or MEB as well. The unit, phase and cycle converge at state represented by rivulet MEH/MEL. A delimiter of unit or phase can be expressed by rivulet SEH/SEL. The stacked circles represent in this notation that one would expect numerous instances of a specified rivulet at the various iterations of the cyclic embodiment. One example of a cyclical structure is a timer, in which case a model might set the unit as seconds, the phase as minutes consisting of sixty seconds, and the cycle as hours made up of 60 minute phases. The state is represented as a point in time on this defined cycle, such as, 1 hour, 3 minutes and 57 seconds.

Graphical Embodiment

Figure 18A:
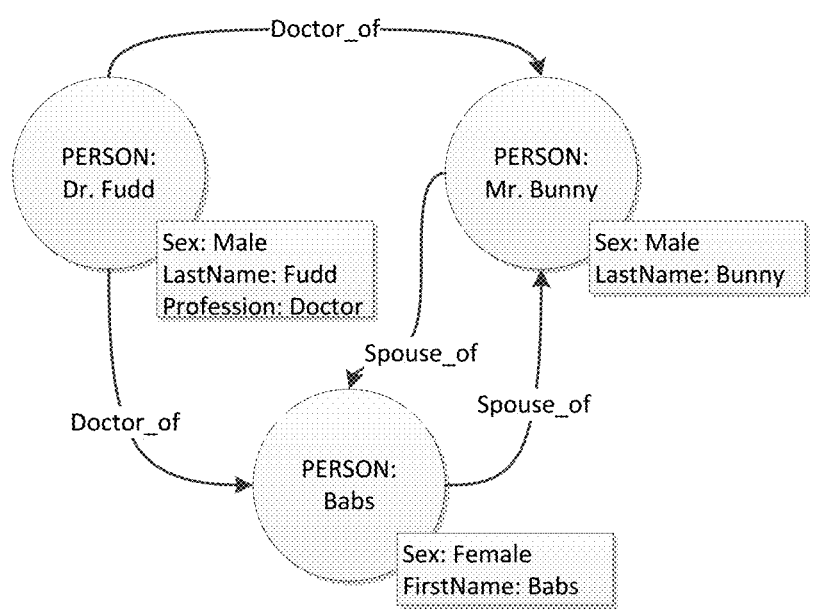
FIG. 18a is an example of a simple property graph.

FIG. 18a exemplifies a simple property graph. There are three vertices in this graph, all of the type "PERSON"

represented as circles. Each vertex has some set of properties, either shared or distinct from the properties of other vertices. Two edge types specify the relationships between the vertices. They are "Doctor_of" and "Spouse_of" in this example. In narrative form, this graph represents three people, Doctor named Dr. Fudd, and a couple of his patients, namely Mr. Bunny and his spouse named Babs.

Figure 18B:
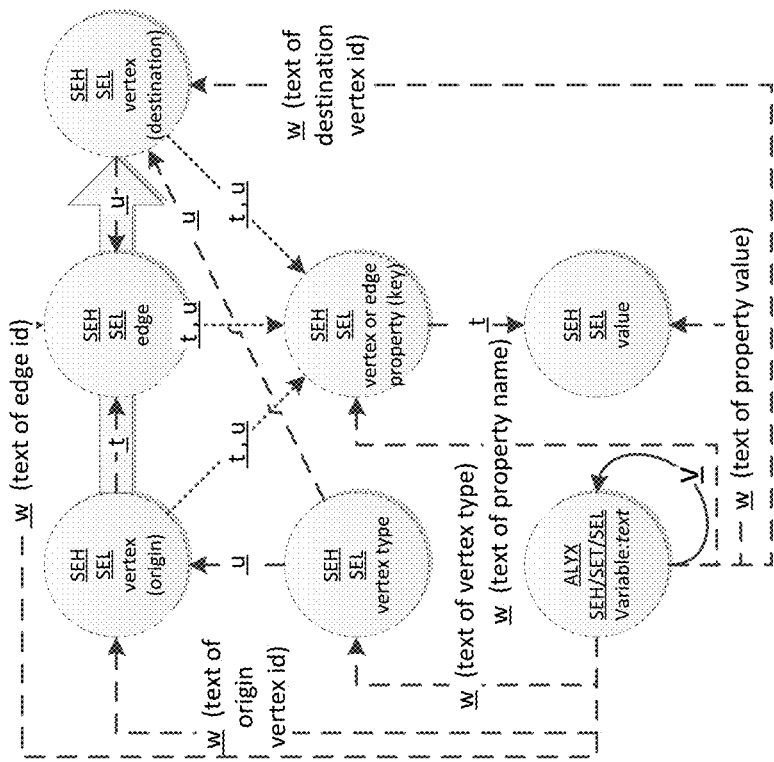
FIG. 18b is a schema diagram that exemplifies a method for implementation of a property graph embodiment using the invention.

FIG. 18b is a schema diagram describing the implementation of a property graph embodiment of ADEPT. The broad arrow at the top of the diagram shows the directionality of an edge between two vertices. The vertices are uniquely identified through the variable channel and may have types and properties, and the properties may be described as a key-value pair combination. The edges are defined by their vertices of origination and destination and identified through the variable channel and may also have properties and values. The symbolic representations of any of these graph concepts are provided by the Alyx symbolic library. In a graphical embodiment, all of these aspects are modeled through the same rivulet pattern of SEH/SET/SEL. It is the pattern of the thing and use channels that distinguish the different components in this case, not the rivulet pattern. This is an important feature of this particular implementation because it models the phenomena known to practitioners of graph theory as reification, in which graph edges can be expanded to be expressed as additional vertices and properties can be alternatively represented as new vertices as well.

Figure 18C:
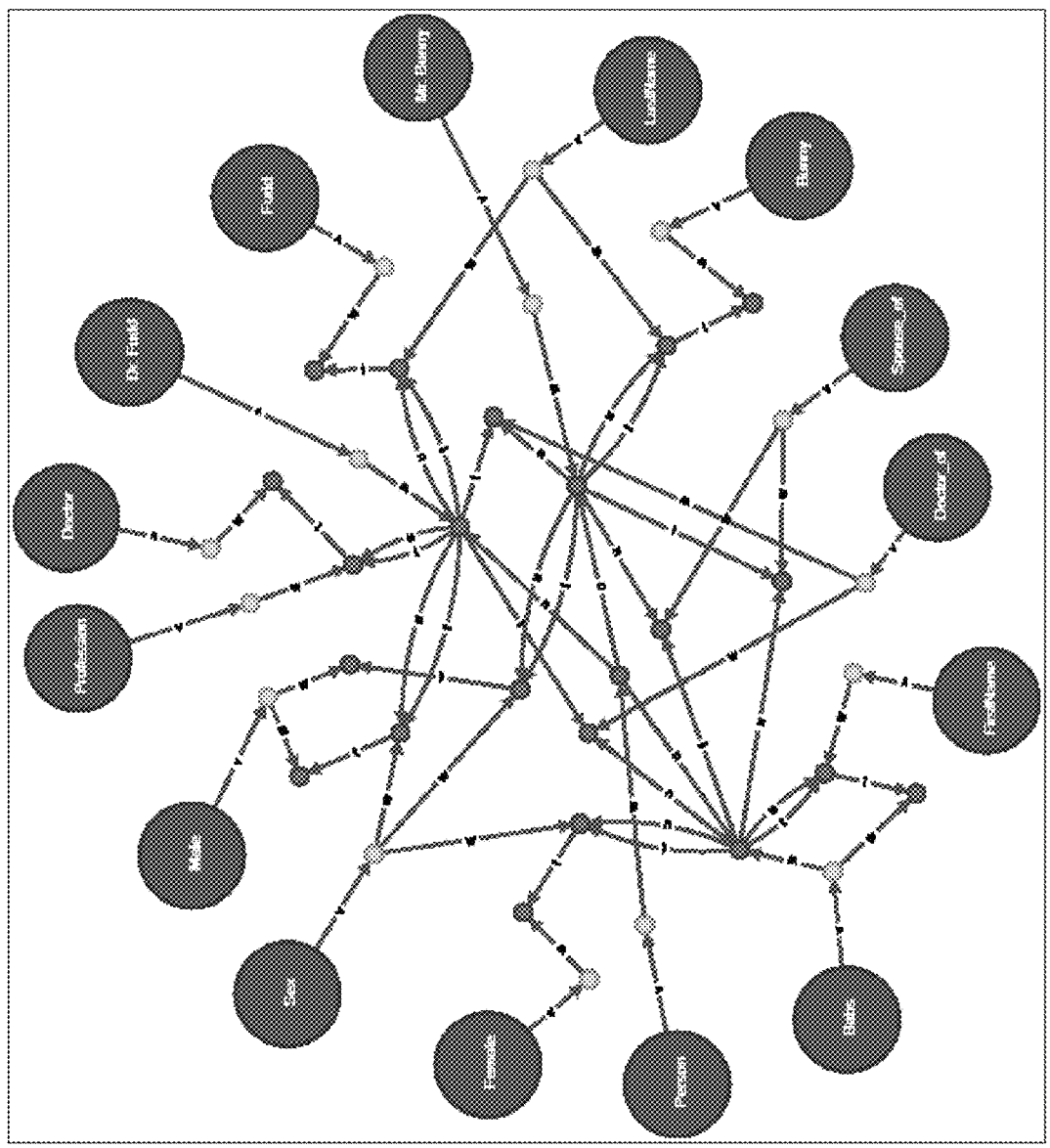

FIG. 18c takes the example of FIG. 18a and applies the implementation schema of FIG. 18b to produce an actualized graphical embodiment of the invention. The Alyx library of symbolic content can be seen as the large circles at the periphery with recognizable text that iterate through a variable channel v to the $2^{nd}$ consideration vertices, which in turn iterate through word channels w to the contextualized patterns of the property graph example made up of thing channels t and use channels u.

FIG. 18d is a nine column table which teaches the tabular mode of the invention, expressing the same content and context found in the graphical mode of FIG. 18c. This mode does not require any visualization software and can be used to efficiently store, backup or transmit the content and context of the property graph found in the example of FIG. 18a as, for instance, a simple text file of comma-separated values.

Tabular Embodiment

Figure 19:
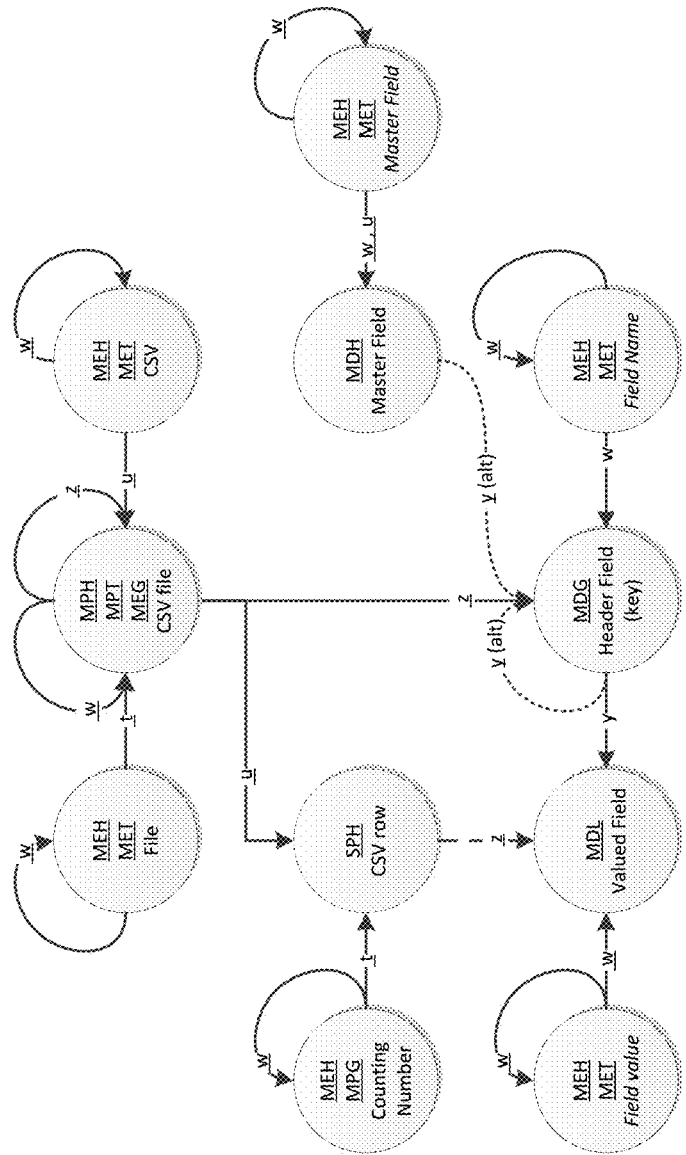
FIG. 19 is a schema diagram that exemplifies a method for implementation of tabular format embodiment such as comma-separated vales, or CSV using the invention.

FIG. 19 is a schema diagram describing the implementation of a tabular embodiment of ADEPT in the form of a comma-separated value, or CSV, file. A particular file MEH/MET of type MEH/MET is identified as the CSV file MPH/MPT/MEG. This CSV file contains header fields MDG that can either be original through a self-referencing object channel y or tied to a master library of fields MDH. Each header field MDG may be utilized in a row SPH which is associated with a counting number MEH/MPG for identification. The utilized header field is then associated with a field value MEH/MET to produce a valued field MDL.

Cartesian Embodiment

Figure 20:
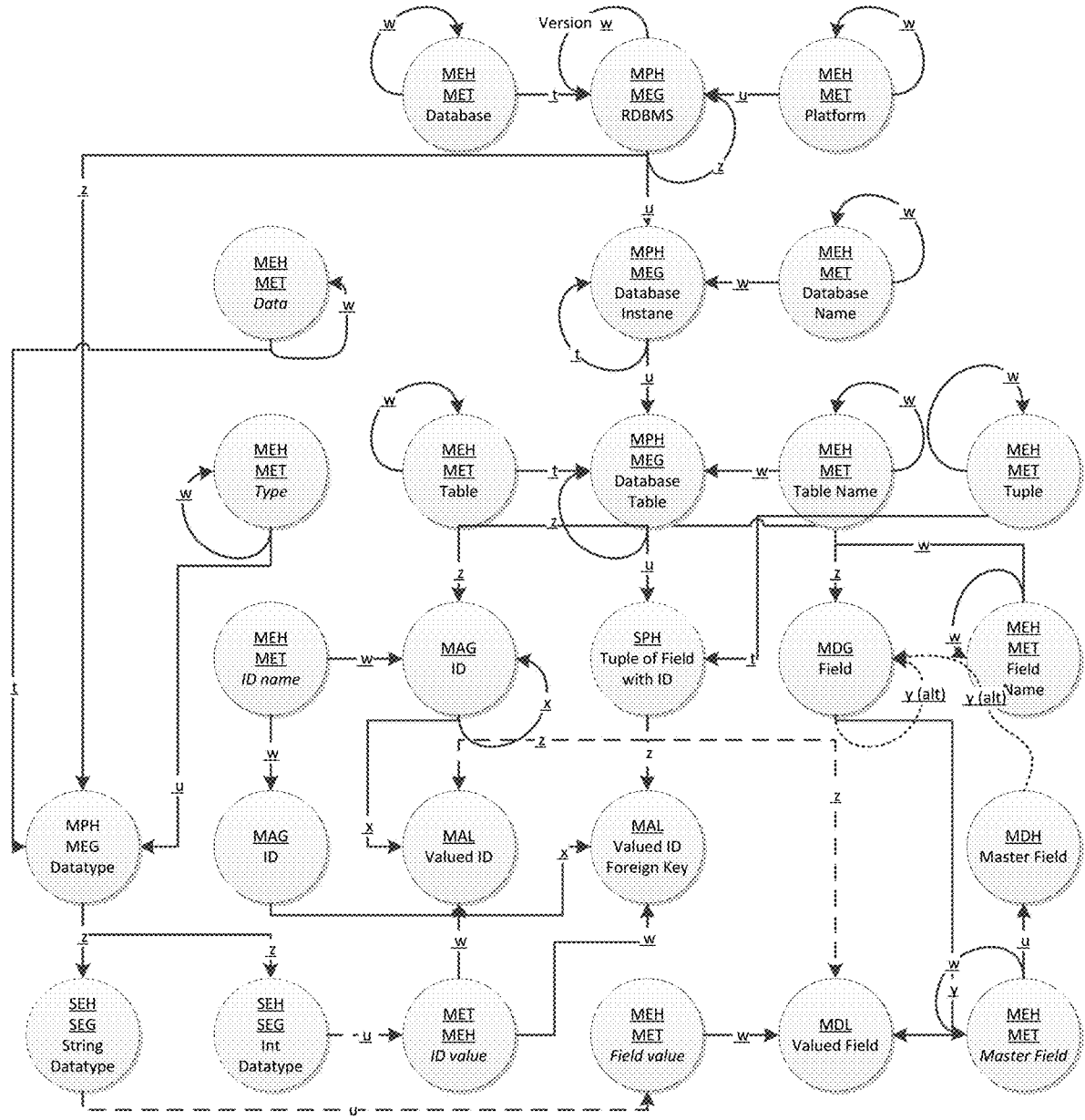
FIG. 20 is a schema diagram that exemplifies a method for implementation of Cartesian embodiment such as a relational database management system (RDBMS) using the invention.

FIG. 20 is a schema diagram describing the implementation of a Cartesian embodiment of ADEPT in the form of a relational database management system or RDBMS. A particular version RDBMS MPH/MEG of database MEH/MET on Platform MEH/MET has an instance MPG/MEG given a name MEH/MET. This instance MPG/MEG consists of database objects, such as tables or views, represented at database table MPH/MEG which is given a name as well. This table may have incremental versions through its self-referencing source channel. The table consists of tuples SPH which consist of a valued id MAL and a valued field MDL. The valued ID MAL may be native to the table or a foreign key MAL from another table. The field may originate within the instance of this table through a self-referencing MDG or may originate in an external library of master fields MDH that might span various RDBMS's. The field and id values are each given a datatype SEH/SEG which is of a specific set of Datatypes MPG/MEG specific to the RDBMS MPH/MEG.

An important feature pertaining to systems interoperability has been illustrated in both FIG. 19 and FIG. 20 and will be explained here. The use of "master fields" expresses an optional capability of an ADEPT implementation to form associations across various instances of various formats of data. As an example, one might define a master field "First Name" that could be utilized in both a CSV file following the implementation method of FIG. 19 as a CSV header and a database table following the implementation method of FIG. 20 as a RDBMS table field (column name). The ADEPT instance would then be able to remodel data from these two data sources through the use of the master field linkage. This has broad application as a method of mapping data across various system instances and formats to achieve interoperability of the information.

Hierarchical Embodiment

Figure 21:
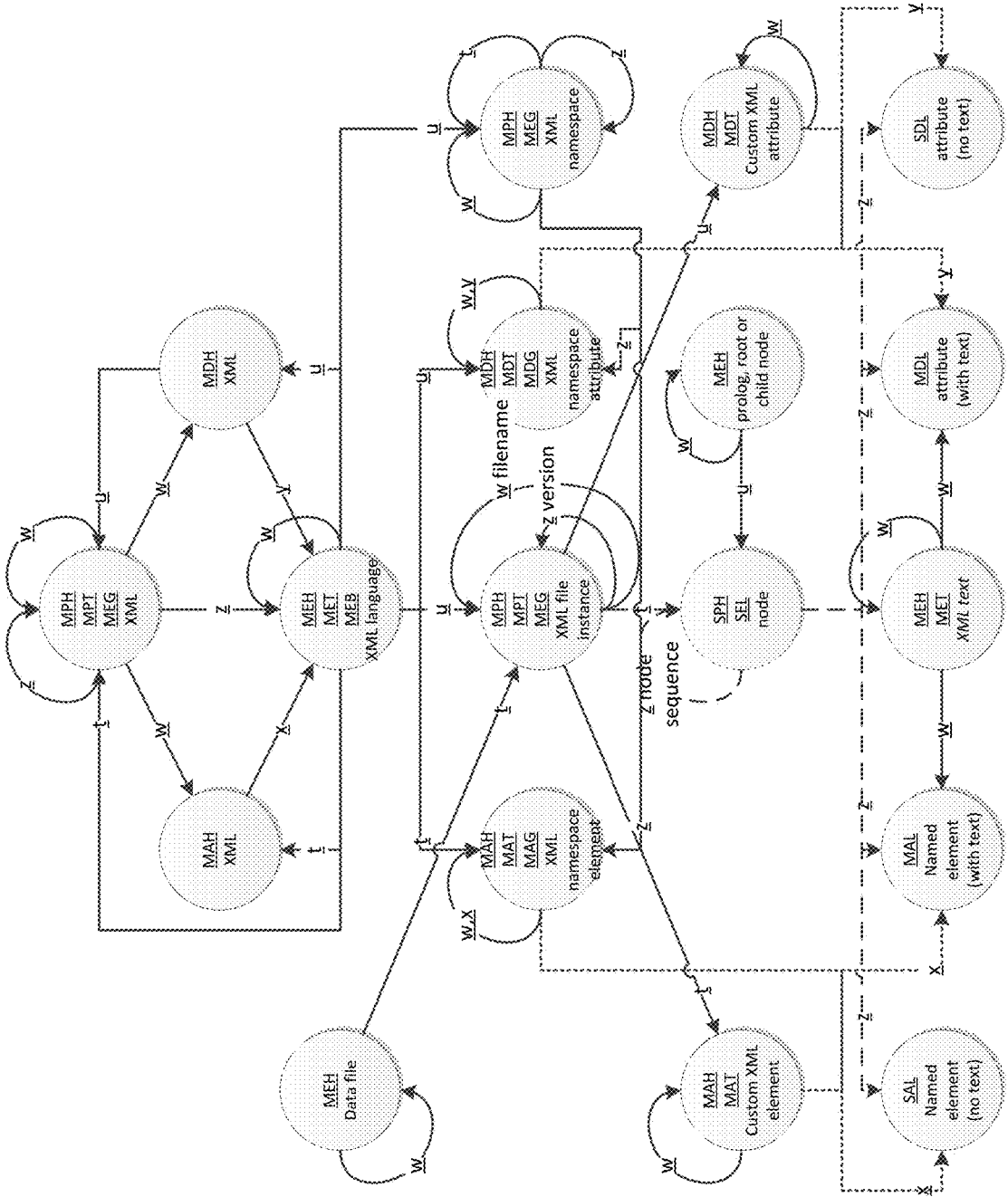
FIG. 21 is a schema diagram that exemplifies a method for implementation of hierarchical embodiment such as found in the XML language and file format using the invention.

FIG. 21 is a schema diagram describing the implementation of a hierarchical embodiment of ADEPT in the form of an XML file. The "nodes" of an XML file consist of "elements" and "attributes" that make up a divergent hierarchy, or tree. XML is modeled as a language MEH/MET/MEB which can utilize either standardized elements MAH/MAT/MAG from a namespace MPH/MEG, or alternatively, customized elements MAH/MAT specific to an XML file instance MPH/MPT/MEG. Similarly, the attributes of an XML file may utilize standardized attributes MAD/MDT/MDG from a namespace MPH/MEG, or alternatively, customized attributes MDH/MDT specific to the XML file instance MPH/MPT/MEG. Using namespace elements and attributes provides an interoperability advantage. An XML node may be categorized as a prolog, root or child depending on where it is in the node sequence SPH/SEL of the XML file instance. Each node may then be "dressed" as an element with text MAL, an element without text SAL, an attribute with text MDL or an attribute without text SDL.

Object-Oriented Embodiment

Figure 22:
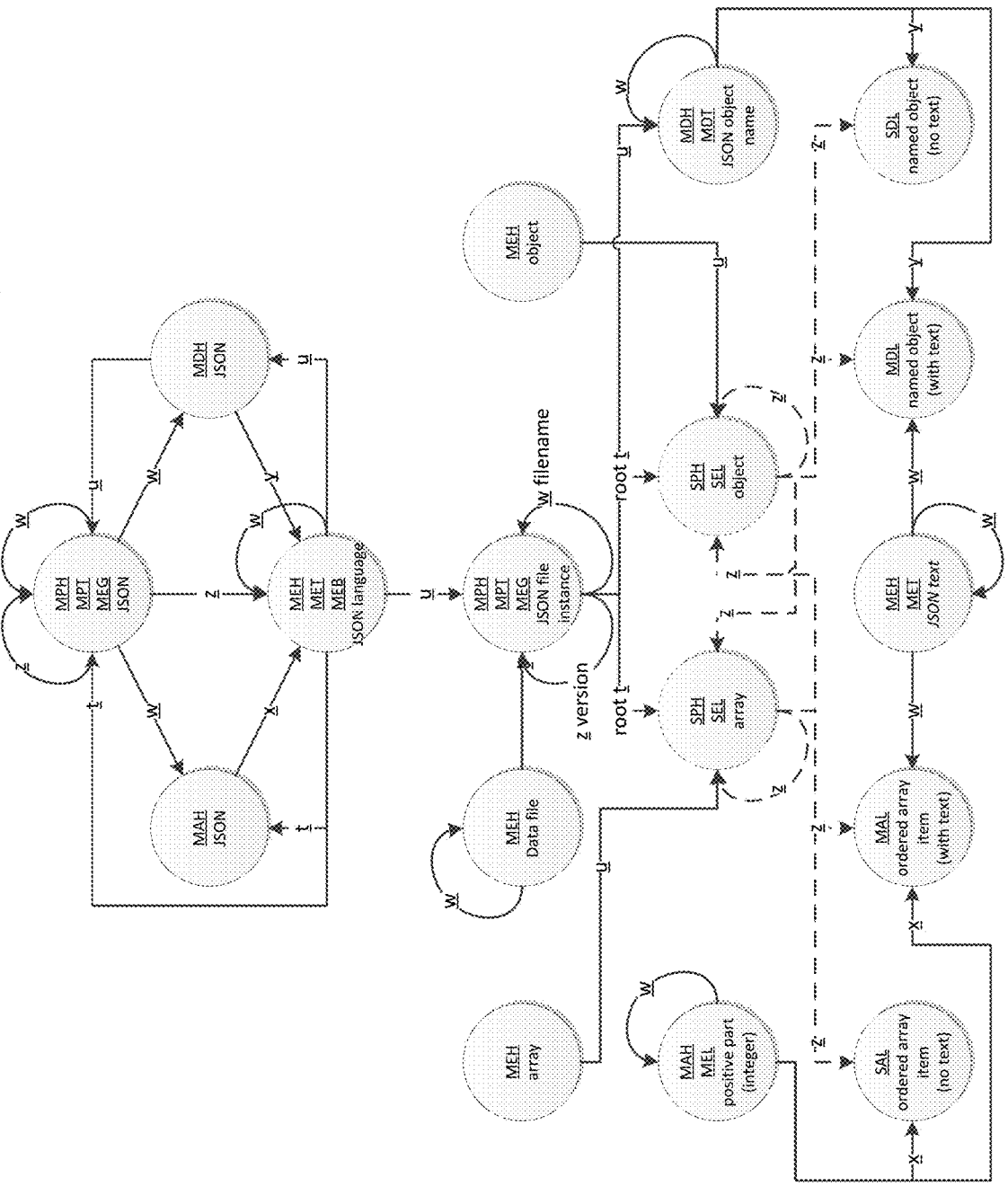
FIG. 22 is a schema diagram that exemplifies a method for implementation of object-oriented embodiment such as found in the JSON file format using the invention.

FIG. 22 is a schema diagram describing the implementation of an object-oriented embodiment of ADEPT in the form of a Javascript Object Notation, or JSON file. The key feature of a "document" in the JSON format MEH/MET/MEB is that it consists of unordered collections of "objects" and ordered collections of "arrays." These two collections can freely iterate on each other, meaning that an object can contain an array or a set of sub-objects, and an array can be composed of objects or additional sub-arrays. A Data file MEH in the JSON format MEH/MET/MEB begins with a root element of either an object SPH/SEL or an array SPH/SEL through a thing channel t. If the root (or child as explained below) is an array SPH/SEL, it will contain ordered array item(s) without text SAL or ordered array item(s) with text MAL. The ordering comes through the subject channel x from the library of positive integers MAH/MEL as developed in FIG. 16. The array is related to its ordered item(s) as a shadow source channel z. Similarly, it is related to its child element, be it an array or object through the shadow source channel z as well. If the root or child is an object SPH/SEL then it may contain key-value pairs consisting of a named object with a textual value MDL or a named object without a textual value SDL (such as an object whose child is an array). The JSON object name MDH/MDT is linked to the JSON file instance MPH/MPT/MEG through a use channel u.

Transactional Embodiment

Figure 23:
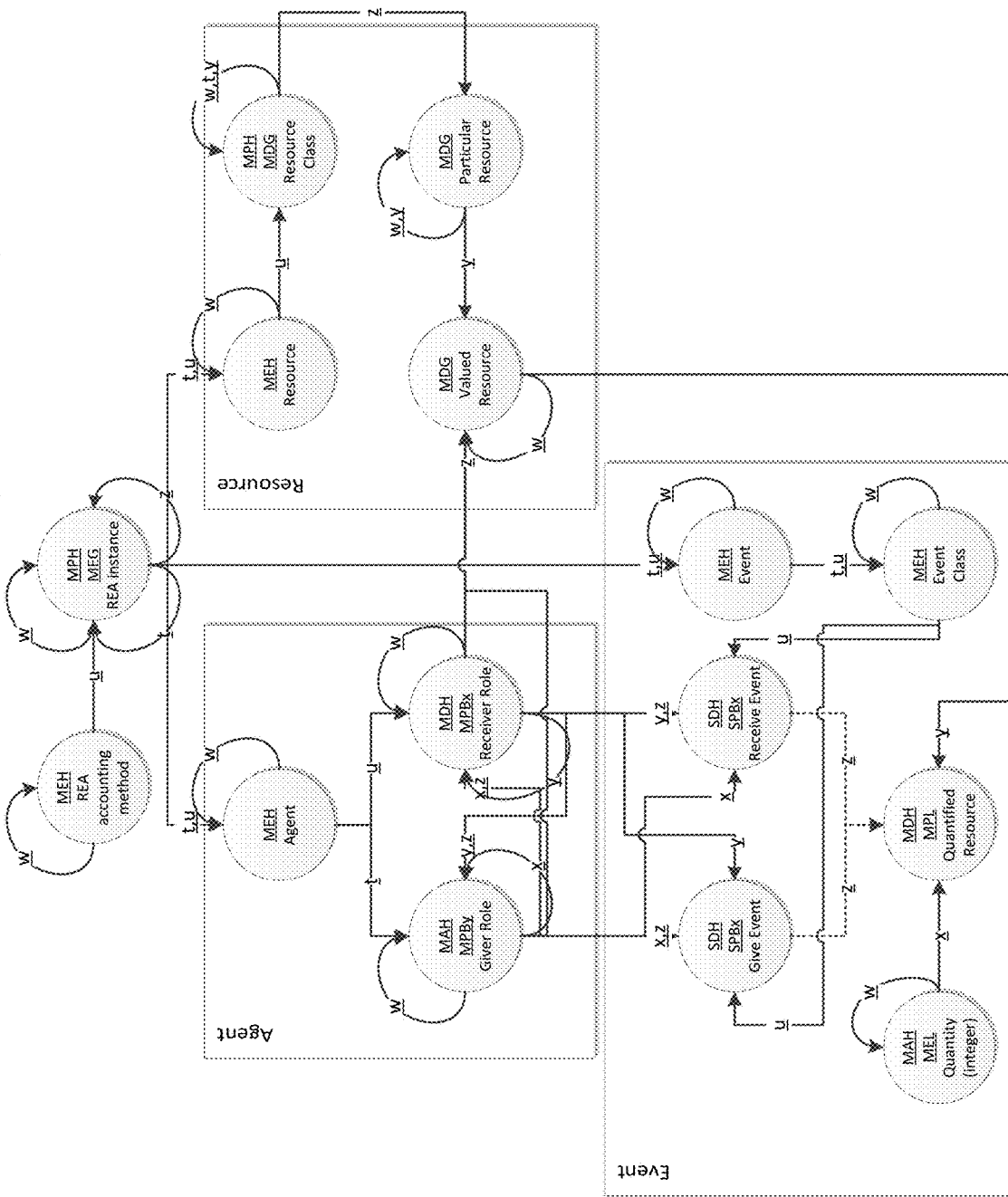
FIG. 23 is a schema diagram that exemplifies a method for implementation of a transactional economic system utilizing the Resource, Event Agent (REA) accounting model.

FIG. 23 is a schema diagram describing the implementation of a transactional embodiment of ADEPT such as the Resource, Event, Agent (REA) accounting theory. An instance of this theory MPH/MEG consists of three components of Agents MEH, Resources MEH and Events MEH. An Agent MEH has two roles of Giver MAH/MPBy and Receiver MDH/MPBx. In either role an Agent may value a resource MDG of a Particular Resource type MDG, of a Resource Class MPH/MDG, through its source channel z. An event initiator will act through the source channel z along with a subject channel x or object channel y depending on the role of the initiator as giver or receiver of an event of giving SDH/SPBx or receiving SDH/SPBx. The event may then be dressed with details such as the quantity MAH/MEL (a positive integer part from FIG. 16) of a valued resource MDH/MPL. The event is given a class MEH through the use channel u.

The invention claimed is:

1. A computerized method for modeling information, comprising:
   a meaning, assigned a unique identifier;
   a representation of said meaning;
   performing an iteration to relate said meaning to said representation, based on a limitation;
   determining said limitation by using a three-value logic;
   determining the patterns of iterations between the meanings and representations;
   based on the determined patterns of iterations, generate notations;
   assigning notations representing computable categories to said meaning, said representation, said iteration and said limitation;
      wherein the computable categories consists of a pool category for the meaning, a nature category for the meaning, a channel category for the iteration, a current category for the limitation, a rivulet category for notations, a surface category for notations and a consideration category for notations; and
   automatically constructing an index of a finite plurality of said notations of said limitations, iterations, representations, and meanings.

2. The method of claim 1 wherein said meaning is a pool notation, consisting in one or more of the following:
   an ascription pool representing an intrinsic aspect of said meaning;
   a description pool representing an extrinsic aspect of said meaning;
   an entity pool representing an immutable aspect of said meaning; and
   a process pool representing a mutable aspect of said meaning.

3. The method of claim 1 wherein said meaning is a nature notation, consisting in one or more of the following:
   an aether nature representing originality of said meaning;
   a translation nature representing transcendence of said meaning;
   a light nature representing passivity of said meaning;
   a ground nature representing productivity of said meaning; and
   a being nature representing willfulness of said meaning.

4. The method of claim 1 wherein said iteration is a channel notation, comprising no more than one of each of the following as input:
   a thing channel conveying an immutable, individualizing aspect to said meaning through said iteration;
   a use channel conveying an immutable, grouping aspect to said meaning through said iteration;
   a variety channel symbolically conveying said representation to said meaning through said iteration;
   a word channel conveying a transcendent semantic aspect to said meaning through said iteration;
   a subject channel conveying an intrinsic aspect to said meaning through said iteration;
   an object channel conveying an extrinsic aspect to said meaning through said iteration; and
   a source channel conveying a mutable aspect to said meaning through said iteration.

5. The method of claim 1 wherein said limitation is a current, comprising one or more of the following:
   a manifest ascription current limiting said iteration of intrinsic aspect to a determinate said meaning;
   a shadow ascription current limiting said iteration of intrinsic aspect to an indeterminate said meaning;
   a final ascription current preventing said iteration of an intrinsic aspect of said meaning;
   a manifest description current limiting said iteration of extrinsic aspect to a determinate said meaning;
   a shadow description current limiting said iteration of extrinsic aspect to an indeterminate said meaning;
   a final description current preventing said iteration of an extrinsic aspect of said meaning;
   a manifest entity current limiting said iteration of immutable isolating or grouping aspects to a determinate said meaning;
   a shadow entity current limiting said iteration of immutable isolating or grouping aspects to an indeterminate said meaning;
   a final entity current preventing said iteration of an immutable aspect of said meaning;
   a manifest process current limiting said iteration of a mutable aspect to a determinate said meaning;
   a shadow process current limiting said iteration of a mutable aspect to an indeterminate said meaning; and
   a final process current preventing said iteration of a mutable aspect of said meaning.

6. The method of claim 1 wherein said three-value logic consisting in only one from each of the following sets of states for existence or equivalence:
   a non-determinate state of existence or an unequal state of equivalence; or
   a determinate state of existence or an equal state of equivalence; or
   an indeterminate state of existence or an indeterminate state or equivalence.

7. The method of claim 6 wherein said three-value logic is applied in an algorithm whose steps form said index of a finite plurality of said notations of said meaning comprising:

a step zero indexing said meaning by the states of existence for a symbolic representation;
a step one indexing said meaning by the states of existence of an individual immutable aspect;
a step two indexing said meaning by the states of equivalence between an individual immutable aspect and a grouping immutable aspect;
a step three indexing said meaning by the states of existence of a grouping immutable aspect;
a step four indexing said meaning by the states of existence of a transcendent semantic aspect;
a step five indexing said meaning by the states of existence of a mutable aspect;
a step six indexing said meaning by the states of existence of an intrinsic aspect;
a step seven indexing said meaning by the states of equivalence between an intrinsic aspect and an extrinsic aspect;
a step eight indexing said meaning by the states of existence of said an extrinsic aspect;
a step nine indexing said meaning by the states of equivalence between said an intrinsic aspect and said a mutable aspect; and
a step ten indexing said meaning by the states of equivalence between said an extrinsic aspect and said a mutable aspect.

8. The method of claim 1 wherein said notation is a rivulet identifying the structural components of an information model consisting in one or more of the following:
   a mark rivulet for indexing non-deterministic, potentially iterative, intrinsic semantic representations;
   a type rivulet for indexing non-deterministic, potentially iterative, extrinsic semantic representations;
   a negation rivulet for indexing non-deterministic, potentially iterative, immutable semantic representations;
   a token rivulet for indexing non-deterministic, potentially iterative, mutable semantic representations;
   an index rivulet for indexing deterministic, potentially iterative, intrinsic semantic representations;
   an icon rivulet for indexing deterministic, potentially iterative, extrinsic semantic representations;
   a sign rivulet for indexing deterministic, potentially iterative, immutable semantic representations;
   a symbol rivulet for indexing deterministic, potentially iterative, mutable semantic representations;
   an essence rivulet for indexing non-deterministic, potentially iterative, intrinsic, originalities;
   a purpose rivulet for indexing non-deterministic, potentially iterative, extrinsic, originalities;
   a notion rivulet for indexing non-deterministic, potentially iterative, immutable originalities;
   an action rivulet for indexing non-deterministic, potentially iterative, mutable originalities;
   an identity rivulet for indexing deterministic, potentially iterative, intrinsic, originalities;
   a kind rivulet for indexing deterministic, potentially iterative, extrinsic, originalities;
   a theory rivulet for indexing deterministic, potentially iterative, immutable originalities;
   a cause rivulet for indexing deterministic, potentially iterative, mutable originalities;
   a projection rivulet for indexing non-deterministic, non-iterative, intrinsic passivities;
   a reflection rivulet for indexing non-deterministic, non-iterative, extrinsic passivities;
   a singularity rivulet for indexing non-deterministic, non-iterative, immutable passivities;
   a radiation rivulet for indexing non-deterministic, non-iterative, mutable passivities;
   an emanation rivulet for indexing deterministic, non-iterative, intrinsic passivities;
   an illumination rivulet for indexing deterministic, non-iterative, extrinsic passivities;
   a vision rivulet for indexing deterministic, non-iterative, immutable passivities;
   a point rivulet for indexing deterministic, non-iterative, mutable passivities;
   an item rivulet for indexing non-deterministic, potentially iterative, intrinsic activities;
   a genre rivulet for indexing non-deterministic, potentially iterative, extrinsic activities;
   a concept rivulet for indexing non-deterministic, potentially iterative, immutable activities;
   a position rivulet for indexing non-deterministic, potentially iterative, mutable activities;
   a label rivulet for indexing deterministic, potentially iterative, intrinsic activities;
   a form rivulet for indexing deterministic, potentially iterative, extrinsic activities;
   an element rivulet for indexing deterministic, potentially iterative, immutable activities;
   an order rivulet for indexing deterministic, potentially iterative, mutable activities;
   a persona rivulet for indexing non-deterministic, potentially iterative, intrinsic willfulness;
   a character rivulet for indexing non-deterministic, potentially iterative, extrinsic willfulness;
   a condition rivulet for indexing non-deterministic, potentially iterative, immutable willfulness;
   an interaction rivulet for indexing non-deterministic, potentially iterative, mutable willfulness;
   a name rivulet for indexing deterministic, potentially iterative, intrinsic willfulness;
   an attribute rivulet for indexing deterministic, potentially iterative, extrinsic willfulness;
   a language rivulet for indexing deterministic, potentially iterative, immutable willfulness; and
   a relation rivulet for indexing deterministic, potentially iterative, mutable willfulness.

9. The method of claim 1 wherein said notation is a surface aggregating said meaning to define functional components of an information system consisting in one or more of the following:
   a cryptic surface for aggregating indeterminate transcendences;
   a signify surface for aggregating determinate transcendences;
   an initiate surface for aggregating indeterminate originalities;
   an assign surface for aggregating determinate originalities;
   a value surface for aggregating indeterminate passivities;
   a record surface for aggregating determinate passivities;
   an associate surface for aggregating indeterminate productivity;
   an implement surface for aggregating determinate productivity;
   an integrate surface for aggregating indeterminate willfulness; and
   an establish surface for aggregating determinate willfulness.

10. The method of claim 1 wherein said notation is a consideration for isolating content from context within an information model consisting in one or more of the following:
- a first consideration, which evaluates the iterative conveyance of transcendent semantic aspects, immutably individual aspects, and immutably grouping aspects;
- a second consideration which evaluates the iterative conveyance of symbolic representation, transcendent semantic aspects, immutably individual aspects, and immutably grouping aspects; and
- a third consideration which evaluates the iterative conveyance of transcendent semantic aspects, intrinsic subjective aspects, extrinsic objective aspects and mutable productive aspects.

11. The method of claim 1 wherein said meaning has formulaic structure.

12. The method of claim 1 wherein said meaning has cyclical structure.

13. The method of claim 1 wherein said meaning has graphical structure.

14. The method of claim 1 wherein said meaning has tabular structure.

15. The method of claim 1 wherein said meaning has Cartesian structure.

16. The method of claim 1 wherein said meaning has hierarchical structure.

17. The method of claim 1 wherein said meaning has object-oriented structure.

18. The method of claim 1 wherein said meaning has transactional structure.

* * * * *